United States Patent
Kawai et al.

(10) Patent No.: US 12,387,530 B1
(45) Date of Patent: Aug. 12, 2025

(54) PROGRAM, INFORMATION PROCESSING METHOD, AND INFORMATION PROCESSING APPARATUS

(71) Applicant: OLLO, INC., Tokyo (JP)

(72) Inventors: Kento Kawai, Tokyo (JP); Mintei Kou, Tokyo (JP); Kouki Hoyashita, Tokyo (JP); Kouhei Hiraki, Tokyo (JP); Futa Waseda, Tokyo (JP); Kazuki Chada, Tokyo (JP); Toshiki Aihara, Tokyo (JP); Kenshiro Ebisu, Tokyo (JP)

(73) Assignee: OLLO, INC., Tokyo (JP)

( * ) Notice: Subject to any disclaimer, the term of this patent is extended or adjusted under 35 U.S.C. 154(b) by 0 days.

(21) Appl. No.: 19/108,899

(22) PCT Filed: Aug. 30, 2023

(86) PCT No.: PCT/JP2023/031608
§ 371 (c)(1),
(2) Date: Mar. 5, 2025

(87) PCT Pub. No.: WO2024/062882
PCT Pub. Date: Mar. 28, 2024

(30) Foreign Application Priority Data

Sep. 20, 2022 (JP) ................................. 2022-149255

(51) Int. Cl.
*G06V 40/20* (2022.01)
*G06Q 10/0639* (2023.01)
*G06V 10/764* (2022.01)

(52) U.S. Cl.
CPC ....... *G06V 40/20* (2022.01); *G06Q 10/06398* (2013.01); *G06V 10/764* (2022.01); *G06V 2201/07* (2022.01)

(58) Field of Classification Search
CPC .. G06V 40/20; G06V 10/764; G06V 2201/07; G06Q 10/06398; G06T 7/00; G06T 7/20
See application file for complete search history.

(56) References Cited

U.S. PATENT DOCUMENTS

2014/0079290 A1    3/2014  Nakano et al.
2016/0267328 A1*   9/2016  Fan .................... G06V 20/52
(Continued)

FOREIGN PATENT DOCUMENTS

CN      107426231 A  * 12/2017  ........... H04L 63/101
JP      2006-209657 A    8/2006
(Continued)

OTHER PUBLICATIONS

English Translation of International Search Report for PCT Application No. PCT/JP2023/031608 mailed Oct. 17, 2023.

*Primary Examiner* — Samir A Ahmed
(74) *Attorney, Agent, or Firm* — Bret E. Field; Bozicevic, Field & Francis LLP

(57) ABSTRACT

Provided are a program and the like in which it is possible to accurately determine whether a target performing an operation is performing an operation according to a regulation. A computer distributes a moving image obtained by capturing a target performing an operation for each motion included in the operation. In addition, the computer determines whether each motion is a standard motion, on the basis of each distributed moving image. Then, the computer analyzes whether the operation is a standard operation, on the basis of a determination result with respect to each motion.

22 Claims, 41 Drawing Sheets

(56) References Cited

U.S. PATENT DOCUMENTS

2020/0074158 A1* 3/2020 Kim .................. G06V 40/20
2020/0167715 A1   5/2020 Bhatt et al.

FOREIGN PATENT DOCUMENTS

| JP | 2014-64110 A | | 4/2014 |
|----|--------------|---|--------|
| JP | 2019159885 A | * | 9/2019 |
| JP | 2020-87437 A | | 6/2020 |
| JP | 2021-71773 A | | 5/2021 |
| JP | 2021-82137 A | | 5/2021 |
| WO | WO2017150211 A1 | | 9/2017 |

* cited by examiner

FIG.3
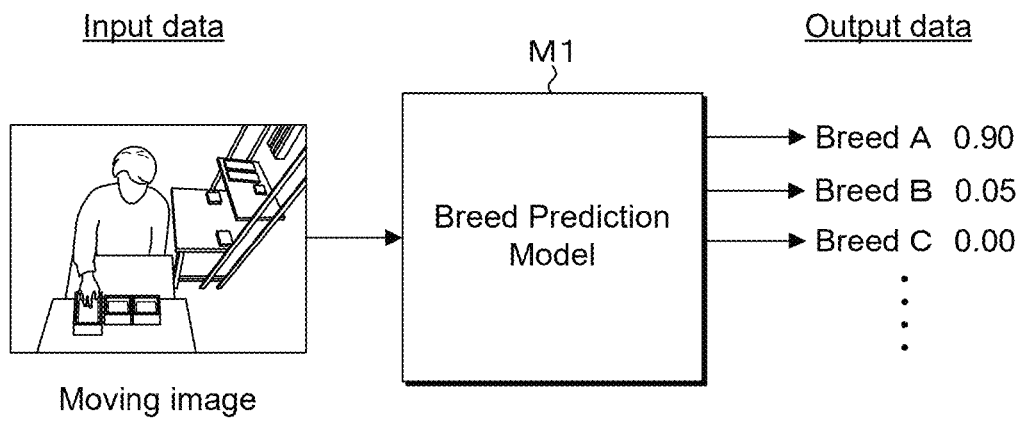
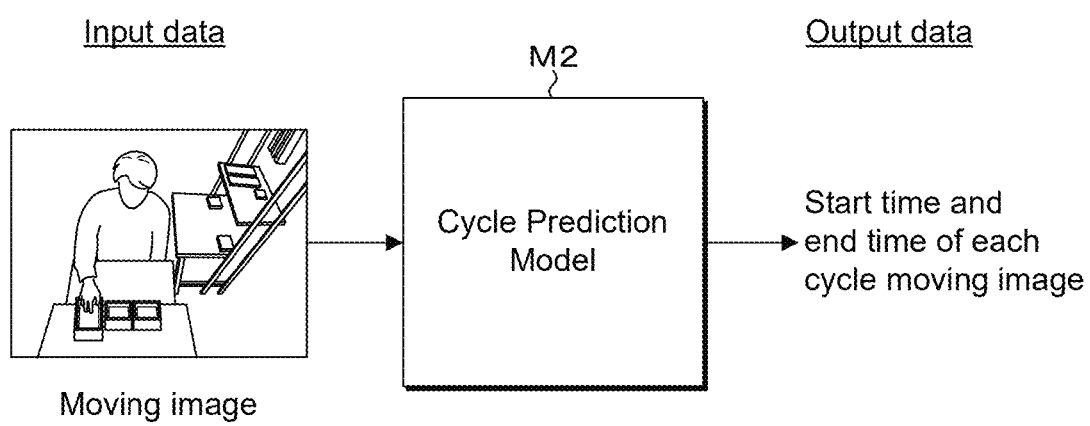
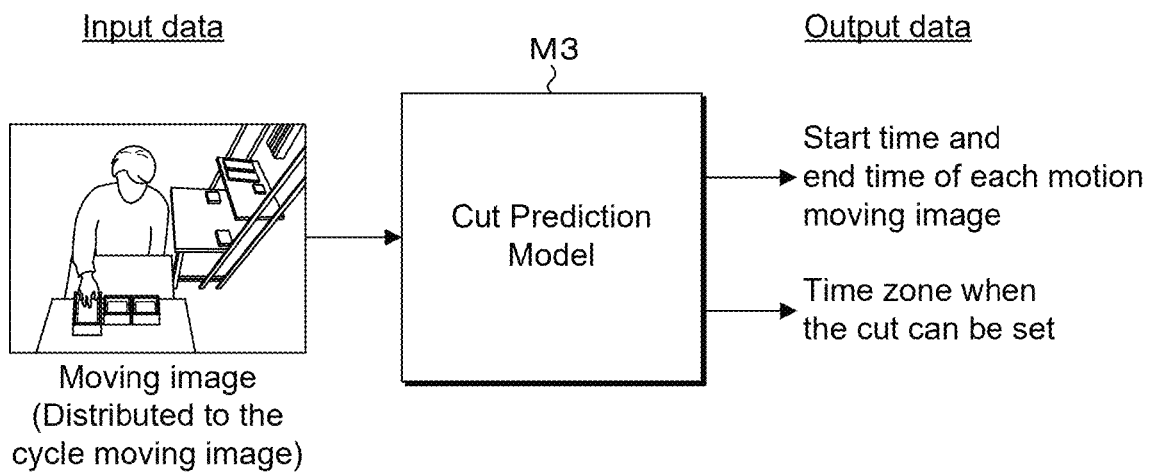

FIG.10A

Assembly operation of the breed A

| Operation element | | | | | |
|---|---|---|---|---|---|
| 1. Assembling case A | Motion miss * % | Sequence switch * % | Abnormal movement * % | Standard * % |
| | The motion time is long * % | The motion time is short * % | | |
| 2. Assembling component A | Motion miss * % | Sequence switch * % | Abnormal movement * % | Standard * % |
| | The motion time is long * % | The motion time is short * % | | |
| 3. Assembling component B | Motion miss * % | Sequence switch * % | Abnormal movement * % | Standard * % |
| | The motion time is long * % | The motion time is short * % | | |
| 4. Assembling component C | Motion miss * % | Sequence switch * % | Abnormal movement * % | Standard * % |
| | The motion time is long * % | The motion time is short * % | | |
| 5. Assembling case B | Motion miss * % | Sequence switch * % | Abnormal movement * % | Standard * % |
| | The motion time is long * % | The motion time is short * % | | |
| 6. Assembling component D | Motion miss * % | Sequence switch * % | Abnormal movement * % | Standard * % |
| | The motion time is long * % | The motion time is short * % | | |
| 7. Assembling component E | Motion miss * % | Sequence switch * % | Abnormal movement * % | Standard * % |
| | The motion time is long * % | The motion time is short * % | | |
| 8. Assembling component F | Motion miss * % | Sequence switch * % | Abnormal movement * % | Standard * % |
| | The motion time is long * % | The motion time is short * % | | |

A5

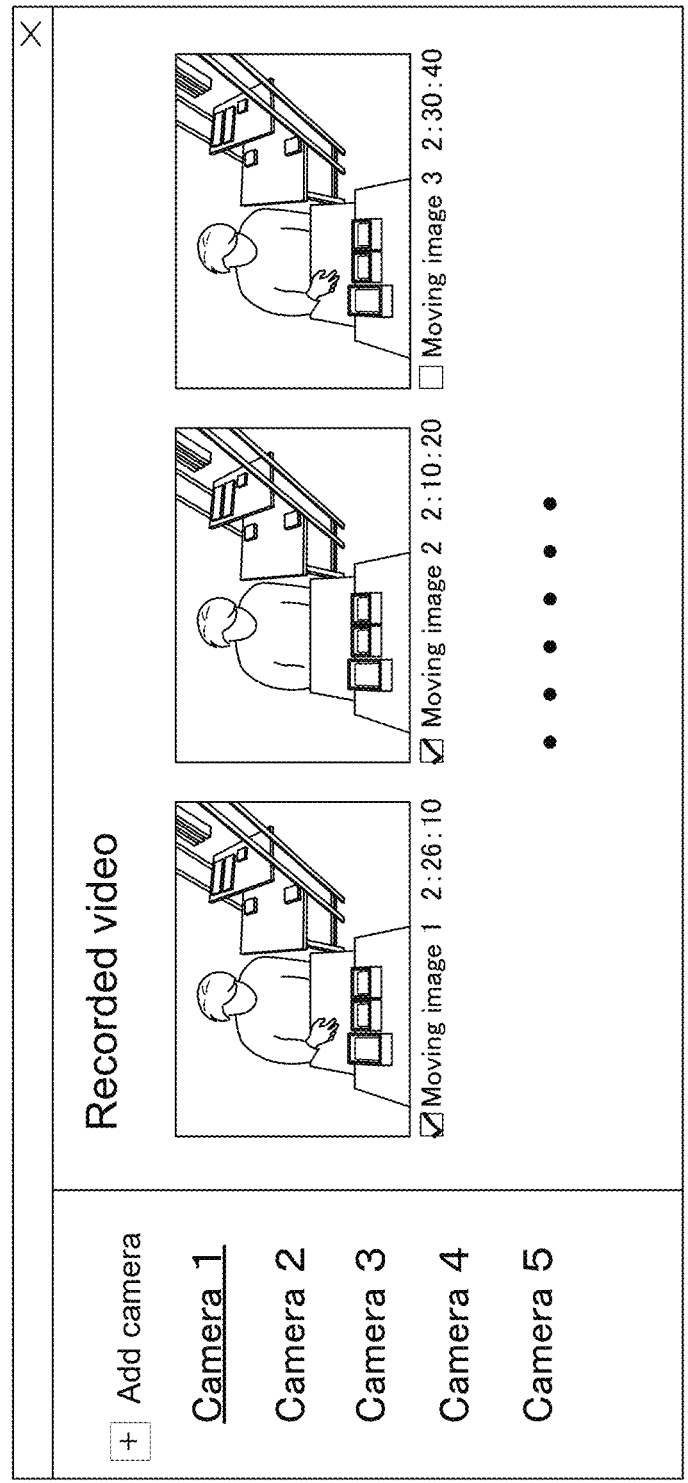

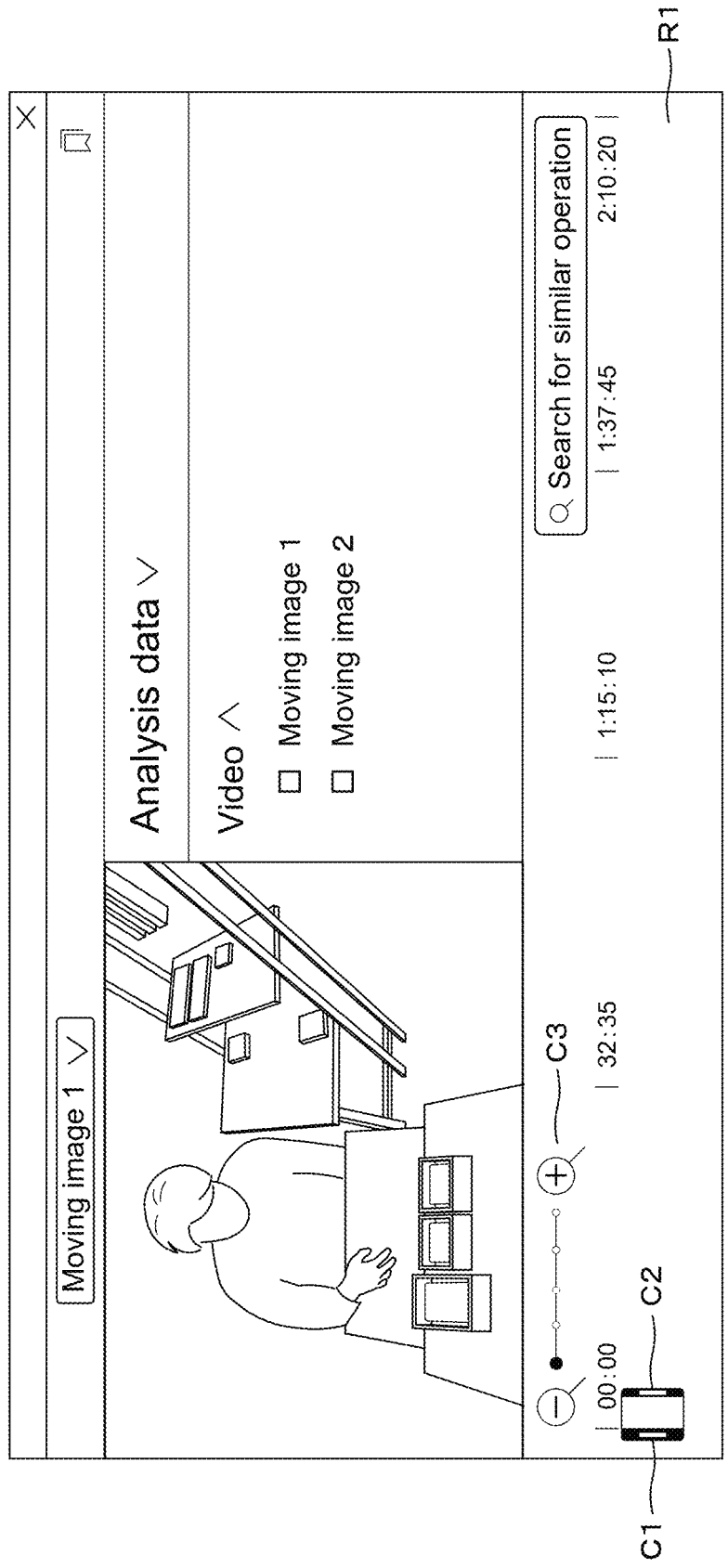

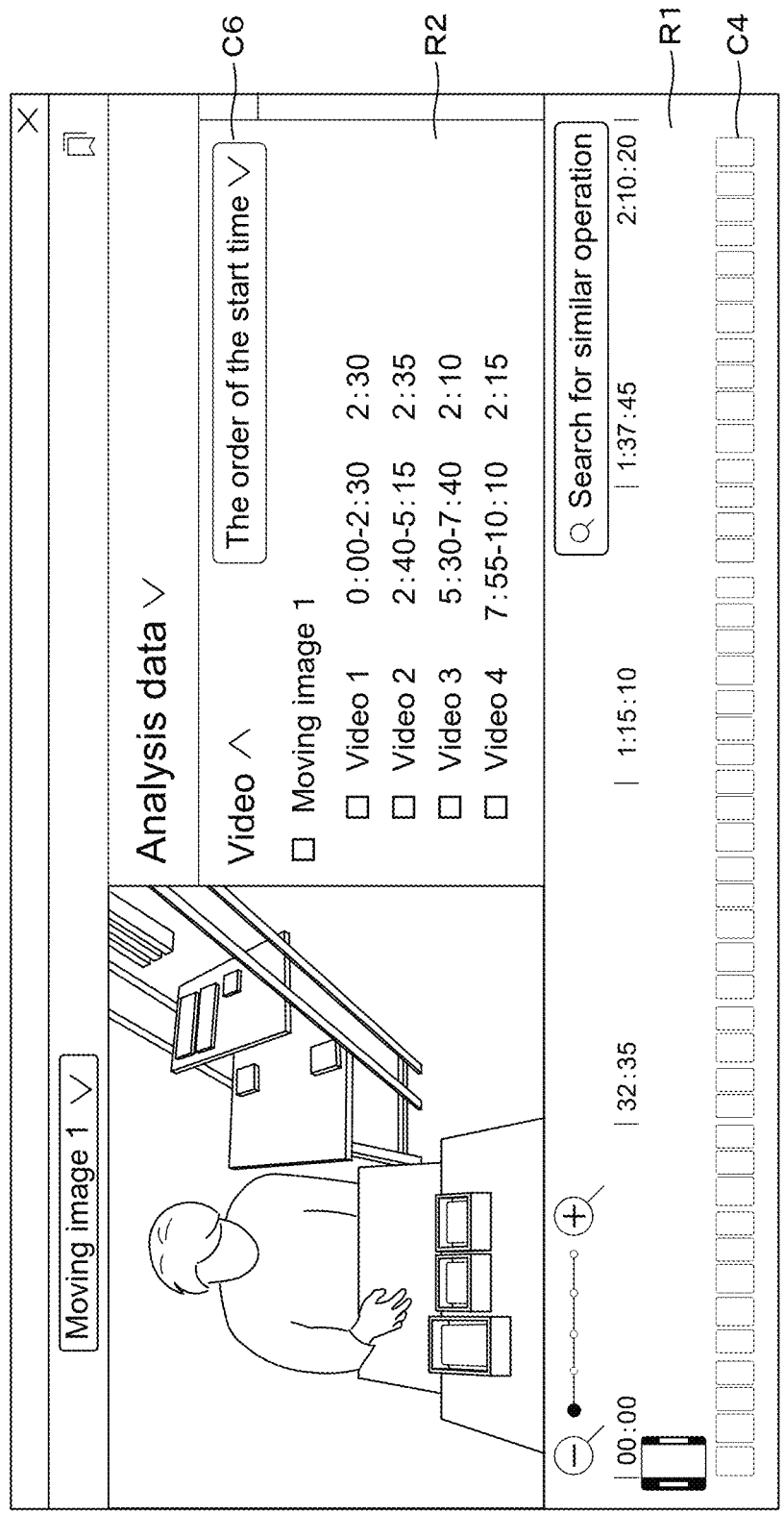

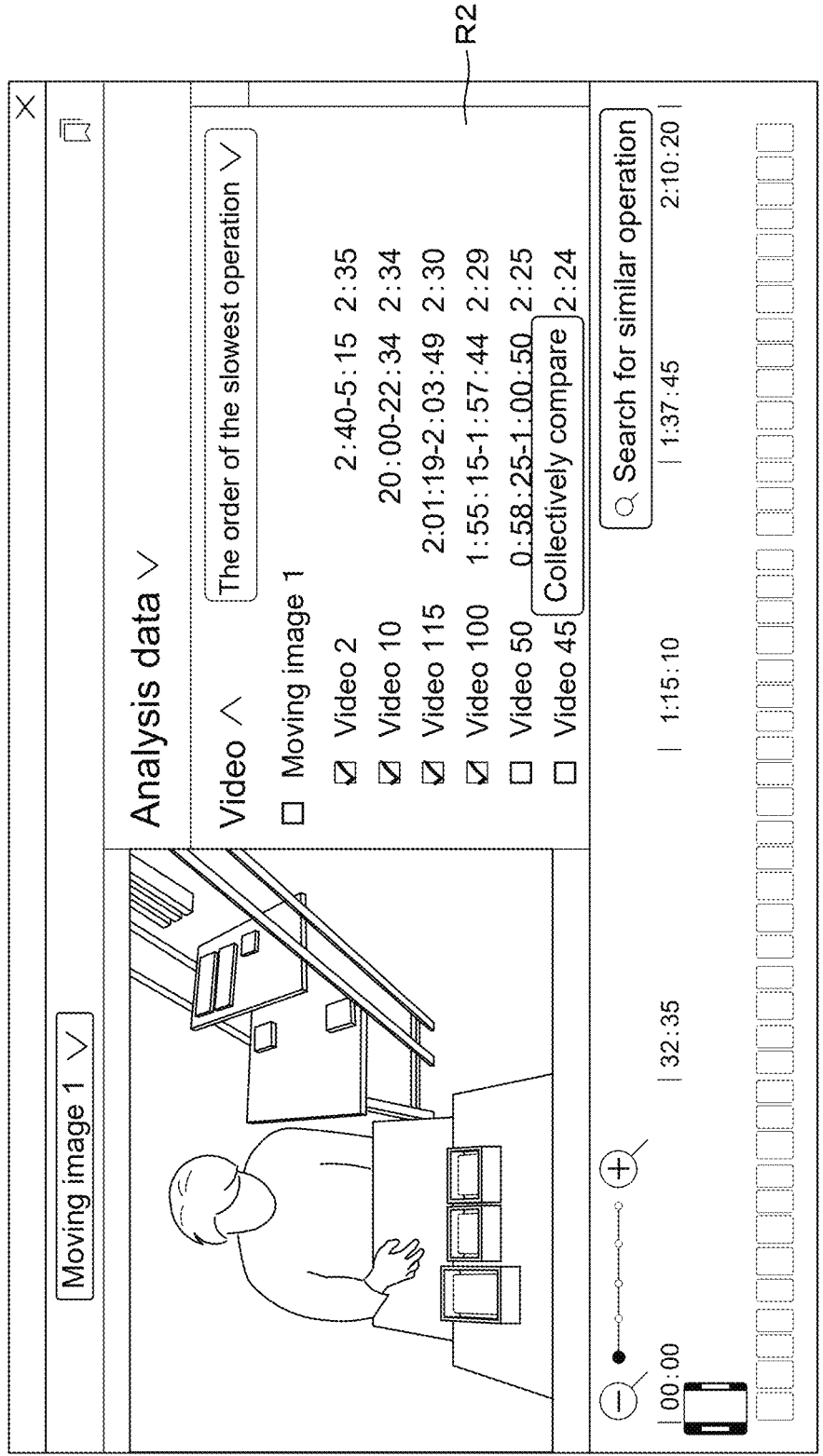

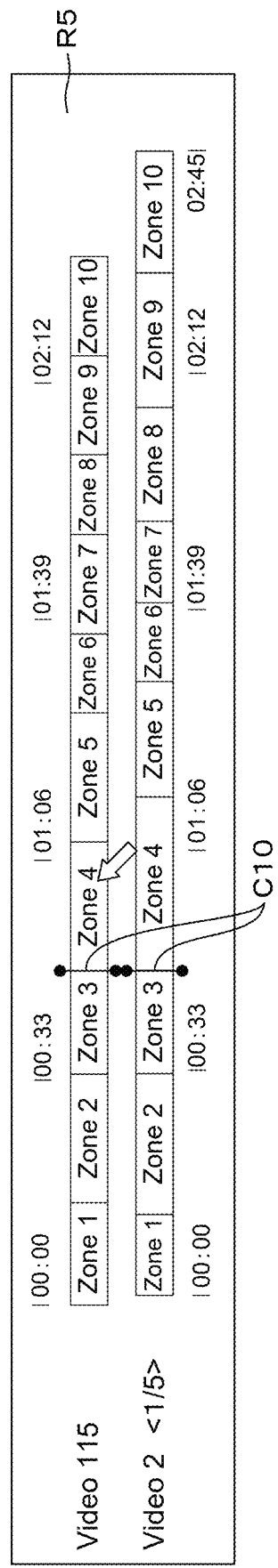

FIG.20D

| | | | | | | | | |
|---|---|---|---|---|---|---|---|---|
Video 115 | Zone 3 | Zone 4-1 | Zone 4-2 | Zone 4-3 | Zone 4-4 | Zone 4-5 | Zone 5 | 
00:45 ... 01:15

Video 2 <1/5> | Zone 3 | Zone 4-1 | Zone 4-2 | Zone 4-3 | Zone 4-4 | Zone 4-5 | Zone 5
00:45 ... 01:15

R5

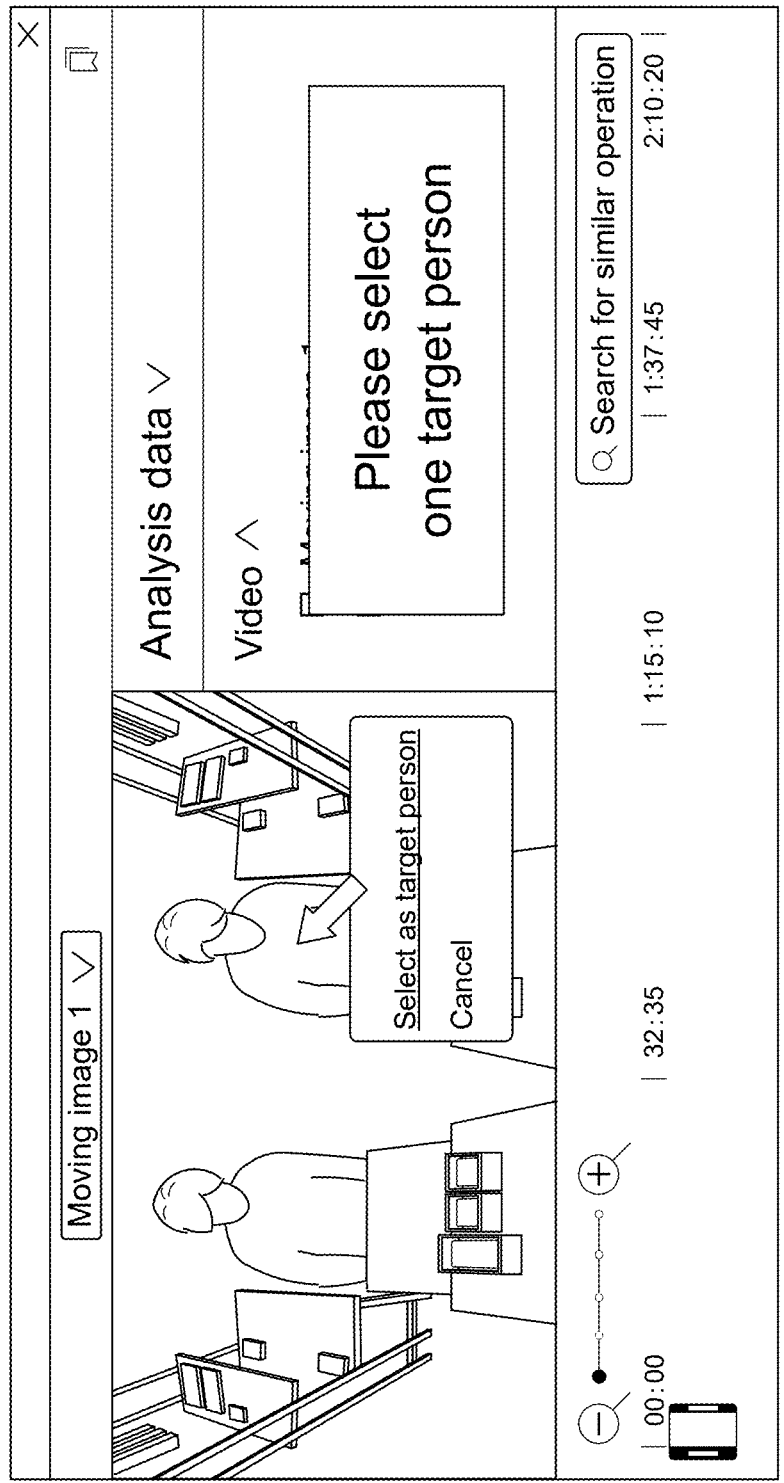

PROGRAM, INFORMATION PROCESSING METHOD, AND INFORMATION PROCESSING APPARATUS

REFERENCE TO RELATED APPLICATIONS

This application is the national phase under 35 U. S. C. § 371 of PCT International Application No. PCT/JP2023/031608 which has an International filing date of Aug. 30, 2023 and designated the United States of America.

BACKGROUND ART

In Japanese Patent Laid-Open Publication No. 2021-82137, a technology of detecting whether the behavior of a target is in accordance with the order of each operation, for a step consisting of a plurality of operations of which the order is set in advance, is disclosed. In the technology disclosed in Japanese Patent Laid-Open Publication No. 2021-82137, for each operation configuring the step, whether the target is performing an operation according to a regulation is determined in accordance with step information in which an operation name, an operation order, a standard operation time, and the like are regulated.

SUMMARY

In the technology disclosed in Japanese Patent Laid-Open Publication No. 2021-82137, whether the operation according to the regulation is performed is determined in accordance with whether each operation is performed for the standard operation time. However, even in the case of the operation that is performed for the standard operation time, the operation contents (the motion contents) may not in accordance with the regulation. Accordingly, it is difficult to accurately determine whether the operation contents are in accordance with the regulation, by only determining whether an operation time is the standard operation time.

An object of the present disclosure is to provide a program and the like in which it is possible to accurately determine whether a target performing an operation is performing an operation according to a regulation.

A program according to one aspect of the present disclosure causes a computer to execute processing of: distributing a moving image obtained by capturing a target performing an operation for each motion included in the operation; determining whether each motion is a standard motion, on the basis of each distributed moving image; and analyzing whether the operation is a standard operation, on the basis of a with a determination result respect to each motion.

According to one aspect of the present disclosure, it is possible to accurately determine whether the target performing the operation is performing the operation according to the regulation.

The above and further objects and features will more fully be apparent from the following detailed description with accompanying drawings.

BRIEF DESCRIPTION OF DRAWINGS

FIG. 3 is an explanatory diagram illustrating a configuration example of a learning model.
FIG. 10A is an explanatory diagram illustrating a screen example.
FIG. 18A is an explanatory diagram illustrating a screen example.
FIG. 18B is an explanatory diagram illustrating a screen example.
FIG. 18C is an explanatory diagram illustrating a screen example.
FIG. 19B is an explanatory diagram illustrating a screen example.
FIG. 20C is an explanatory diagram illustrating a screen example.
FIG. 20D is an explanatory diagram illustrating a screen example.

FIG. 27B is an explanatory diagram illustrating a screen example.

DESCRIPTION

Hereinafter, a program, an information processing method, and an information processing apparatus of the present disclosure will be described in detail, on the basis of the drawings illustrating embodiments thereof.

Embodiment 1

Figure 1A:
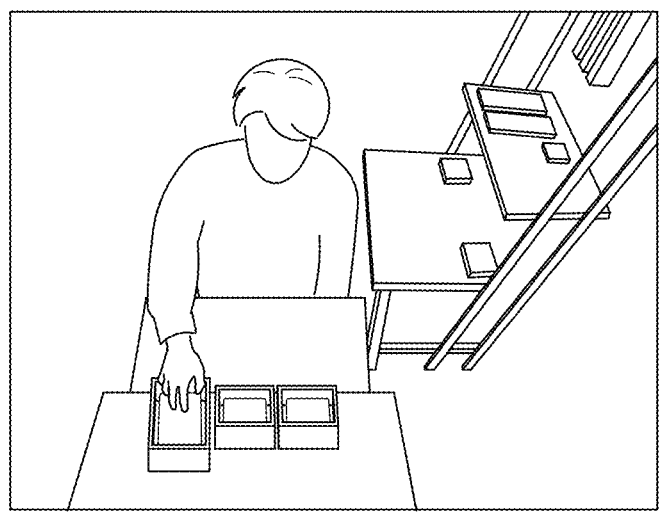
FIG. 1A is an explanatory diagram illustrating a moving image example of a processing target.
Figure 1B:
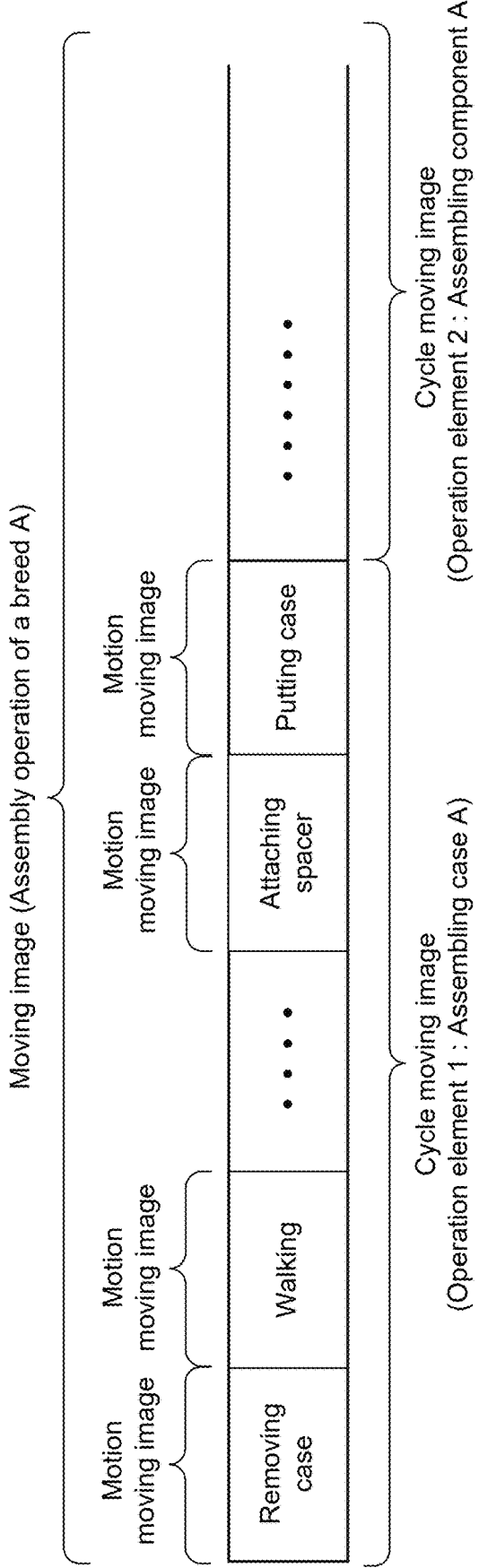
FIG. 1B is an explanatory diagram illustrating a moving image example of the processing target.

An information processing apparatus analyzing, on the basis of a moving image obtained by capturing an operator (a target) performing an operation, whether the operation performed by the operator is a standard operation set in advance will be described. FIG. 1A and FIG. 1B are explanatory diagrams illustrating a moving image example of a processing target. A moving image of the processing target in this embodiment is a moving image data including a plurality of images (still images), for example, 30 images or 15 images for 1 second, and for example, as illustrated in FIG. 1A, is a captured image obtained by capturing a state in which the operator performs the operation from above the operator. In addition, as illustrated in FIG. 1B, the moving image of the processing target, for example, is an image obtained by capturing from the start to the end of an operation of assembling one product, and includes a moving image distributed for each of a plurality of operation elements included in the assembly operation (an operation element moving image, hereinafter, referred to as a cycle moving image). In addition, the cycle moving image includes a moving image distributed for each of a plurality of motions included in each operation element (a distributed moving image, hereinafter, referred to as a motion moving image). In the example illustrated in FIG. 1B, a moving image obtained by capturing the operator performing an assembly operation of a product of a breed A can be distributed for each cycle moving image obtained by capturing the operator performing an operation element such as "assembling case A" and "assembling component A", and the cycle moving image of the operation element of "assembling case A" can be distributed for each motion moving image obtained by capturing the operator performing a motion such as "removing case", "walking", "attaching spacer", and "putting case".

Figure 2:
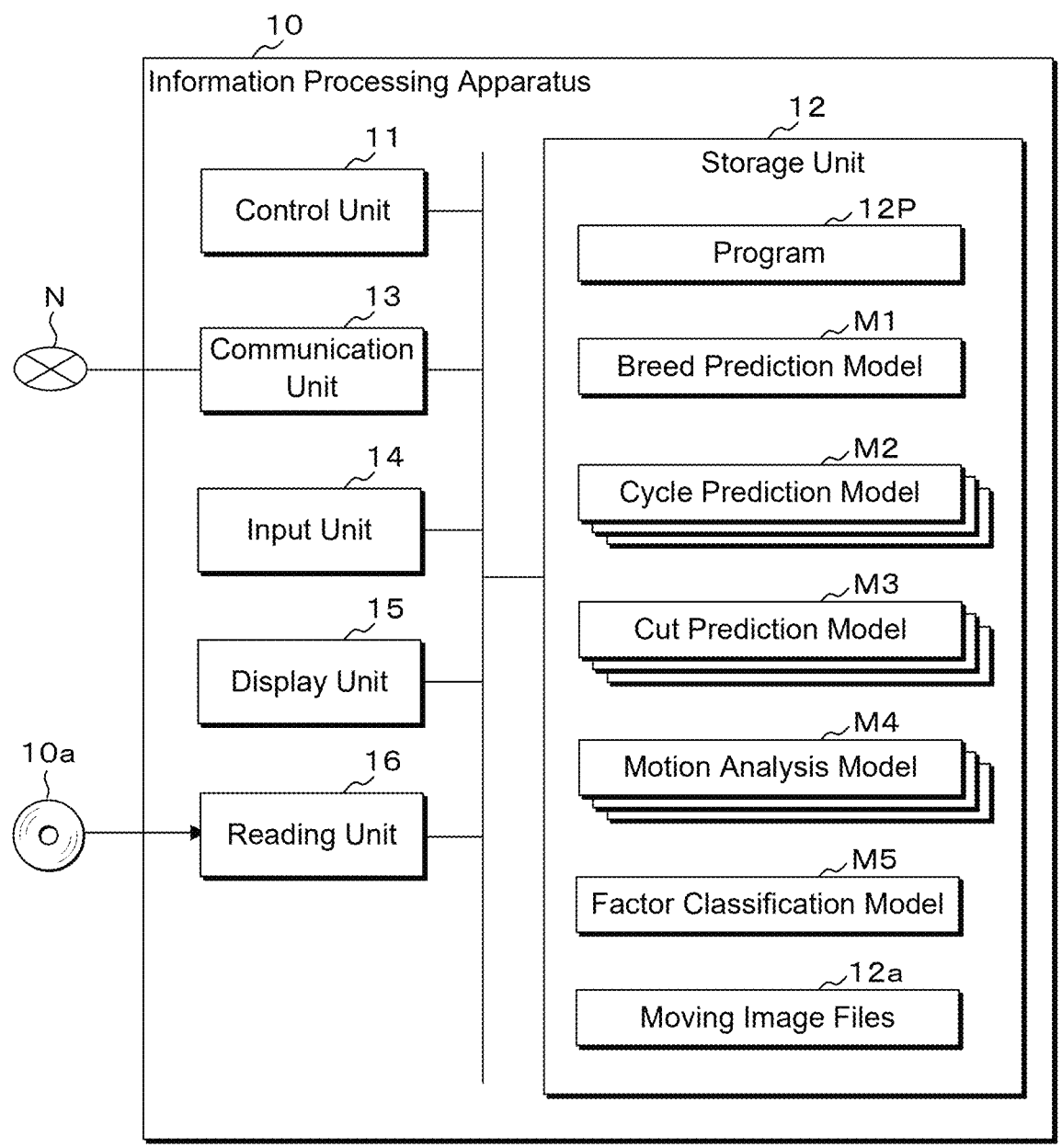
FIG. 2 is a block diagram illustrating a configuration example of an information processing apparatus.

FIG. 2 is a block diagram illustrating a configuration example of an information processing apparatus. An information processing apparatus 10 is a device capable of processing various types of information and transmitting and receiving information, and for example, is composed of a server computer, a personal computer, a workstation, or the like. The information processing apparatus 10 includes a control unit 11, a storage unit 12, a communication unit 13, an input unit 14, a display unit 15, a reading unit 16, and the like, and such units are connected to each other via a bus. The control unit 11 includes one or a plurality of processors such as a central processing unit (CPU), a micro-processing unit (MPU), a graphics processing unit (GPU), or an AI chip (a semiconductor for AI). The control unit 11 suitably executes a program 12P stored in the storage unit 12 to execute information processing and control processing to be performed by the information processing apparatus 10.

The storage unit 12 includes a random access memory (RAM), a flash memory, a hard disk, a solid state drive (SSD), and the like. The storage unit 12 stores the program 12P (a program product) executed by the control unit 11 and various types of data. In addition, the storage unit 12 temporarily stores data or the like generated when the control unit 11 executes the program 12P. The program 12P and the various types of data may be written in the storage unit 12 in the production step of the information processing apparatus 10, or may be downloaded by the control unit 11 from another device via the communication unit 13 and stored in the storage unit 12. In addition, the storage unit 12 stores a learning model such as a breed prediction model M1, a cycle prediction model M2, a cut prediction model M3, a motion analysis model M4, and a factor classification model M5, which have learned training data by machine learning. The learning models M1 to M5 are assumed to be used as a program module configuring artificial intelligence software. The learning models M1 to M5 perform predetermined arithmetic on an input value and output an arithmetic result, and the storage unit 12 stores information such as information of layers of the learning models M1 to M5, information of nodes configuring each layer, and a weight (a coupling coefficient) between the nodes, as information for defining the learning models M1 to M5. Note that a plurality of cycle prediction models M2, a plurality of cut prediction models M3, and a plurality of motion analysis models M4 are prepared for each breed of product on which the operator performs the assembly operation. Further, the storage unit 12 stores a plurality of moving image files 12a of the processing target.

The communication unit 13 is a communication module for performing processing relevant to wired communication or wireless communication, and transmits and receives information to and from another device via a network N. The network N may be the internet or a public communication network, or may be a local area network (LAN) constructed in a facility in which the information processing apparatus 10 is installed. The input unit 14 receives manipulation input of a user, and transmits a control signal corresponding to manipulation contents to the control unit 11. The display unit 15 is a liquid crystal display, an organic EL display, or the like, and displays various types of information, in accordance with an instruction from the control unit 11. A part of the input unit 14 and the display unit 15 may be an integrated touch panel.

The reading unit 16 reads information stored in a portable storage medium 10a including a compact disc (CD), a digital versatile disc (DVD), a universal serial bus (USB) memory, a secure digital (SD) card, and the like. The program 12P and the various types of data stored in the storage unit 12 may be read by the control unit 11 from the portable storage medium 10a via the reading unit 16 and stored in the storage unit 12.

The information processing apparatus 10 may be a multicomputer including a plurality of computers, or may be a virtual machine that is virtually constructed by software in one device. In a case where the information processing apparatus 10 is composed of a server computer, the information processing apparatus 10 may be a local server, or may be a cloud server connected via a network such as the internet such that communication is available. In addition, the program 12P may be executed on a single computer, or may be executed on a plurality of computers connected to each other via the network N. Further, in the information processing apparatus 10, the input unit 14 and the display unit 15 are not essential, and the information processing apparatus 10 may be configured to receive a manipulation via a connected computer, or may be configured to output information to be displayed to an external display device.

Figure 4:
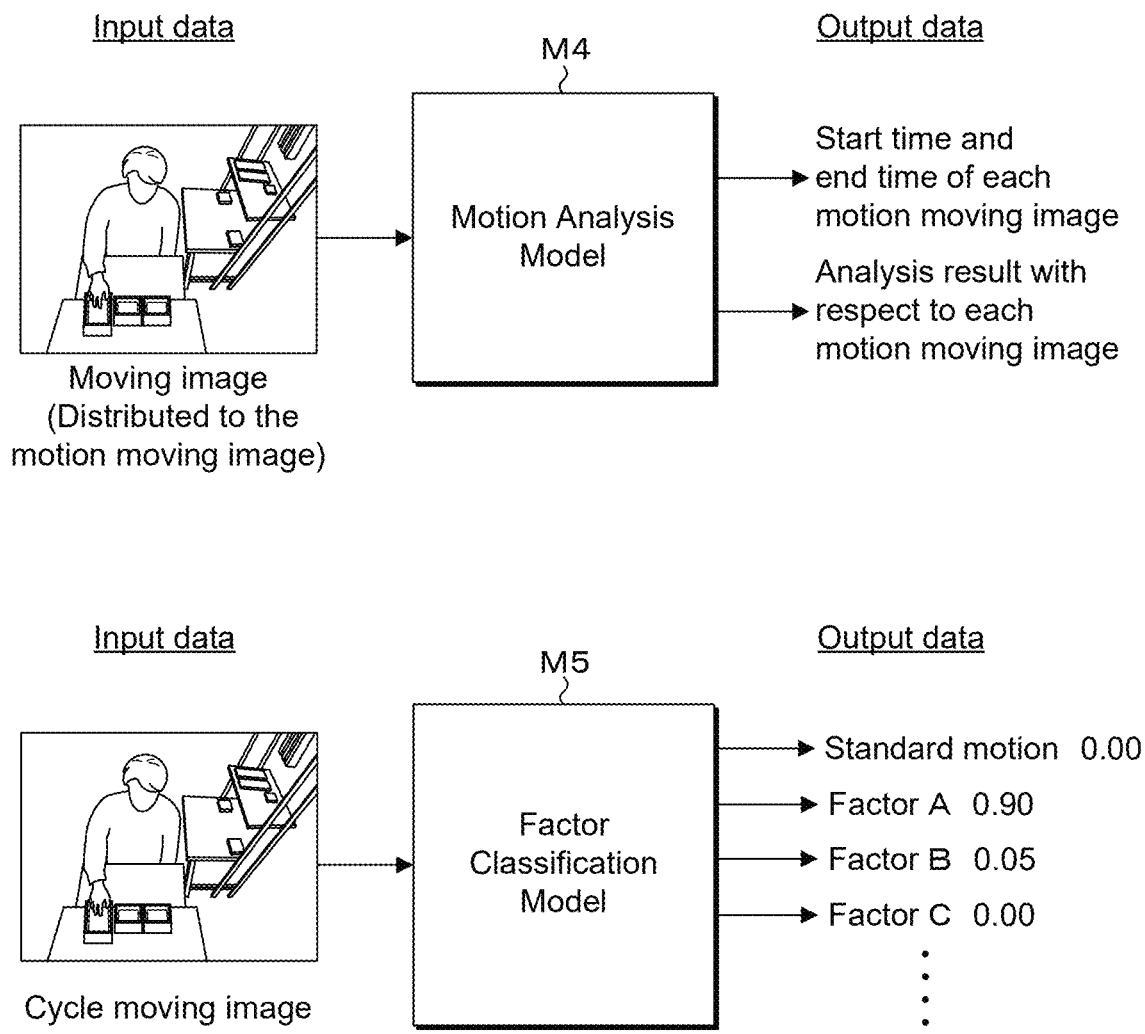
FIG. 4 is an explanatory diagram illustrating a configuration example of the learning model.

FIG. 3 and FIG. 4 are explanatory diagrams illustrating a configuration example of the learning models M1 to M5. The learning models M1 to M5, for example, are configured by using a recurrent neural network (RNN) or a long short-term memory (LSTM). Note that the learning models M1 to M5 may be configured by using an algorithm such as a convolution neural network (CNN) and Transformer, in addition to RNN and LSTM, or may be configured by combining a plurality of algorithms.

The breed prediction model M1 is a learned model that is learned such that a moving image obtained by capturing the entire body of the operator during the operation is set as input, arithmetic of discriminating the breed of product on which the captured operator is performing the assembly operation is performed on the basis of the input moving image, and the arithmetic result is output. Note that the breed prediction model M1 is not limited to a configuration in which the moving image obtained by capturing the entire body of the operator is input, and for example, may be a configuration in which as with a moving image obtained by capturing the upper body or the hands of the operator, a moving image obtained by capturing the state of the assembly operation being executed by the operator is input. The breed prediction model M1 includes an input layer receiving the moving image, an intermediate layer extracting a feature amount from the input moving image, and an output layer outputting information indicating the breed of product on which the operator in the moving image is performing the assembly operation, on the basis of the arithmetic result of the intermediate layer. The input layer includes an input node sequentially receiving a chronological image (frame) included in the moving image. The intermediate layer calculates an output value, on the basis of the moving image input via the input layer, by using various functions, threshold values, and the like. The output layer includes a plurality of output nodes associated with each breed set in advance, and outputs a probability (a certainty factor) that each breed is to be discriminated as the breed of product on which the operator is performing the assembly operation, from each of the output nodes. The output value from each output node of the output layer, for example, is a value of 0 to 1, and the total probability output from each output node is 1.0 (100%). For example, in a case where the moving image is input to the breed prediction model M1, the information processing apparatus 10 specifies the output node outputting the maximum output value among the output values (the certainty factors) from each output node, and specifies a breed associated with the specified output node as the breed of product on which the operator in the moving image is performing the assembly operation. Note that the output layer of the breed prediction model M1, instead of including the plurality of output nodes outputting the certainty factor with respect to each breed, may include one output node outputting information indicating the breed with the maximum certainty factor.

The breed prediction model M1 can be generated by performing machine learning using training data including a moving image for training, and information (a ground truth label) indicating the breed of product on which the operator in the moving image is performing the assembly operation. In a case where the moving image included in the training data is input, the breed prediction model M1 is learned such that the output value from the output node corresponding to the breed indicated by the ground truth label included in the training data approaches 1, and the output value from the other output node approaches 0. In learning processing, the breed prediction model M1 performs the arithmetic on the intermediate layer and the output layer, on the basis of the input moving image to calculate the output value from each output node, compares the calculated output value of each output node with a value corresponding to the ground truth label (1 for the output node corresponding to the ground truth label, and 0 for the other output node), and optimizes parameters used in the arithmetic processing on the intermediate layer and the output layer such that the both values are similar to each other. The parameters are a weight (a coupling coefficient) between the nodes in the intermediate layer and the output layer, a function coefficient, a threshold value, and the like. A method for optimizing the parameter is not particularly limited, and a back-propagation method, a steepest descent method, and the like can be used. Accordingly, the breed prediction model M1 that predicts the breed of product on which the operator in the moving image is performing the assembly operation when the moving image is input, and outputs a prediction result is obtained.

The cycle prediction model M2 is a learned model that is learned such that the moving image obtained by capturing the entire body of the operator during the operation is set as input, arithmetic of distributing the moving image to the cycle moving image is performed on the basis of the input moving image, and the arithmetic result is output. The cycle prediction model M2 is not also limited to a configuration in which the moving image obtained by capturing the entire body of the operator is input, and for example, may be a configuration in which as with the moving image obtained by capturing the upper body or the hands of the operator, the moving image obtained by capturing the state of the assembly operation being executed by the operator is input. The cycle prediction model M2 includes an input layer receiving the moving image, an intermediate layer extracting a feature amount from the input moving image, and an output layer outputting a start time and an end time of each cycle moving image to which the moving image is distributed on the basis of the arithmetic result of the intermediate layer. The intermediate layer of the cycle prediction model M2 calculates the output value, on the basis of the moving image input via the input layer, and the output layer includes an output node outputting the start time and the end time of each cycle moving image to which the moving image is distributed. Note that the start time and the end time of the cycle moving image indicate the elapsed time from the start of the reproduction of the moving image. In a case where the moving image is input to the cycle prediction model M2, the information processing apparatus 10 distributes the moving image for each cycle moving image, on the basis of the output value (the start time and the end time of the cycle moving image) from the output node.

The cycle prediction model M2 is generated by using a moving image for setting that is for setting a cut of each cycle moving image (each operation element) in the moving image. As the moving image for setting, a moving image obtained by capturing a state in which the operator who is capable of executing a standard motion for each motion performs the operation is used. Specifically, in a case where the moving image for setting is input to the cycle prediction model M2, the cycle prediction model M2 performs the arithmetic on the intermediate layer and the output layer, on the basis of the input moving image, to calculate the output value from the output node, and outputs a cut time (the start time the end time of the cycle moving image) for distributing the moving image for setting to each cycle moving image. The user is capable of correcting the cut time of each cycle output by the cycle prediction model M2, and the cycle prediction model M2 optimizes parameters used in the arithmetic processing on the intermediate layer and the output layer, on the basis of each corrected cut time. Accordingly, the cycle prediction model M2 that predicts the start time and the end time of each cycle moving image in the moving image when the moving image is input, and outputs a prediction result is obtained.

The cut prediction model M3 is a learned model that is learned such that the moving image distributed to the cycle moving image is set as input, arithmetic of distributing each cycle moving image to the motion moving image and arithmetic of predicting a time zone when a cut can be set instead of the cut of the distributed motion moving image are performed on the basis of the input moving image, and the arithmetic result is output. The cut prediction model M3 includes an input layer receiving the moving image, an intermediate layer extracting a feature amount from the input moving image, and an output layer outputting the start time and the end time of the motion moving image to which each cycle moving image is distributed, and the time zone when the cut of the motion moving image can be set, on the basis of the arithmetic result of the intermediate layer. The intermediate layer of the cut prediction model M3 calculates an output value, on the basis of the moving image input via the input layer, and the output layer includes each output node outputting the start time and the end time of each motion moving image to which each cycle moving image in the moving image is distributed, and the time zone when the cut of the motion moving image can be set. In a case where the moving image is input to the cut prediction model M3, the information processing apparatus 10 distributes the cycle moving image in the moving image for each motion moving image, on the basis of the output value (the start time and the end time of the motion moving image) from the output node.

The cut prediction model M3 is generated by using a moving image for setting that is for setting a cut of each motion moving image (each motion). The moving image used to generate the cut prediction model M3 is the moving image used to generate the cycle prediction model M2, and is the moving image distributed to each cycle moving image by the cycle prediction model M2. In a case where the moving image for setting is input to the cut prediction model M3, the cut prediction model M3 performs the arithmetic on the intermediate layer and the output layer, on the basis of the input moving image, to calculate the output value from the output node, and outputs the cut time (the start time and the end time of the motion moving image) for distributing the moving image for setting to each motion moving image, and the time zone when the cut of the motion moving image can be set. The user is capable of correcting the cut time of each motion output by the cut prediction model M3 and is capable of correcting the time zone when the cut can be set, which is output by the cut prediction model M3, and the cut prediction model M3 optimizes parameters used in the arithmetic processing on the intermediate layer and the output layer, on the basis of each corrected cut time and time zone when the cut can be set. Accordingly, the cut prediction model M3 that predicts the start time and the end time of each motion moving image in the moving image, and the time zone when the cut of each motion moving image can be set when the moving image is input, and outputs a prediction result is obtained.

The motion analysis model M4 is a learned model that is learned such that the moving image distributed to the motion moving image, that is, the moving image in which the cut between the motion moving images is set is set as input, arithmetic of performing distribution to each motion moving image included in the cycle moving image in the moving image and arithmetic of determining whether the motion of the operator in the distributed motion moving image is the standard motion are performed on the basis of the input moving image, and the arithmetic result is output. The motion analysis model M4 includes an input layer receiving the moving image, an intermediate layer extracting a feature amount from the input moving image, and an output layer outputting the start time and the end time of the motion moving image included in each cycle moving image in the moving image, and an analysis result (information relevant to the motion performed by the operator) indicating whether the motion of the operator in each motion moving image is the standard motion, on the basis of the arithmetic result of the intermediate layer. The intermediate layer of the motion analysis model M4 calculates an output value, on the basis of the moving image input via the input layer, and the output layer includes each output node outputting the start time and the end time of each motion moving image in the moving image, and the analysis result with respect to each motion moving image. In a case where the moving image is input to the motion analysis model M4, on the basis of the output value (the start time and the end time of the motion moving image, and the analysis result) from the output node, the information processing apparatus 10 distributes the cycle moving image in the moving image to the motion moving image, and specifies whether the motion of the operator in each motion moving image is the standard motion.

The motion analysis model M4 is generated by using the moving image obtained by capturing the operator executing the standard motion on each motion, as a moving image for setting. The moving image used to generate the motion analysis model M4 is the moving image used to generate the cut prediction model M3, and is the moving image distributed to each motion moving image by the cut prediction model M3. In a case where the moving image for setting is input to the motion analysis model M4, the motion analysis model M4 performs the arithmetic on the intermediate layer and the output layer, on the basis of the input moving image, to calculate the output value from the output node, and outputs a cut time (the start time and the end time of the motion moving image) for distributing the moving image for setting to each motion moving image, and the analysis result indicating whether the motion in each motion moving image is the standard motion. The user is capable of correcting the cut time of each motion output by the motion analysis model M4, and the motion analysis model M4 optimizes parameters used in the arithmetic processing on the intermediate layer and the output layer, on the basis of each corrected cut time. Note that here, the analysis result is information indicating that each motion is the standard motion, and thus, in a case where the output analysis result is information indicating that each motion is not the standard motion, the motion analysis model M4 corrects the analysis result, and optimizes the parameters, on the basis of the corrected analysis result. Accordingly, when the moving image is input, the motion analysis model M4 that predicts the start time and the end time of each motion moving image in the moving image, and the analysis result with respect to the motion in each motion moving image, and outputs a prediction result is obtained. By using such a motion analysis model M4, as a comparison result with the standard motion, the suitability of the motion of the operator that is captured in the moving image of an analysis target is determined. Note that it may be configured such that the motion analysis model M4 outputs information indicating a factor that it is not assumed as the standard motion when the motion of the operator is not the standard motion, in addition to the analysis result indicating whether the motion of the operator in each motion moving image is the standard motion. Examples of the factor that it is not assumed as the standard motion include a motion time being longer or shorter than a standard motion time by a predetermined time or more.

The factor classification model M5 is a learned model that is learned such that the cycle moving image distributed from the moving image is set as input, arithmetic of discriminating the factor that the operation element performed by the operator in the cycle moving image is not assumed as the standard operation is performed on the basis of the input cycle moving image, and the arithmetic result is output. The factor classification model M5 includes an input layer receiving the cycle moving image, an intermediate layer extracting a feature amount from the input cycle moving image, and an output layer outputting information indicating the factor that the operation element of the operator in the cycle moving image is not assumed as the standard operation (information relevant to the factor), on the basis of the arithmetic result of the intermediate layer. The intermediate layer of the factor classification model M5 calculates an output value, on the basis of the cycle moving image input via the input layer, and the output layer includes a plurality of output nodes associated with each factor set in advance, and outputs a probability (a certainty factor) that each factor is to be discriminated as the factor that the operation element performed by the operator is not assumed as the standard operation from each output node. The output value from each output node of the output layer, for example, is a value of 0 to 1, and the total probability output from each output node is 1.0 (100%). Examples of the factor that the operation element of the operator is not assumed as the standard operation include a lack of the motion included in the operation element, a change in the execution order of the motion included in the operation element, the movement of the motion included in the operation element being different from the standard motion, and a motion time of the motion included in the operation element being longer or shorter than a standard motion time by a predetermined time or more. For example, in a case where the cycle moving image is input to the factor classification model M5, the information processing apparatus 10 specifies the output node outputting the maximum output value among the output values (certainty factors) from each output node, and specifies a factor associated with the specified output node as the factor that the operation element of the operator in the cycle moving image is not assumed as the standard operation. Note that the output layer of the factor classification model M5 may include one output node outputting information indicating a factor that the certainty factor is maximized, instead of including the plurality of output nodes outputting the certainty factor with respect to each factor.

The factor classification model M5 can be generated by performing machine learning using training data including a cycle moving image for training, and information (a ground truth label) indicating a factor that the operation element of the operator in the cycle moving image is not assumed as the standard operation. In a case where the cycle moving image included in the training data is input, the factor classification model M5 is learned such that the output value from the output node corresponding to the factor indicated by the ground truth label included in the training data approaches 1, and the output value from the other output node approaches 0. In the learning processing, the factor classification model M5 performs the arithmetic on the intermediate layer and the output layer, on the basis of the input moving image, to calculate the output value from each output node, compares the calculated output value of each output node with a value according to the ground truth label (1 for the output node corresponding to the ground truth label, and 0 for the other output node), and optimizes parameters used in the arithmetic processing on the intermediate layer and the output layer such that the both values are similar to each other. Here, the parameters to be optimized are a weight (a coupling coefficient) between the nodes in the intermediate layer and the output layer, a function coefficient, a threshold value, and the like, and as a method for optimizing the parameter, a back-propagation method, a steepest descent method, and the like can be used. Accordingly, the factor classification model M5 that predicts the factor that the operation element of the operator in the cycle moving image is not assumed as the standard operation when the cycle moving image is input, and outputs a prediction result is obtained.

The learning of the learning models M1 to M5 may be performed in another learning device. The learned learning models M1 to M5 generated by performing learning in another learning device, for example, may be downloaded to the information processing apparatus 10 from the learning device via the network N or the portable storage medium 10a, and stored in the storage unit 12. In this embodiment, the cycle prediction model M2, the cut prediction model M3, and the motion analysis model M4 are generated by one-shot learning in which learning is performed by using one set of training data (moving image for setting) or less training data, and may be generated by learning using more training data. In addition, the learning models M1 to M5 are not limited to a configuration in which the moving image obtained by capturing the operator or the cycle moving image distributed from the moving image is input. For example, the information processing apparatus 10 may perform skeleton estimation on the operator, on the basis of each frame (each image) included in the moving image, to generate skeleton data, and may input chronological skeleton data to the learning models M1 to M5. In this case, the control unit 11 of the information processing apparatus 10, for example, performs the skeleton estimation on the operator in each frame by using a technology of extracting a joint position of a person in an image, as with OpenPose, and extracts the joint position of the operator. The control unit 11 may perform processing of extracting the joint position with respect to each frame included in the moving image to acquire the chronological skeleton data, and input the obtained chronological skeleton data to the learning models M1 to M5.

Figure 5:
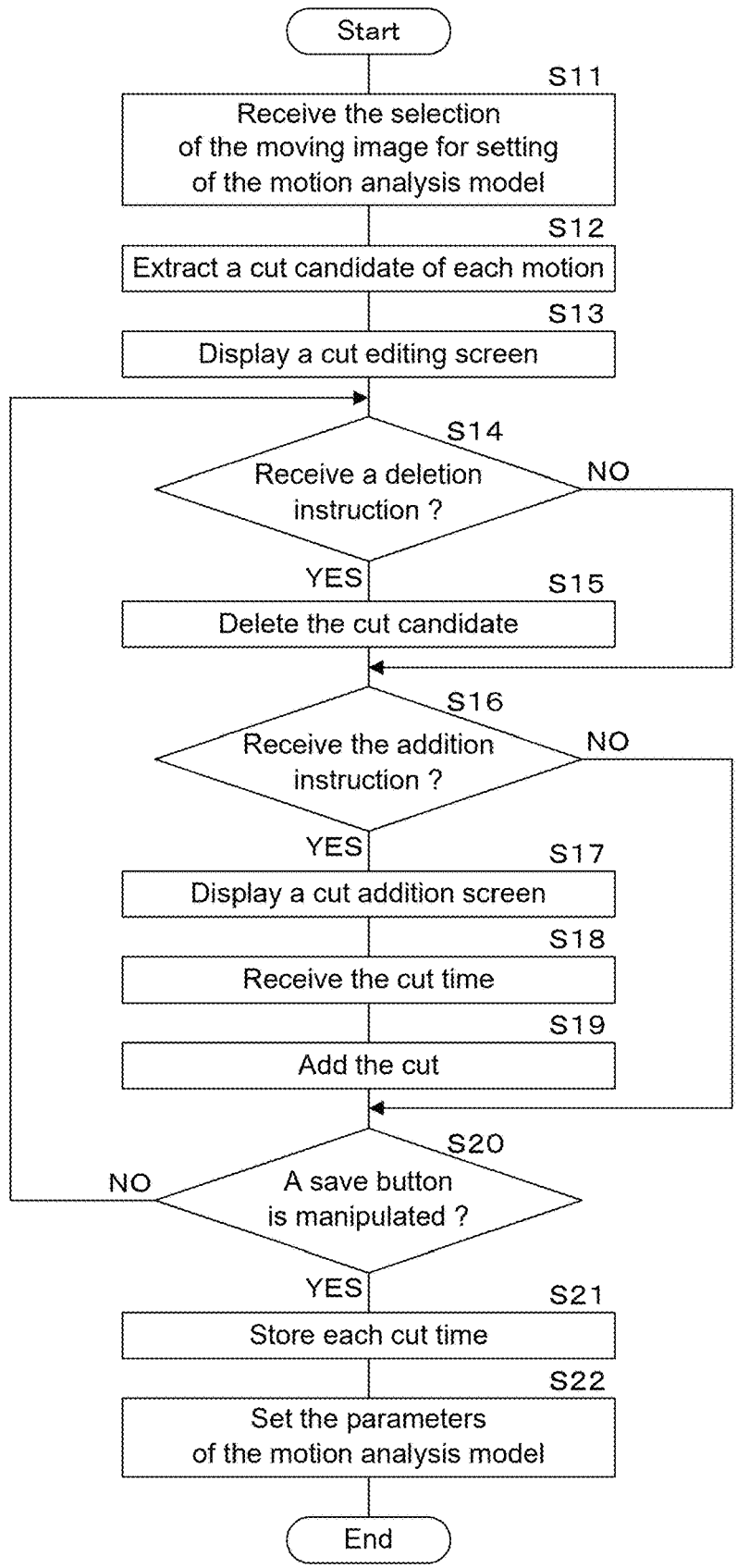
FIG. 5 is a flowchart illustrating an example of a generation processing procedure of a motion analysis model.
Figure 6A:
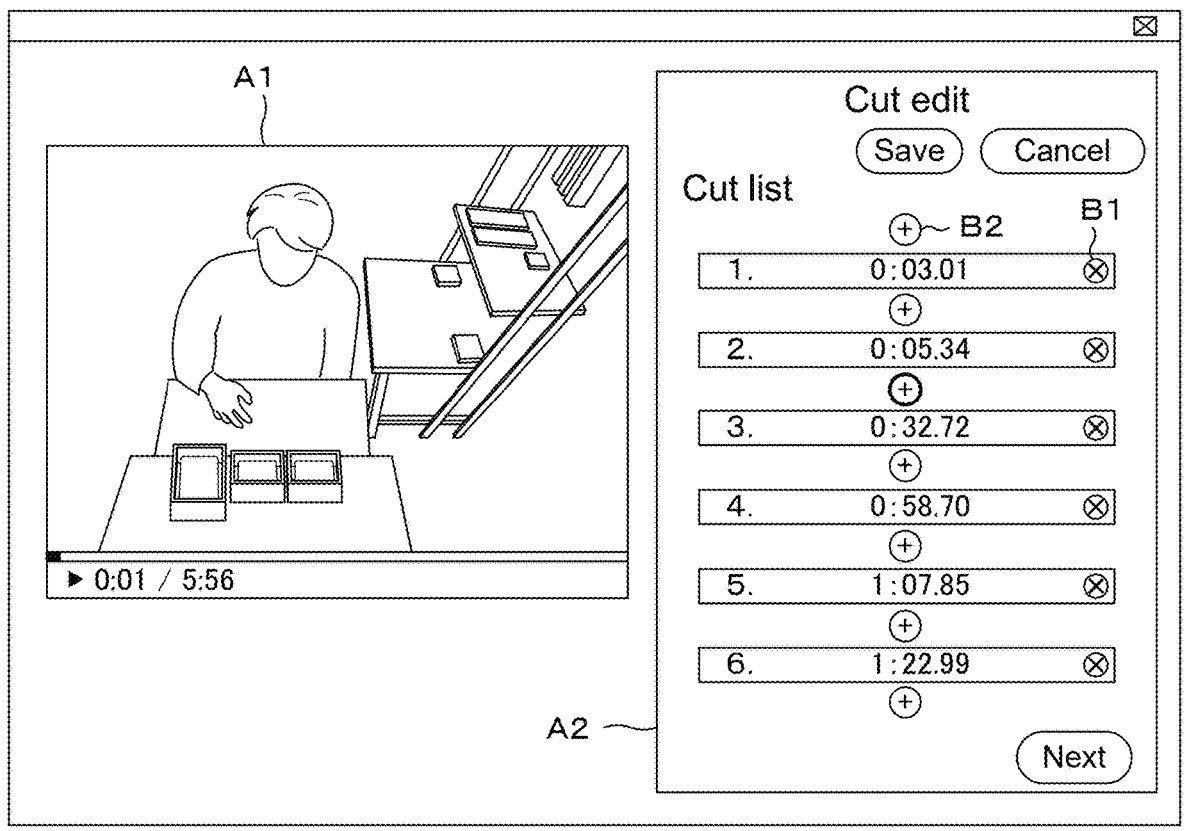
FIG. 6A is an explanatory diagram illustrating a screen example.
Figure 6B:
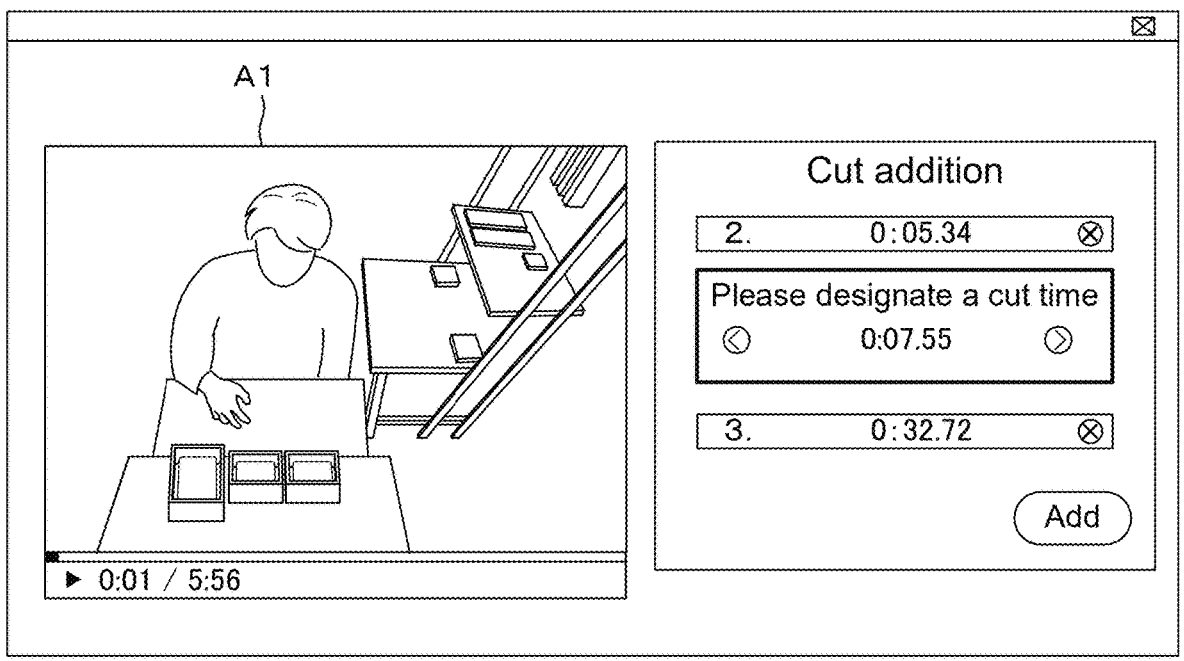
FIG. 6B is an explanatory diagram illustrating a screen example.
Figure 6C:
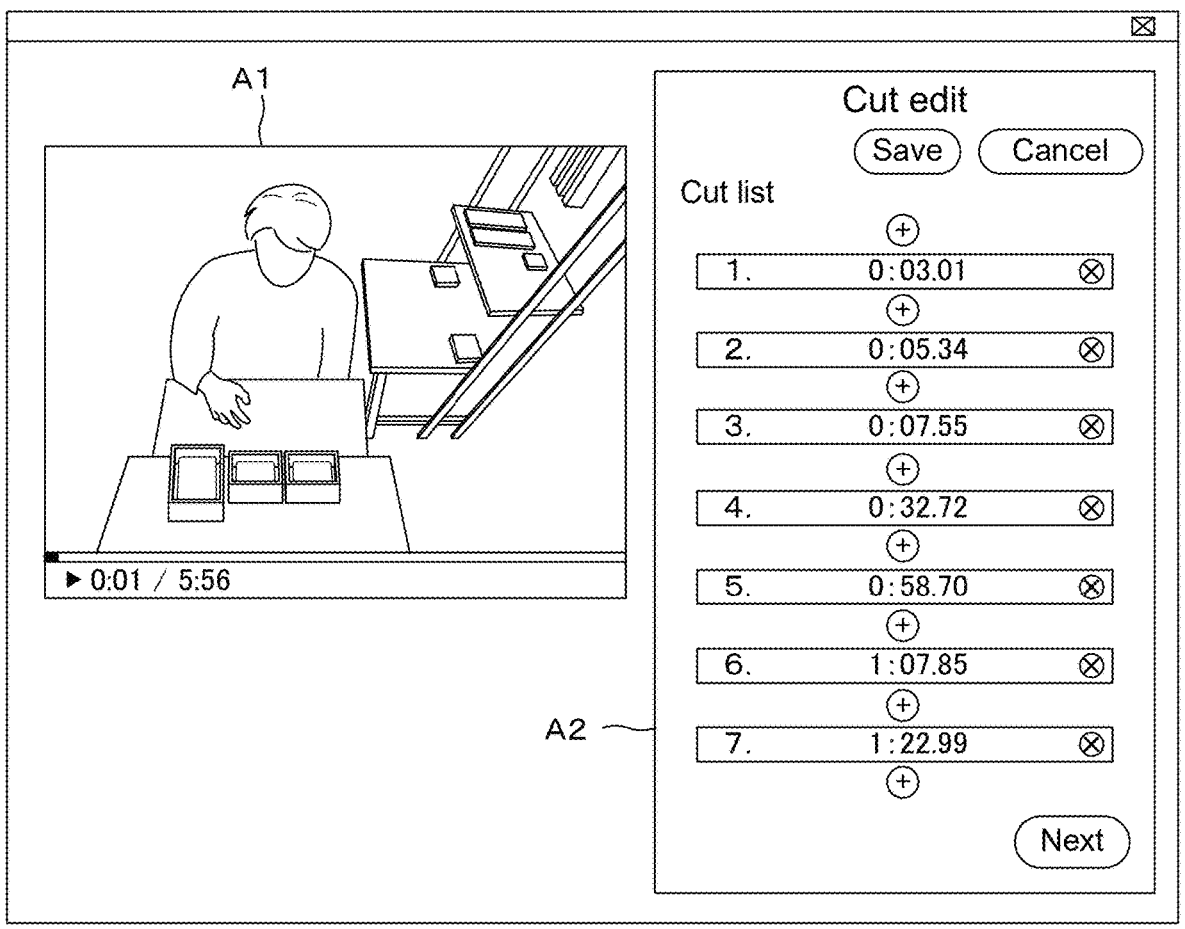
FIG. 6C is an explanatory diagram illustrating a screen example.

Hereinafter, in the information processing apparatus 10 of this embodiment, generation processing of the motion analysis model M4 will be described. FIG. 5 is a flowchart illustrating an example of a generation processing procedure of the motion analysis model M4, and FIG. 6A to FIG. 6C are explanatory diagrams illustrating a screen example. The following processing is executed by the control unit 11 of the information processing apparatus 10, in accordance with the program 12P stored in the storage unit 12.

In a case where the motion analysis model M4 for each breed is generated, the user selects the moving image for setting of the motion analysis model M4. The moving image for setting of the motion analysis model M4 is a moving image distributed to each motion included in each cycle (each operation element) by using the cycle prediction model M2 and the cut prediction model M3. The control unit 11 of the information processing apparatus 10 receives the selection of the moving image for setting of the motion analysis model M4, in accordance with a manipulation via the input unit 14 (S11). The control unit 11 inputs the selected moving image to the motion analysis model M4, distributes the moving image of the processing target to the motion moving image, on the basis of the output information from the motion analysis model M4, and extracts a cut candidate of each motion (S12). Specifically, the control unit 11 sequentially inputs each frame included in a moving image file 12a to the motion analysis model M4, and on the basis of the start time and the end time of each motion moving image output from the motion analysis model M4, specifies a time of the cut candidate of each motion.

In a case where the cut candidate of each motion moving image in the moving image of the processing target is extracted, the control unit 11 displays a cut editing screen as illustrated in FIG. 6A on the display unit 15 (S13). The cut editing screen is a screen for changing the time of the cut candidate of each motion based on the start time and the end time of each motion moving image output from the motion analysis model M4. The screen illustrated in FIG. 6A includes a moving image region A1 in which the moving image of the processing target is displayed, and an editing region A2 in which the time of the cut candidate extracted from the moving image is displayed. In the editing region A2, the start time of each motion moving image distributed from the moving image is displayed as the time of the cut candidate between the motion moving image and the immediately preceding motion moving image, and a delete button B1 (X button) for instructing the deletion of each cut candidate, and an add button B2 (+ button) for instructing the creation of a new cut between the cut candidates are provided. Note that it may be configured such that a name can be given to the cut of each motion, and in this case, in the editing region A2, the name given to each cut may be displayed together with the time of each cut candidate.

By the delete button B1 being manipulated in the editing region A2, the control unit 11 determines whether a deletion instruction with respect to any of the cut candidates is received (S14), and in a case where it is determined that the deletion instruction is received (S14: YES), the cut candidate instructed to be deleted is deleted (S15). In a case where the cut candidate is deleted, the control unit 11 deletes the cut candidate instructed to be deleted from the cut candidates displayed in the editing region A2, the cut candidates after the deleted cut candidate are displayed by being sequentially moved up. In a case where it is determined that the deletion instruction is not received (S14: NO), the control unit 11 skips step S15, and by the add button B2 being manipulated in the editing region A2, determines whether an addition instruction of the new cut is received (S16).

In a case where it is determined that the addition instruction of the new cut is received (S16: YES), the control unit 11 displays a cut addition screen as illustrated in FIG. 6B on the display unit 15 (S17). In the screen illustrated in FIG. 6A, the add button B2 between the second and third cut candidates is manipulated, and in this case, as illustrated in FIG. 6B, the cut addition screen for adding the new cut at any reproduction time in a time zone between the second and third cut candidates is displayed. Note that in a case where the time zone in which the cut output from the cut prediction model M3 can be set is acquired when generating the moving image for setting of the motion analysis model M4, the control unit 11 may display the time zone in which the cut can be set on the cut addition screen. In this case, the user is capable of designating a new cut time, in consideration of the time zone in which the cut can be set.

The user inputs a time desired to be set as the cut to the cut addition screen, and the control unit 11 receives the new cut time via the cut addition screen (S18). In a case where the add button is manipulated on the screen illustrated in FIG. 6B, the control unit 11 adds the cut to the received time (S19). In a case where the new cut is added, the control unit 11, as illustrated in FIG. 6C, adds the new cut between the second and third cut candidates, and displays the cut candidates after the added cut by sequentially moving down the cut candidates. In a case where it is determined that the addition instruction of the new cut is not received (S16: NO), the control unit 11 skips steps S17 to S19.

The control unit 11 determines whether a save button is manipulated on the screen illustrated in FIGS. 6A and 6C (S20), and in a case where it is determined that the save button is not manipulated (S20: NO), returns to step S14, and repeats the processing of steps S14 to S19. Note that in a case where a "next" button is manipulated on the screen illustrated in FIGS. 6A and 6C, the control unit 11 changes the display contents of the editing region A2 to the cut candidates after the cut candidate displayed on the last line. In addition, in a case where a cancel button is manipulated on the screen illustrated in FIGS. 6A and 6C, the control unit 11 suspends and ends editing processing of the cut candidate.

In a case where it is determined that the save button is manipulated (S20: YES), the control unit 11 determines the cut candidate edited (deleted and added) via the editing region A2 as the cut, and stores each cut time in the storage unit 12 (S21). Specifically, the control unit 11 stores a cut number indicating the appearance order of each cut and each cut time in association with each other, for example, in a DB provided in the storage unit 12. Note that in a case where the name is given to each cut, the name of each cut may be also stored. Then, the control unit 11 sets (optimizes) the parameters used in the arithmetic processing on the intermediate layer and the output layer of the motion analysis model M4, on the basis of each cut time (S22). Here, the control unit 11 sets the parameters of the motion analysis model M4 such that the moving image for setting input to the motion analysis model M4 can be distributed for each cut time stored in step S21. In addition, in a case where the moving image for setting is input, the control unit 11 sets the parameters of the motion analysis model M4 to output the analysis result indicating that it is the standard motion, with respect to each motion moving image, on the basis of the analysis result output by the motion analysis model M4. Accordingly, the motion analysis model M4 that distributes the moving image to the motion moving image when the moving image is input, and outputs the analysis result of whether the motion of each distributed motion moving image is the standard motion can be generated.

In the processing described above, by performing the deletion of the cut between the motion moving images extracted by using the motion analysis model M4, and the addition of the new cut, the cut between the motion moving images is edited. According to such a configuration, it is possible to accurately set the parameters of the motion analysis model M4, on the basis of the edited cut of between the motion moving images. In addition, a method for editing each cut is not limited to the processing described above, and for example, it may be configured such that the editing region A2 is capable of directly changing the time of each cut candidate.

FIG. 5 illustrates processing when setting the parameters of the motion analysis model M4, and the parameters of the cycle prediction model M2 and the cut prediction model M3 can also be set by the same processing. For example, in a case where the parameters of the cycle prediction model M2 are set, the control unit 11 inputs the moving image of the processing target to the cycle prediction model M2, distributes the moving image of the processing target to the cycle moving image, on the basis of the output information from the cycle prediction model M2, and extracts the cut candidate of each cycle. Then, the control unit 11 receives the editing of the cut candidate of each cycle moving image by the user, and is capable of setting the parameters of the cycle prediction model M2, on the basis of the edited cut time of each cycle moving image. In addition, in a case where the parameters of the cut prediction model M3 are set, the control unit 11 inputs the moving image of the processing target to the cut prediction model M3, distributes the moving image of the processing target to the motion moving image, on the basis of the output information from the cut prediction model M3, and extracts the cut candidate of each motion. Then, the control unit 11 receives the editing of the cut candidate of each motion, and is capable of setting the parameters of the cut prediction model M3, on the basis of the edited cut time of each motion.

Figure 7:
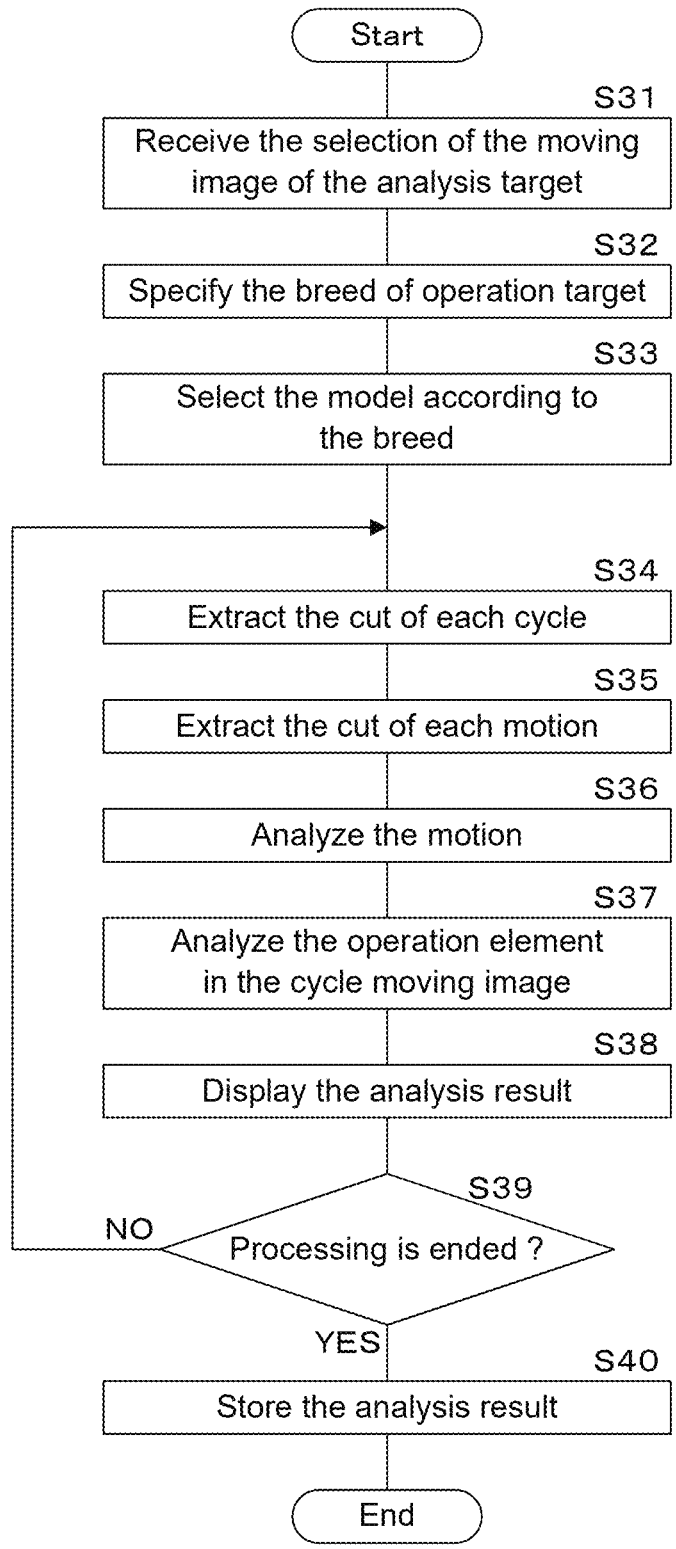
FIG. 7 is a flowchart illustrating an example of an analysis processing procedure of an operation.
Figure 8:
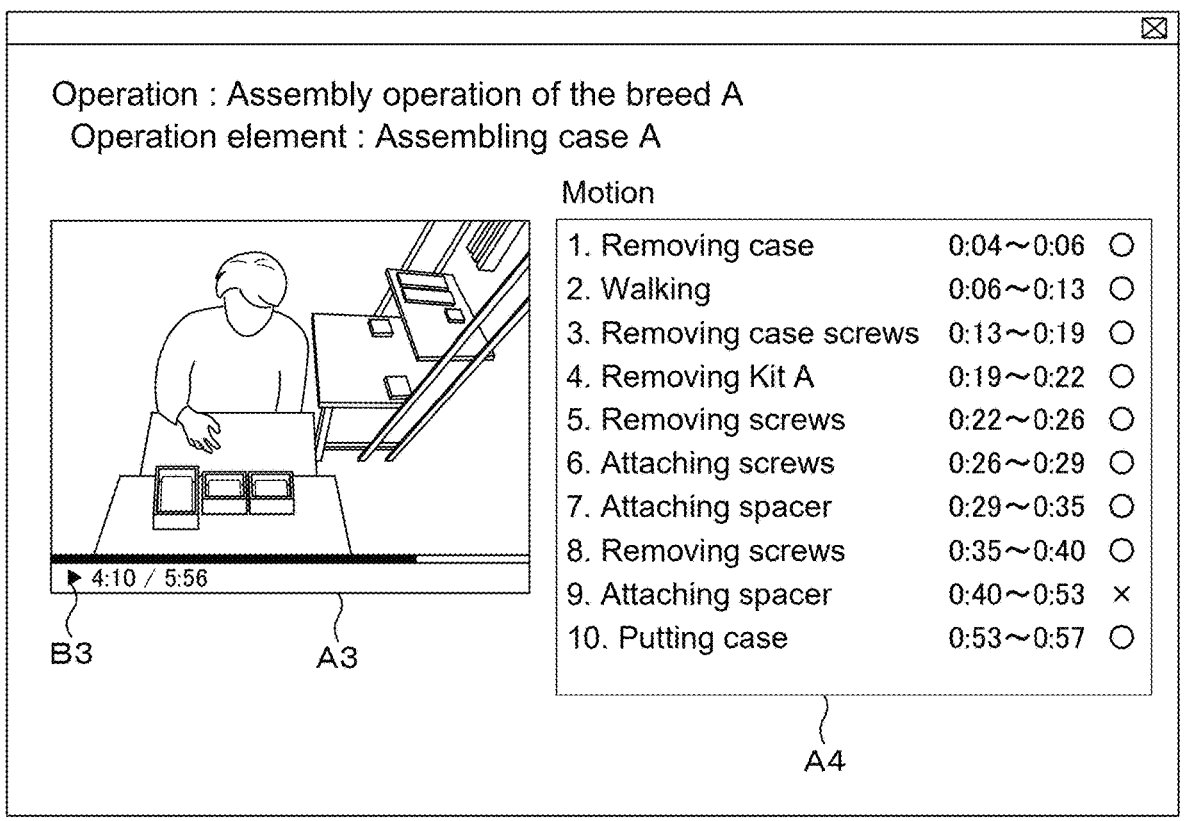
FIG. 8 is an explanatory diagram illustrating a screen example.

Next, processing of analyzing whether the operator is performing the standard operation, on the basis of the moving image obtained by capturing the operator performing the operation in the information processing apparatus 10 of this embodiment will be described. FIG. 7 is a flowchart illustrating an example of an analysis processing procedure of the operation, and FIG. 8 is an explanatory diagram illustrating a screen example. The following processing is executed by the control unit 11 of the information processing apparatus 10, in accordance with the program 12P stored in the storage unit 12.

In a case where whether the operation of the operator is the standard operation is analyzed, the user selects the moving image obtained by capturing the operator of the analysis target. The control unit 11 of the information processing apparatus 10 receives the selection of the moving image of the analysis target, in accordance with the manipulation via the input unit 14 (S31). The control unit 11 inputs the selected moving image (moving image file 12a) to the breed prediction model M1, and specifies the breed of product (operation target) on which the operator captured in the moving image of the analysis target is performing the assembly operation, on the basis of the output information from the breed prediction model M1 (S32). Specifically, the control unit 11 sequentially inputs each frame included in the moving image file 12a to the breed prediction model M1, and in a case where the maximum output value (certainty factor) from the breed prediction model M1 is a predetermined value or more (for example, 0.7 or more), specifies the breed corresponding to the output node outputting the maximum output value as the breed of product that is being assembled by the operator in the moving image. Note that the control unit 11 may specify the breed of operation target without using the breed prediction model M1. For example, in a case where goods different for each breed are included in the operation target, the control unit 11 is capable of detecting the goods included in the moving image, and specifying the breed, in accordance with the detected goods.

In a case where the breed being assembled by the operator is specified, the control unit 11 selects the cycle prediction model M2, the cut prediction model M3, and the motion analysis model M4 according to the specified breed (S33). Note that a plurality of cycle prediction models M2, a plurality of cut prediction models M3, and a plurality of motion analysis models M4 are prepared for each breed. The control unit 11 distributes the moving image of the analysis target to the cycle moving image by using the selected cycle prediction model M2, and extracts the cut of each cycle (S34). Here, the control unit 11 sequentially inputs each frame included in the moving image file 12a to the cycle prediction model M2, and specifies (predicts) the start time and the end time of each cycle moving image included in the moving image, on the basis of the output information from the cycle prediction model M2. Note that it may be configured such that after the processing of step S34, the control unit 11 displays an editing screen (refer to FIG. 6A to FIG. 6C) for performing change processing (deletion, new addition, and the like) on the cut of each cycle extracted from the moving image on the display unit 15, and a change instruction of the cut time of each cycle is received via the editing screen to perform a change.

Next, the control unit 11 (a distribution unit) distributes the moving image from which the cut of each cycle is extracted to the motion moving image obtained by capturing the motion performed by the operator, using the cut prediction model M3 selected in step S33, and extracts the cut of each motion (S35). Here, the control unit 11 sequentially inputs each frame included in the moving image distributed to the cycle moving image to the cut prediction model M3, and specifies (predicts) the start time and the end time of each motion moving image included in each cycle moving image, on the basis of the output information from the cut prediction model M3. Note that it may be configured such that after the processing of step S35, the control unit 11 displays an editing screen (refer to FIG. 6A to FIG. 6C) for performing change processing (deletion, new addition, and the like) on the cut (a distribution position) of each motion extracted from the moving image on the display unit 15, and a change instruction of the cut time of each motion is received via the editing screen to perform a change.

Next, the control unit 11 analyzes whether the motion of the operator captured in each motion moving image included in the moving image is the standard motion, on the basis of the moving image from which the cut of each motion is extracted, using the motion analysis model M4 selected in step S33 (S36). Here, the control unit 11 sequentially inputs each frame included in the moving image to the motion analysis model M4, and specifies (predicts) the start time and the end time of each motion moving image included in the moving image, and the analysis result indicating whether the motion of the operator included in each motion moving image is the standard motion, on the basis of the output information from the motion analysis model M4. The control unit 11 (a determination unit) is capable of determining whether the motion performed by the operator is the standard motion, on the basis of the analysis result.

The control unit 11 (an analysis unit) analyzes whether the operation element performed by the operator captured in the cycle moving image is the standard operation for each cycle moving image in the moving image, on the basis of the analysis result with respect to the motion moving image included in the cycle moving image (S37). Here, in a case where the analysis result that it is not the standard motion is obtained for any of the motion moving images included in the cycle moving image, the control unit 11 determines that the operation element of the operator in the cycle moving image is not the standard operation. For example, in a case where there is a deficit in any of the motion moving images included in the cycle moving image obtained by capturing one operation element, the control unit 11 determines that the operation element of the operator in the cycle moving image is not the standard operation, as a motion miss. In addition, in a case where the appearance order of any of the motion moving images in the cycle moving image is different, the control unit 11 determines that the operation element of the operator in the cycle moving image is not the standard operation, as a sequence switch. In addition, in a case where the motion of the operator in any of the motion moving images included in the cycle moving image is a motion different from the standard motion, the control unit 11 determines that the operation element of the operator in the cycle moving image is not the standard operation, as an abnormal movement. In addition, the control unit 11 determines that the motion time is long and the operation element of the operator in the cycle moving image is not the standard operation in a case where the time (the motion time according to the operator) in any of the motion moving images included in the cycle moving image is longer than the standard motion time set in advance by a predetermined time or more, and determines that the motion time is short and the operation element of the operator in the cycle moving image is not the standard operation in a case where the time is shorter than the standard motion time by a predetermined time or more. Such analysis processing may be performed by using the factor classification model M5. In this case, the control unit 11 inputs the cycle moving image to the factor classification model M5, and analyzes whether the operation element is the standard operation, on the basis of the output information from the factor classification model M5. Note that motion contents that are not the standard operation are not limited to the example described above. In a case where the analysis result that it is the standard motion is obtained with respect to all the motion moving images included in the cycle moving image, the control unit 11 determines that the operation element of the operator in the cycle moving image is the standard operation.

The control unit 11 displays the analysis result with respect to each cycle moving image on the display unit 15 (S38). For example, the control unit 11 generates an analysis result screen as illustrated in FIG. 8, and displays the analysis result screen on the display unit 15. The analysis result screen illustrated in FIG. 8 includes a moving image region A3 in which the moving image of the analysis target is displayed, and a result region A4 in which the analysis result with respect to the motion included in the operation element performed by the operator in the moving image is displayed. In the result region A4, a motion number indicating the appearance order for the motion performed by the operator in each motion moving image distributed from the moving image, a name given to each motion, and the analysis result are displayed. The analysis result includes a motion time required to execute each motion, and a mark (O or X) indicating whether each motion is the standard motion. Note that in the moving image region A3, a reproduction stop button B3 for instructing the reproduction and the stop of the moving image that is being displayed is provided, and in a case where the reproduction is instructed via the reproduction stop button B3, the control unit 11 reproduces the moving image of the analysis target in the moving image region A3, and displays the analysis result with respect to each motion moving image analyzed on the basis of the reproduced moving image in the result region A4. Accordingly, it is possible to grasp the analysis result while checking the motion of the operator by the reproduced moving image.

According to the processing described above, the information processing apparatus 10 recognizes the operation element performed by the operator and each motion included in each operation element, on the basis of the moving image obtained by capturing the operator, analyzes whether it is the standard motion for each motion, and analyzes whether each operation element is the standard operation, on the basis of the analysis result of each motion. As described above, the operation performed by the operator is distributed to a motion unit such that suitability (specifically, whether it is the standard motion) is determined for each motion, and by using the result thereof, the suitability with respect to the operation element (an operation for one cycle) of the operator can be more accurately determined. In addition, the suitability of each motion is determined by using the motion analysis model M4, and thus, whether the standard motion is performed is determined in consideration of not only the motion time of each motion but also the motion contents (the movement of the operator). Accordingly, it is possible to accurately analyze whether the operator is performing the standard motion (an operation according to a regulation) set in advance for the motion analysis model M4. In addition, on the basis of the result that the suitability is determined for each motion, it is possible to present a motion that is not suitable and an operation element including the motion that is not suitable, and thus, it is easy to provide improvement guidance to the operator.

The control unit 11 determines whether the processing described above is ended with respect to all the frames included in the moving image of the analysis target (S39), and in a case where it is determined that the processing is not ended (S39: NO), returns to the processing of step S34, and repeats the processing of steps S34 to S38. Accordingly, it is possible to analyze whether each operation element performed by the operator is suitable, on the basis of each cycle moving image included in the moving image of the analysis target, and present the obtained analysis result to the user.

In a case where it is determined that the processing described above on the moving image of the analysis target is ended (S39: YES), the control unit 11 stores the analysis result in association with the moving image of the analysis target in the storage unit 12 (S40). For example, the control unit 11 stores identification information (for example, the cycle number indicating the appearance order), the cut time of each cycle, and the analysis result with respect to the operation element (the cycle) for the each cycle moving image extracted from the moving image of the analysis target, and identification information (for example, the motion number indicating the appearance order), the cut time of each motion, and the analysis result with respect to the motion for each motion moving image in each cycle moving image, in the DB provided in the storage unit 12. According to the processing described above, whether the operator is performing the standard motion set in advance in the motion analysis model M4 is analyzed on the basis of the moving image obtained by capturing the operator performing the operation, and the analysis result is displayed and presented to the user.

In the processing described above, the breed that is being operated by the operator is specified on the basis of the moving image of the analysis target, and analysis processing using the motion analysis model M4 prepared for each breed is executed. Accordingly, for example, even in a case where assembly operations of a plurality of different types of breeds are performed at the same operation site, the analysis processing for each breed is available, and the user performing the analysis processing is capable of accurately performing the analysis processing with respect to each moving image without being aware of the breed in each moving image.

Figure 9:
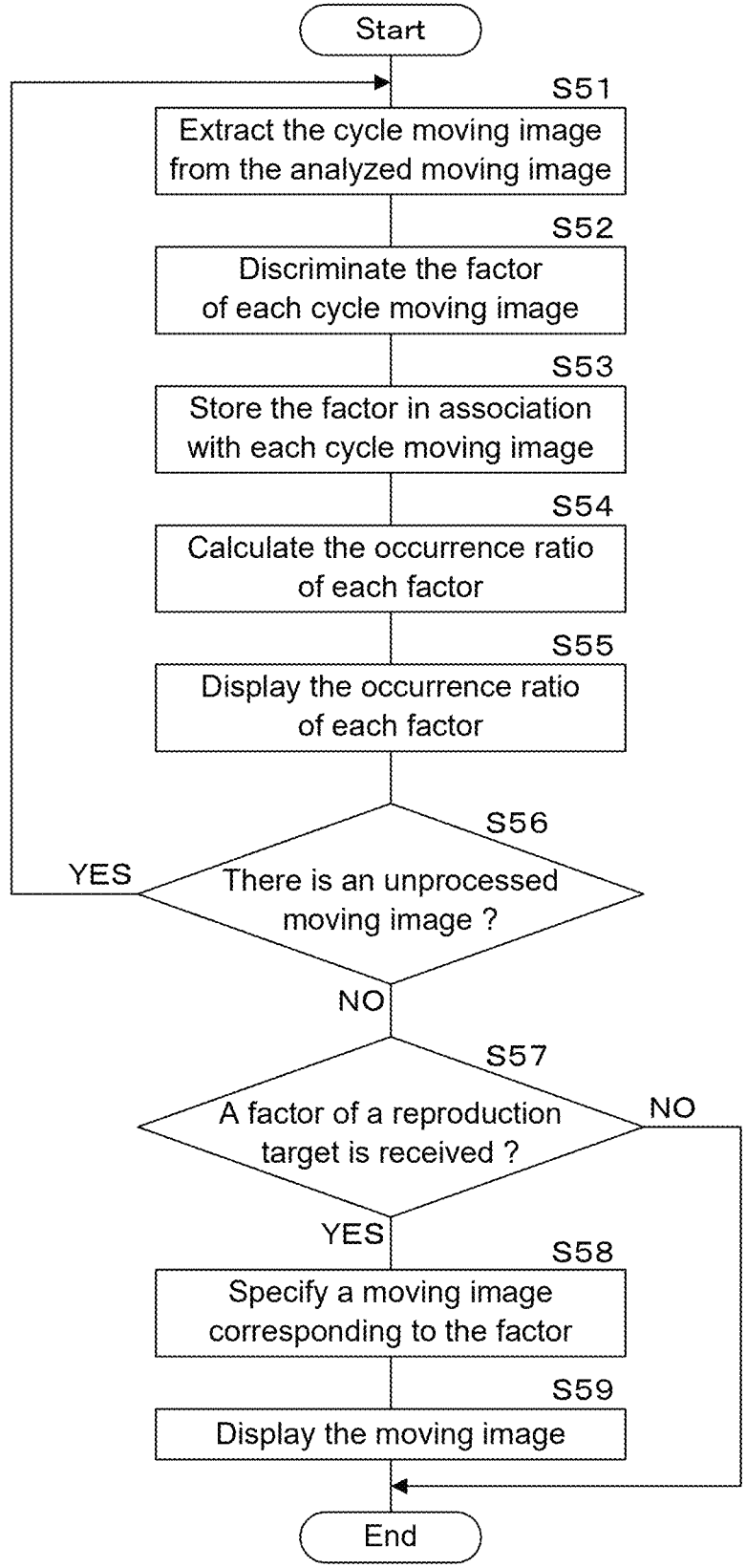
FIG. 9 is a flowchart illustrating an example of an analysis processing procedure of a factor with respect to each operation element.
Figure 10B:
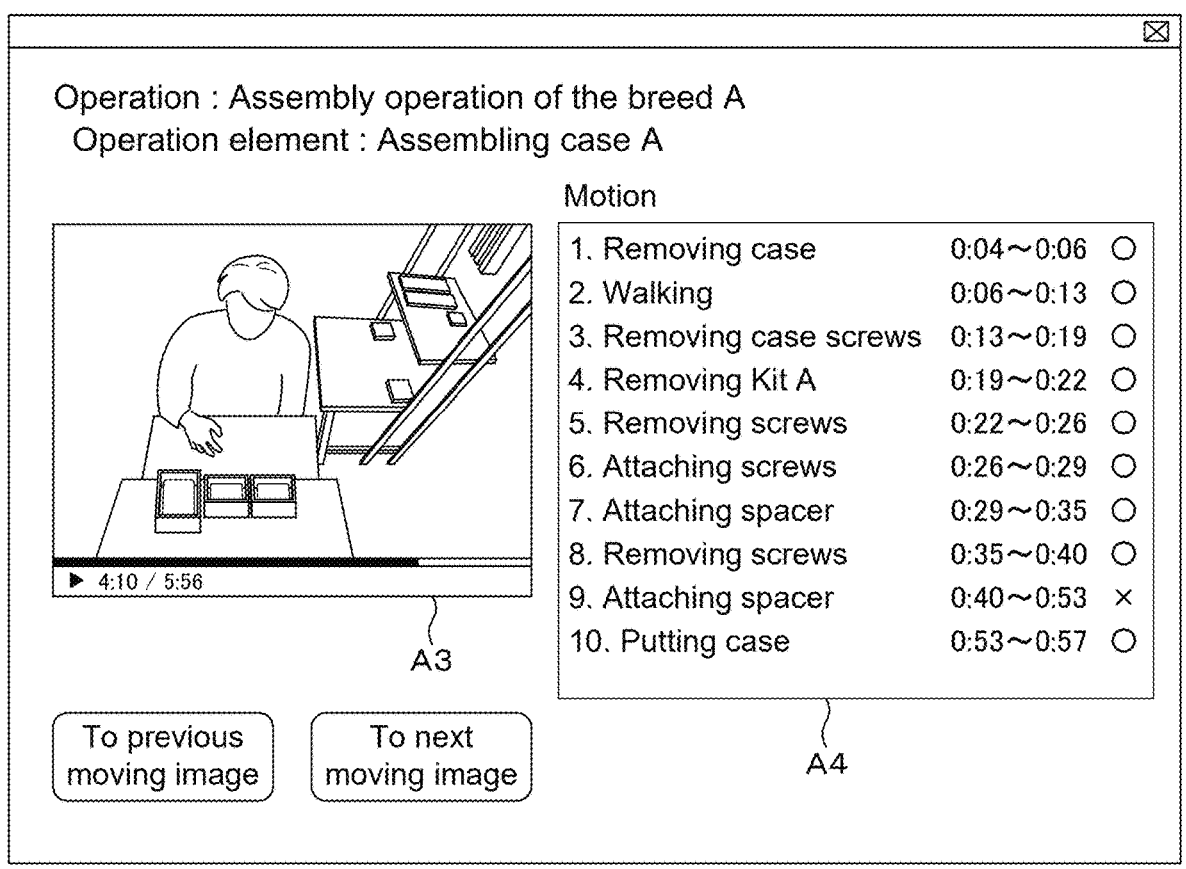
FIG. 10B is an explanatory diagram illustrating a screen example.

The analysis result with respect to each moving image by the analysis processing described above can be used to grasp the tendency of the operation contents performed by the operator and consider an improvement plan with respect to the assembly operation. For example, the tendency of each factor in a case where the operation element in each cycle moving image is not the standard operation can be analyzed from the analysis result with respect to each cycle moving image included in each moving image to take measures. FIG. 9 is a flowchart illustrating an example of an analysis processing procedure of the factor with respect to each operation element, and FIG. 10A and FIG. 10B are explanatory diagrams illustrating a screen example. The following processing is executed by the control unit 11 of the information processing apparatus 10, in accordance with the program 12P stored in the storage unit 12.

In a case where the occurrence status of the factor when it is not the standard operation is analyzed for each operation element performed by the operator, the user selects the moving image obtained by capturing the operator of the analysis target, which is a moving image after the analysis processing of each operation element is executed by the processing in FIG. 7. Here, the moving image of the processing target is a moving image obtained by capturing the operator performing the assembly operation of the product of one breed of product. Note that the following processing may be executed to analyze the operation contents of one operator, on the basis of a plurality of times of operations performed by the one operator, or may be executed to analyze the operation contents of a plurality of operators, on the basis of operations performed by the plurality of operators.

The control unit 11 extracts the cycle moving image from the moving image of the processing target (S51), and discriminates the factor that the operation element performed by the operator in the cycle moving image is not assumed as the standard operation, on the basis of the extracted cycle moving image (S52). Here, the control unit 11 sequentially inputs each frame included in the cycle moving image to the factor classification model M5, and discriminates the factor that the operation of the operator in the cycle moving image is not assumed as the standard operation, on the basis of the output information from the factor classification model M5. Note that the control unit 11 may discriminate the factor that the operation element performed by the operator in each cycle moving image is not assumed as the standard operation, on the basis of the analysis result with respect to each cycle moving image obtained by the analysis processing illustrated in FIG. 7. The control unit 11 discriminates any factor of a motion miss, a sequence switch, an abnormal movement, a long motion time, and a short motion time. The control unit 11 stores the cycle moving image of the processing target and the discriminated factor in association with each other, in the storage unit 12 (S53). For example, the control unit 11 stores the cycle number of each cycle moving image and the discriminated factor in association with each other.

Next, the control unit 11 calculates the occurrence ratio of each factor, on the basis of the discriminated factor (S54), and displays the calculated occurrence ratio of each factor on the display unit 15 (S55). For example, the control unit 11 generates a factor screen as illustrated in FIG. 10A, and displays the factor screen on the display unit 15. In the factor screen illustrated in FIG. 10A, a list of the operation elements included in the assembly operation of the breed A is displayed, and an appearance order (a cycle number), a name, and the occurrence ratio of each factor are displayed for each operation element. Note that the occurrence ratio of each factor includes a ratio of the cycle moving image discriminated as being the standard operation, in addition to a ratio of the cycle moving image discriminated as not being the standard operation. In a case where the factor based on the analysis result with respect to each motion moving image is already discriminated, and is stored in the storage unit 12 together with the moving image, the control unit 11 may read out the factor based on the analysis result from the storage unit 12 without performing the processing of steps S52 to S53, and may perform the processing of steps S54 to S55.

The control unit 11 determines whether there is an unprocessed moving image on which the processing of steps S51 to S55 is not executed (S56), and in a case where it is determined that there is the unprocessed moving image (S56: YES), returns to the processing of step S51, and executes the processing of steps S51 to S55 on the unprocessed moving image. In a case where it is determined that there is no unprocessed moving image (S56: NO), the control unit 11 proceeds to the processing of step S57.

It is configured such that the screen illustrated in FIG. 10A receives, via each factor with respect to each operation element, a reproduction instruction of a moving image for which each factor occurs. For example, by the user performing a predetermined manipulation (for example, left-clicking a mouse) on any of the factors of any of the operation elements, it is possible to perform the reproduction instruction with respect to the moving image for which the manipulated factor occurs. In FIG. 10A, the control unit 11, for an operation element with a cycle number of 1, receives the reproduction instruction with respect to the moving image for which the factor of the motion miss occurs, in accordance with the manipulation of a cursor as illustrated with an arrow A5. The control unit 11 determines whether a factor of a reproduction target is received (S57), and in a case where it is determined that the factor is received (S57: YES), specifies a moving image for which the selected factor occurs (a moving image corresponding to the factor) (S58). Here, the control unit 11 searches for the moving image for which the selected factor with respect to the operation element occurs, from the moving images stored in the storage unit 12. Then, the control unit 11 reads out the searched moving image from the storage unit 12, and displays the moving image on the display unit 15 (S59). For example, the control unit 11 displays an analysis result screen as illustrated in FIG. 10B on the display unit 15. The screen illustrated in FIG. 10B has the same configuration as that of the screen illustrated in FIG. 8, and further includes a "to previous moving image" button and a "to next moving image" button. The control unit 11 is configured to sequentially reproduce a plurality of moving images specified in step S58, and in a case where the "to previous moving image" button is manipulated via the screen illustrated in FIG. 10B, the display contents of the moving image region A3 and the result region A4 are changed to the immediately previously displayed moving image and the analysis result with respect to the moving image. In addition, in a case where the "to next moving image" button is manipulated, the control unit 11 changes the display contents of the moving image region A3 and the result region A4 to a moving image to be displayed next and the analysis result with respect to the moving image. Note that the control unit 11 may be configured to reproduce the plurality of moving images specified in step S58 in any order, and for example, may reproduce each moving image in chronological order or in reverse chronological order of a recording date and time, may collectively reproduce the moving images of each operator for each operator, or may perform random reproduction. In addition, a plurality of moving image regions A3 may be provided on the screen illustrated in FIG. 10B, and in each moving image, the cycle moving image for which selected factor occurs may be displayed in synchronization in each of the moving image regions A3.

In a case where it is determined that the factor of the reproduction target is not received (S57: NO), the control unit 11 skips the processing of steps S58 to S59, and ends the processing described above. According to the processing described above, it is possible to group each cycle moving image included in the moving image for each factor that it is not assumed as the standard operation, and analyze the occurrence ratio of each factor. In addition, for each factor, the moving image for which each factor occurs can be reproduced, and thus, the improvement plan can be efficiently considered for each cycle moving image (operation element).

In this embodiment, for each moving image, the analysis result of whether it is the standard operation is obtained for each cycle (operation element), and the analysis result of whether it is the standard motion is obtained for each motion included in each cycle. Accordingly, it is possible to search for the moving image, on the basis of the analysis result with respect to each motion moving image, in addition to the analysis result with respect to each cycle moving image. For example, it is possible to search for the moving image in which a predetermined motion (for example, the first motion) is discriminated as not being the standard motion for a predetermined cycle (for example, the first operation element). Accordingly, when verifying the operation contents of each operator, search processing considering the analysis result for each cycle and the analysis result for each motion is available, and thus, efficient verification processing can be attained.

Figure 11:
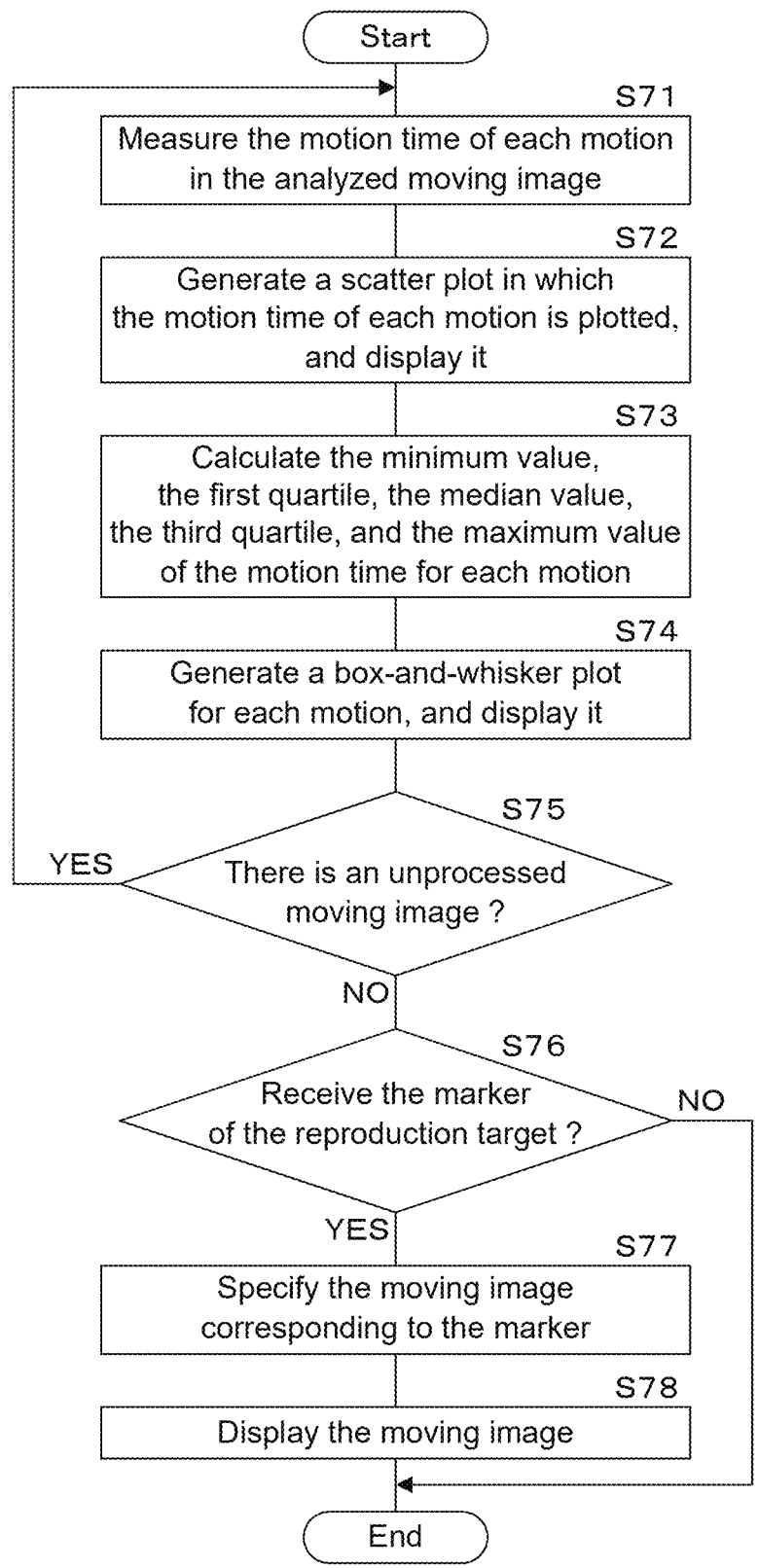
FIG. 11 is a flowchart illustrating an example of an analysis processing procedure of a motion time of each motion.
Figure 12:
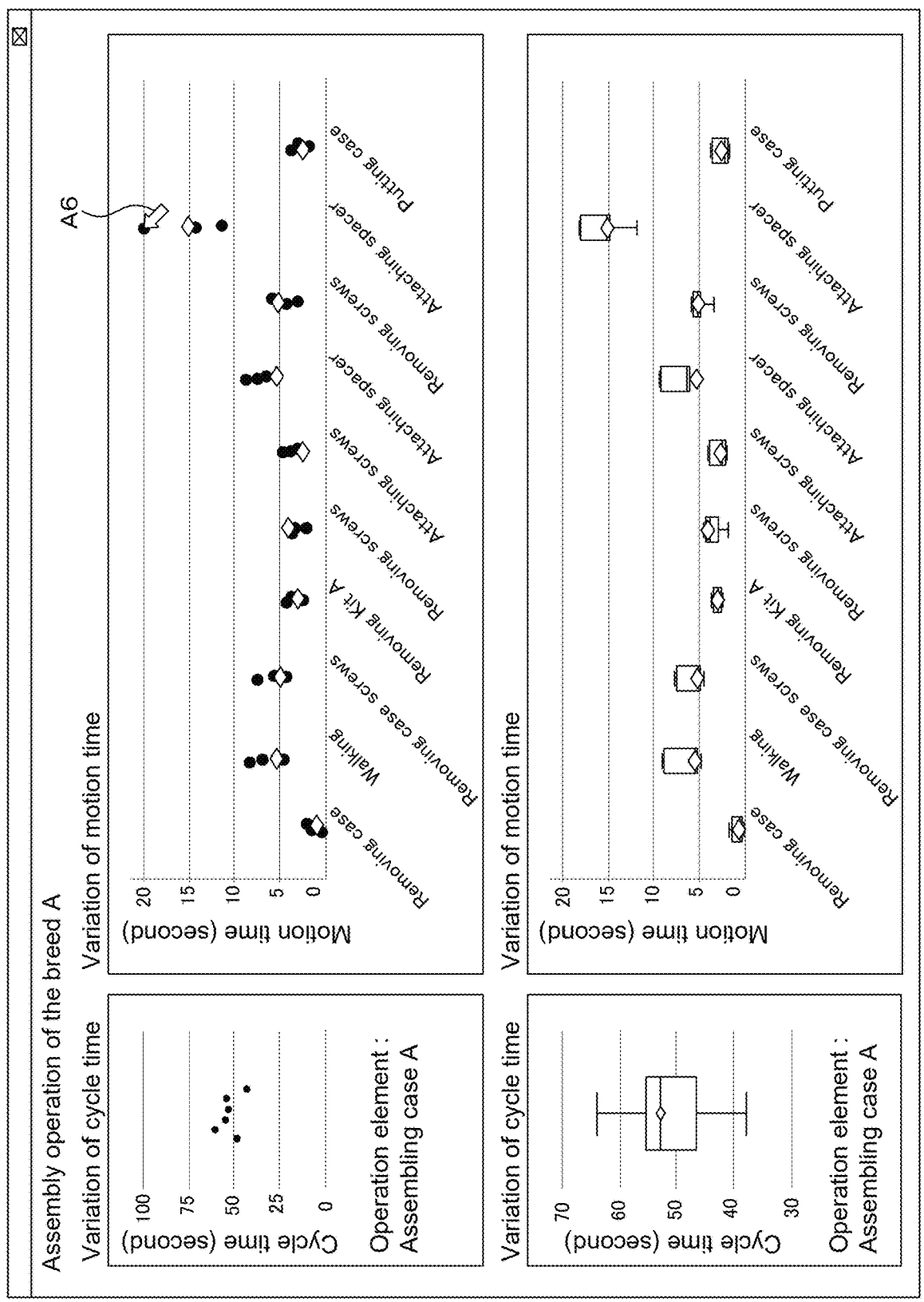
FIG. 12 is an explanatory diagram illustrating a screen example.

Next, processing of analyzing the variation of the motion time of the motion included in each operation element from the analysis result with respect to each motion moving image included in the moving image will be described. FIG. 11 is a flowchart illustrating an example of an analysis processing procedure of the motion time of each motion, and FIG. 12 is an explanatory diagram illustrating a screen example. The following processing is executed by the control unit 11 of the information processing apparatus 10, in accordance with the program 12P stored in the storage unit 12.

In a case where the variation of the motion time is analyzed for each motion performed by the operator, the user selects the moving image of the analysis target, which is a moving image after the analysis processing of each motion is executed by the processing in FIG. 7. Here, the moving image of the processing target is also the moving image obtained by capturing the operator performing the assembly operation of one breed of product, and may be a plurality of moving images obtained by capturing one operator, or may be a moving image obtained by capturing a plurality of operators.

The control unit 11 measures the motion time of each motion, on the basis of each motion moving image included in the moving image of the processing target (S71). For example, the control unit 11 acquires the motion number, and the start time and the end time (each cut time) of each motion moving image from each moving image. Then, the control unit 11 calculates a time from the start time to the end time for each motion moving image. The control unit 11 generates a scatter plot (chart) in which the motion time calculated for each motion is plotted in association with each motion, and displays the scatter plot on the display unit 15 (S72). For example, the control unit 11 generates and displays a scatter plot as illustrated in the upper right portion of the screen in FIG. 12. The scatter plot illustrated in the upper right portion of FIG. 12 displays the variation of the motion time for each motion included in the operation element of "assembling case A" included in the assembly operation of the breed A. Specifically, each position on a horizontal axis is associated with each motion, and a vertical axis indicates the motion time of each motion, and the motion time of each motion is plotted in association with each position on the horizontal axis. Note that the control unit 11 measures the standard motion time of each motion, on the basis of each motion moving image in the moving image obtained by capturing the operator performing the standard operation, which is used as the moving image for setting of the motion analysis model M4, and plots the measured standard motion time of each motion on the scatter plot into the shape of a white diamond. Accordingly, it is possible to present the standard motion time of each motion, and easily grasp a comparison result of the motion time of each operator with respect to the standard motion time.

Note that in a case where the motion time of each motion is measured for one cycle moving image, the control unit 11 adds up each motion time to calculate the motion time (the cycle time) in the operation element. Then, the control unit 11, as illustrated in the upper left portion of the screen in FIG. 12, also generates and displays a scatter plot in which the calculated cycle time is plotted. Accordingly, it is possible to present the variation of the cycle time required for the operation element (the cycle), in addition to the variation of the motion time of each motion.

Next, the control unit 11, for each motion, calculates the minimum value, the first quartile, the median value, the third quartile, and the maximum value of the motion time, on the basis of the motion time measured in step S71 (S73). Then, the control unit 11 generates a box-and-whisker plot (chart) illustrating the variation of the motion time of each motion, on the basis of each value calculated for each motion, and displays the box-and-whisker plot on the display unit 15 (S74). For example, the control unit 11 generates and displays the box-and-whisker plot as illustrated in the lower right portion of the screen in FIG. 12. In the box-and-whisker plot illustrated in the lower right portion of FIG. 12, as with the scatter plot, each position on a horizontal axis is associated with each motion, and a vertical axis indicates the motion time of each motion, and a variation in the motion time is expressed by boxes and whiskers indicating the minimum value, the first quartile, the median value, the third quartile, and the maximum value of the motion time of each motion, respectively. Here, the control unit 11 also plots the standard motion time of each motion on the box-and-whisker plot into the shape of a white diamond. In addition, the control unit 11 also calculates the minimum value, the first quartile, the median value, the third quartile, and the maximum value for the cycle time, and as illustrated in the lower left portion of the screen in FIG. 12, generates a box-and-whisker plot illustrating the variation of the cycle time, on the basis of each of the calculated values, and displays the box-and-whisker plot on the display unit 15.

The control unit 11 determines whether there is an unprocessed moving image on which the processing of steps S71 to S74 is not executed (S75), and in a case where it is determined that there is the unprocessed moving image (S75: YES), returns to the processing of step S71, and executes the processing of steps S71 to S74 on the unprocessed moving image. In a case where it is determined that there is no unprocessed moving image (S75: NO), the control unit 11 proceeds to the processing of step S76.

It is configured such that the scatter plot in the screen illustrated in FIG. 12 receives, via each plotted point (marker), a reproduction instruction of a moving image corresponding to each marker. For example, by the user performing a predetermined manipulation (for example, left-clicking a mouse) on any of the markers, it is possible to perform the reproduction instruction with respect to the moving image corresponding to the manipulated marker. In FIG. 12, the control unit 11 receives the reproduction instruction of the moving image corresponding to the selected marker, in accordance with the manipulation of the cursor as illustrated with an arrow A6. The control unit 11 determines whether the marker of the reproduction target is received (S76), and in a case where it is determined that the marker is received (S76: YES), specifies the moving image corresponding to the selected marker (S77). In the scatter plot, identification information of the moving image (for example, a moving image ID allocated to the moving image) is associated with the marker plotted in association with each motion, and thus, the control unit 11 is capable of specifying the moving image corresponding to the marker by specifying the identification information of the moving image corresponding to the selected marker. Accordingly, the control unit 11 is capable of specifying the moving image of the reproduction target selected via the marker in the scatter plot from the moving images stored in the storage unit 12.

Then, the control unit 11 reads out the specified moving image from the storage unit 12, and displays the moving image on the display unit 15 (S78). In this case, the control unit 11 displays the analysis result screen as illustrated in FIG. 8, on the basis of the specified moving image. Note that the control unit 11 may display a motion moving image corresponding to the selected marker in the specified moving image. In this case, it is possible to check the selected motion moving image of the motion. In a case where it is determined that the marker of the reproduction target is not received (S76: NO), the control unit 11 skips the processing of steps S77 to S78, and ends the processing described above. According to the processing described above, for each cycle moving image included in the moving image, it is possible to present a variation in the motion time of each motion included in the cycle moving image together with a variation in the cycle time by the scatter plot or the box-and-whisker plot. In addition, it is possible to reproduce the moving image selected via each marker in the scatter plot. Accordingly, it is possible to consider the improvement plan for each operation element or for each motion, in consideration of a variation in the cycle time of each operation element and a variation in the motion time of each motion.

Figure 13:
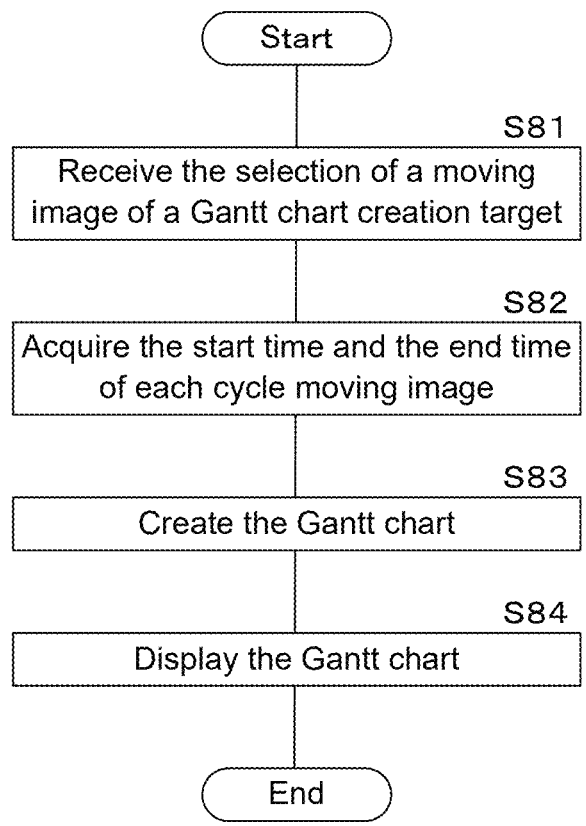
FIG. 13 is a flowchart illustrating an example of a creation processing procedure of a Gantt chart.
Figure 14:
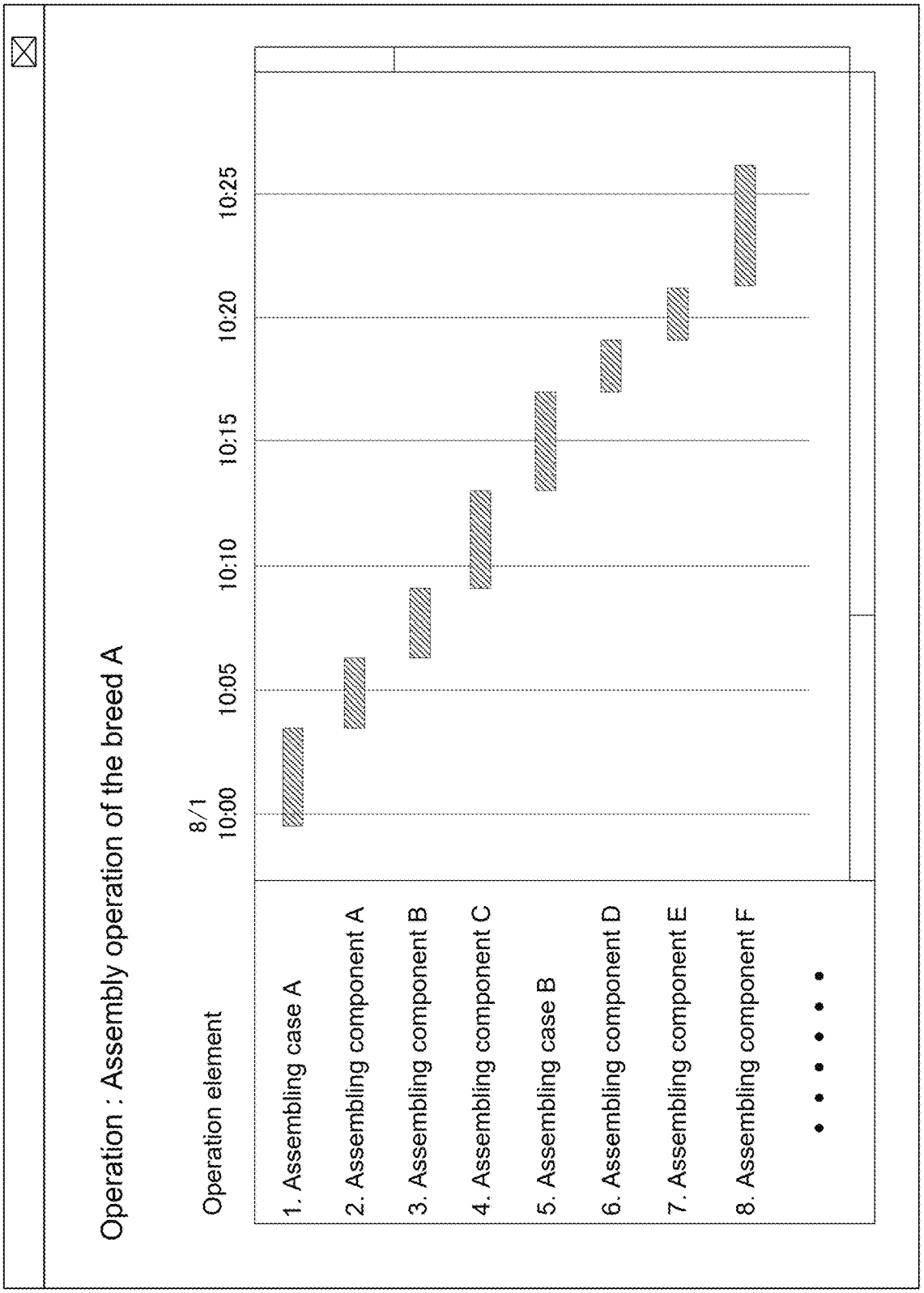
FIG. 14 is an explanatory diagram illustrating a screen example of the Gantt chart.

Next, processing of creating a Gantt chart indicating a progress status of each operation element performed by the operator in the moving image, using a result of distributing the moving image to the cycle moving image, will be described. FIG. 13 is a flowchart illustrating an example of a creation processing procedure of the Gantt chart, and FIG. 14 is an explanatory diagram illustrating a screen example of the Gantt chart. The following processing is executed by the control unit 11 of the information processing apparatus 10, in accordance with the program 12P stored in the storage unit 12.

In a case where the Gantt chart indicating the progress status of each operation element performed by the operator is created, the user selects the moving image of the processing target. Here, the moving image of the processing target is a moving image after being distributed to the cycle moving image by using the cycle prediction model M2, and for example, may be the moving image after the analysis processing of each operation element is executed by the processing in FIG. 7. The control unit 11 receives the selection of a moving image of a Gantt chart creation target, in accordance with the manipulation via the input unit 14 (S81). The control unit 11 acquires the start time and the end time of each cycle moving image distributed from the selected moving image (S82). In the moving image distributed to the cycle moving image, the start time and the end time of each cycle moving image (the cut time of each cycle) are stored in association with the moving image in the storage unit 12, and the control unit 11 reads out the start time and the end time of each cycle moving image from the storage unit 12.

The control unit 11 creates a band graph (a bar) indicating an execution time zone from an operation start timing to an operation end timing of each operation element, on the basis of the acquired start time and end time of each cycle moving image, and creates the Gantt chart (a chart) in which the created band graphs of each operation element are arranged (S83). For example, the control unit 11 creates the Gantt chart as illustrated in FIG. 14. In the Gantt chart illustrated in FIG. 14, the name of the operation element included in the assembly operation of the breed A is displayed in an up-and-down direction, a horizontal axis indicates a date and time, and the band graph indicating the execution time zone of each operation element is displayed in association with each operation element. The control unit 11 displays the created Gantt chart on the display unit 15 (S84). According to such a Gantt chart, it is possible to easily grasp the progress status of the operation by the each operator. The Gantt chart illustrated in FIG. 14 may be configured such that, for example, in a case where each operation element is selected, the band graph indicating the start time and the end time of each motion included in the selected operation element is displayed. In this case, it is possible to provide the Gantt chart that is capable of presenting the progress status for each motion included in each operation element, in addition to the progress status for each operation element. Note that in a case where the Gantt chart is created on the basis of the moving image obtained by capturing the operator performing the standard operation, a process sheet (a standard operation combination table) can be created in which the order and the standard operation time of each operation element included in a series of operations are regulated.

Figure 15:
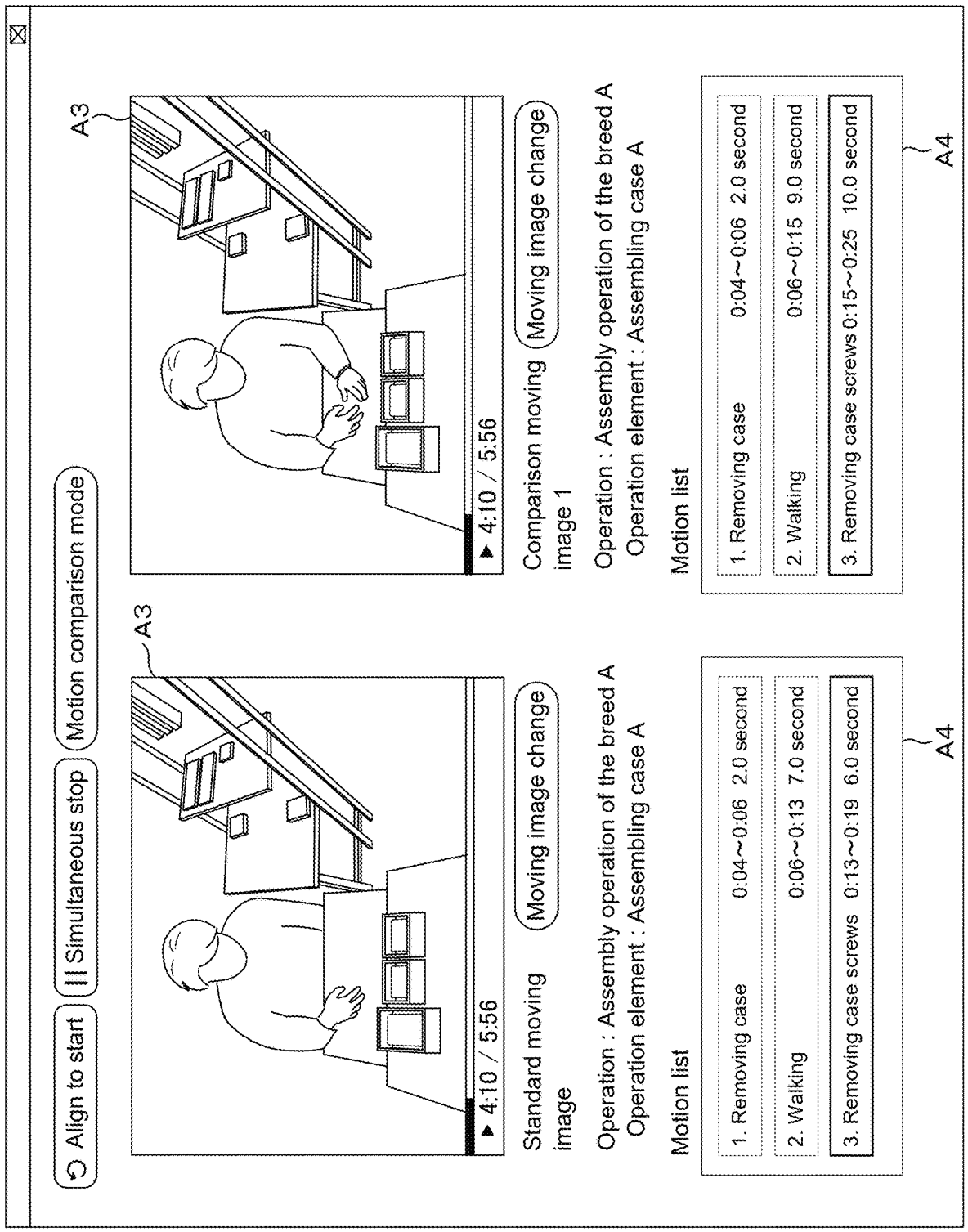
FIG. 15 is an explanatory diagram illustrating a display example of two analysis result screens.

Next, processing of displaying results of the analysis processing on a plurality of moving images in rows will be described. Hereinafter, a configuration in which analysis result screens with respect to two moving images are displayed in rows will be described as an example, and analysis result screens with respect to three or more moving images may be displayed in rows. FIG. 15 is an explanatory diagram illustrating a display example of two analysis result screens. The control unit 11 of the information processing apparatus 10 receives an execution instruction of processing of comparing analysis results of two moving images, and in a case where the selection of two moving images on which the analysis processing has been performed is received, generates the analysis result screens with respect to each moving image, on the basis of the selected moving image and the analysis result with respect to the moving image, and displays the analysis result screens in rows on the display unit 15. In the example illustrated in FIG. 15, the analysis result screen of the moving image is displayed on each the left side and the right side of the screen. Each of the analysis result screens has the same configuration as that in FIG. 8, and the result region A4 is displayed on the lower side of the moving image region A3. In addition, in the result region A4 in FIG. 15, information relevant to a motion moving image that is being displayed in the moving image region A3 and motion moving images before and after the motion moving image is displayed, and an analysis result with respect to the motion moving image that is being displayed is sequentially displayed as the moving image is reproduced in the moving image region A3.

In the screen illustrated in FIG. 15, an "align to start" button for moving reproduction positions of two moving images displayed in the moving image region A3 top position, a simultaneous stop button for simultaneously stopping two moving images, and a motion comparison mode button for displaying each motion moving image in two moving images in synchronization are provided. In addition, in the screen illustrated in FIG. 15, a moving image change button for instructing a change of the moving image displayed in each of the moving image regions A3 is provided. In a case where the moving image change button is manipulated, the control unit 11 of the information processing apparatus 10 displays moving image names of moving images that can be selected in a list, and in a case where the selection of a random moving image is received, the display contents of the moving image region A3 and the result region A4 are switched on the basis of the selected moving image and the analysis result with respect to the moving image. Accordingly, it is possible to display the analysis results with respect to the random moving images in comparison with each other.

In a case where the motion comparison mode button is manipulated, the control unit 11 displays each motion moving image included in each of the moving images in synchronization (conjunction) with each motion, in the moving image region A3. Accordingly, for each motion, it is possible to compare the motion contents of the operator in two moving images. Note that the control unit 11 may display each cycle moving image included in each of the moving images in synchronization with each motion in order from the top, in the moving image region A3. Accordingly, the control unit 11 is capable of presenting the analysis results with respect to two random moving images in rows, and displaying the motion moving image or the cycle moving image for each motion or for each operation element. Accordingly, for example, in a case where moving images captured when different operators perform the assembly operation of the same breed are displayed in synchronization, it is possible to compare the operation states of two operators. In addition, in a case where moving images captured when one operator performs the assembly operation of the same breed are displayed in synchronization, for example, it is possible to compare the operation states performed by one operator on different days.

In this embodiment, whether it is the standard motion is determined for each motion performed by the operator, on the basis of the moving image obtained by capturing the operator performing the operation, and whether each operation element is the standard operation is determined on the basis of the determination result of each motion. In addition, the determination of whether each motion is the standard motion is performed by using the motion analysis model M4, and thus, whether the standard motion is performed is accurately determined in consideration of the motion contents of each motion (the movement of the operator). By using such an accurately determined result, it is possible to consider a suitable improvement plan, and provide the improvement guidance to the operator.

In this embodiment, the analysis processing illustrated in FIG. 7 may be executed not only after the operation is ended on the basis of moving image obtained by capturing the operator, but also in real time on the basis of the moving image obtained by capturing the operator during the operation. In this case, for the assembly operation that is being executed by the operator, it is possible to perform processing of determining whether each motion is the standard operation, and determining whether each operation element is the standard operation, on the basis of the determination result, and provide the improvement guidance even in a case where the operation is being executed.

In this embodiment, at least one of breed prediction processing using the breed prediction model M1, cycle moving image distribution processing using the cycle prediction model M2, motion moving image distribution processing using the cut prediction model M3, and analysis processing using the motion analysis model M4 is not limited to being locally performed by the information processing apparatus 10. For example, a server executing the breed prediction processing using the breed prediction model M1 may be provided. In this case, it is configured such that the information processing apparatus 10 transmits the moving image of the processing target to the server, and the breed predicted by the server using the breed prediction model M1 is transmitted to the information processing apparatus 10. Even in such a case, the information processing apparatus 10, for example, is capable of executing the processing subsequent to step S33 in FIG. 7, on the basis of the breed predicted by the server.

In addition, a server executing the cycle moving image distribution processing using the cycle prediction model M2 may be provided. In this case, it is configured such that the information processing apparatus 10 transmits the moving image of the processing target to the server, and the moving image distributed to the cycle moving image by the server is transmitted to the information processing apparatus 10. Even in such a case, the information processing apparatus 10, for example, is capable of executing the processing subsequent to step S35 in FIG. 7, on the basis of the moving image distributed to the cycle moving image by the server. In addition, a server executing the motion moving image distribution processing using the cut prediction model M3 may be provided. In this case, it is configured such that the information processing apparatus 10 transmits the moving image of the processing target to the server, and the moving image distributed to the motion moving image by the server is transmitted to the information processing apparatus 10. Even in such a case, the information processing apparatus 10, for example, is capable of executing the processing subsequent to step S36 in FIG. 7, on the basis of the moving image distributed to the motion moving image by the server. Further, a server executing the analysis processing using the motion analysis model M4 may be provided. In this case, it is configured such that the information processing apparatus 10 transmits the moving image of the processing target to the server, and the result of the analysis processing with respect to the moving image performed by the server is transmitted to the information processing apparatus 10. Even in such a case, the information processing apparatus 10, for example, is capable of executing the processing subsequent to step S37 in FIG. 7, on the basis of the result of the analysis processing performed by the server. Even in the configuration as described above, the same processing as that in this embodiment is available, and the same effects can be obtained.

In this embodiment, whether the motion and the operation performed by the operator are the standard motion and the standard operation is analyzed on the basis of the moving image obtained by capturing the operator performing the operation, but the analysis target is not limited to the operator. For example, it may be configured such that whether a motion and an operation of a robot are a standard motion and a standard operation is analyzed on the basis of a moving image obtained by capturing the robot configured to perform a predetermined operation.

Embodiment 2

In this embodiment, an information processing apparatus extracting the cycle moving image obtained by capturing each operation element from the moving image obtained by capturing a state in which the operator repeatedly performs one operation element (the same operation element), and presenting the extracted cycle moving images in comparison with each other will be described. Note that the cycle moving image included in one moving image may be obtained by capturing one operator, or may be obtained by capturing a plurality of different operators. The information processing apparatus 10 of this embodiment has the same configuration as the configuration of the information processing apparatus 10 of Embodiment 1 illustrated in FIG. 2, and thus, the description for the configuration will be omitted. Note that the storage unit 12 of the information processing apparatus 10 of this embodiment stores a cycle moving image extraction model M6, instead of the cycle prediction model M2.

Figure 16:
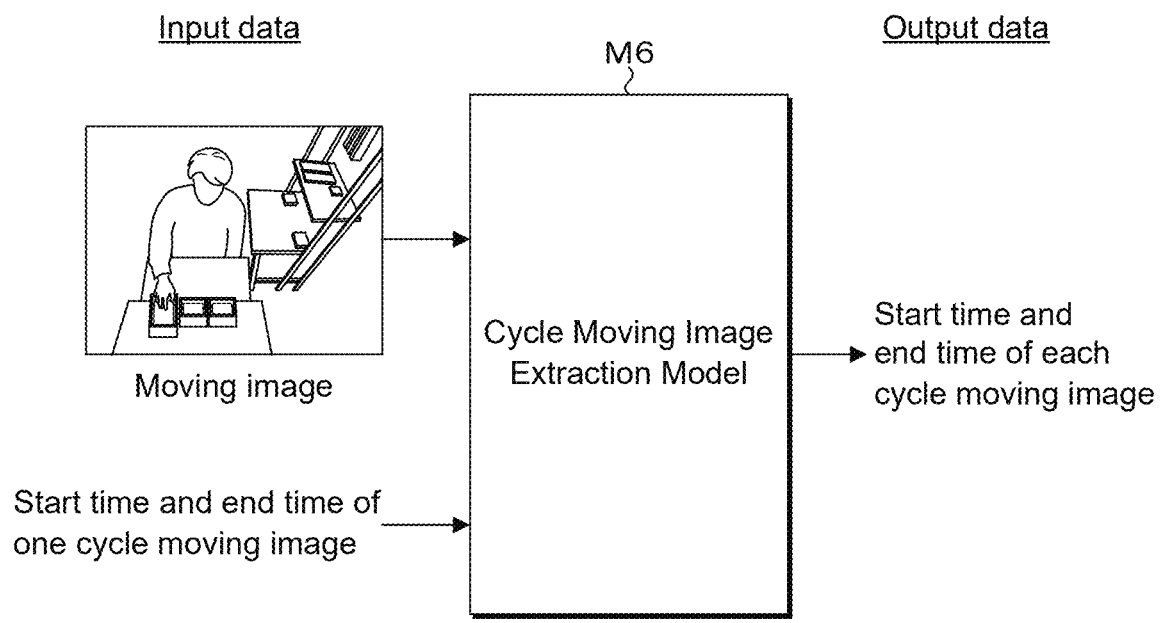
FIG. 16 is an explanatory diagram illustrating a configuration example of a cycle moving image extraction model.

FIG. 16 is an explanatory diagram illustrating a configuration example of the cycle moving image extraction model M6. The cycle moving image extraction model M6 is configured by using an algorithm such as RNN, LSTM, CNN, and Transformer, and may be configured by combining a plurality of algorithms. The cycle moving image extraction model M6 is a learned model that is learned such that a moving image obtained by capturing the operator repeatedly performing one operation element, and a start time and an end time of one cycle moving image designated to the moving image are set as input, arithmetic of extracting a cycle moving image similar to the designated cycle moving image from the input moving image is performed, and the arithmetic result is output. The cycle moving image extraction model M6 may be configured such that a moving image obtained by capturing the state of the motion of the operator, as with a moving image obtained by capturing the entire body, the upper body, or the hands of the operator, is input.

The cycle moving image extraction model M6 includes an input layer receiving the moving image, and the start time and the end time of one cycle moving image in the moving image, an intermediate layer extracting a feature amount of the motion of the operator included in the cycle moving image of which the start time and the end time are input, and a feature amount of the motion of the operator included in the moving image, and performing arithmetic of extracting a cycle moving image having the same feature amount as that of the cycle moving image (the cycle moving image similar to the cycle moving image) from the input moving image, and an output layer outputting the start time and the end time of each cycle moving image extracted from the moving image, on the basis of the arithmetic result of the intermediate layer. The start time and the end time of each cycle moving image output from the cycle moving image extraction model M6 indicates the elapsed time from the start of the reproduction of the moving image.

The cycle moving image extraction model M6 can be generated by performing machine learning using training data including a moving image for training, the start time and the end time of one cycle moving image in the moving image, and start times and end times of a plurality of cycle moving images designated as a ground truth with respect to the moving image. The cycle moving image extraction model M6 is learned such that in a case where the moving image and the start time and the end time of one cycle moving image included in the training data are input, the start time and the end time of each cycle moving image set as a ground truth are output. In the learning processing, the cycle moving image extraction model M6 performs the arithmetic on the intermediate layer and the output layer, on the basis of the input moving image and start time and end time of one cycle moving image, extracts the feature of the motion of the operator included in the moving image and the cycle moving image, extracts a cycle moving image having the same feature as the feature of the extracted cycle moving image from the moving image of the processing target, compares the start time and the end time of each extracted cycle moving image with the start time and the end time of each cycle moving image of the ground truth, and optimizes parameters used in the arithmetic processing on the intermediate layer and the output layer such that the both values are similar to each other. The parameters to be optimized are a weight (a coupling coefficient) between the nodes in the intermediate layer and the output layer, a function coefficient, a threshold value, and the like, and as a method for optimizing the parameter, a back-propagation method, a steepest descent method, and the like can be used. Accordingly, the cycle moving image extraction model M6 that distributes each cycle moving image in the moving image when the moving image and the start time and the end time of one cycle moving image are input, and outputs the start time and the end time of each cycle moving image is obtained. The learning of the cycle moving image extraction model M6 may be performed by another learning device, and in this case, the learned cycle moving image extraction model M6 generated by another learning device is downloaded to the information processing apparatus 10 from the learning device via the network N or via the portable storage medium 10a, and stored in the storage unit 12.

Figure 17:
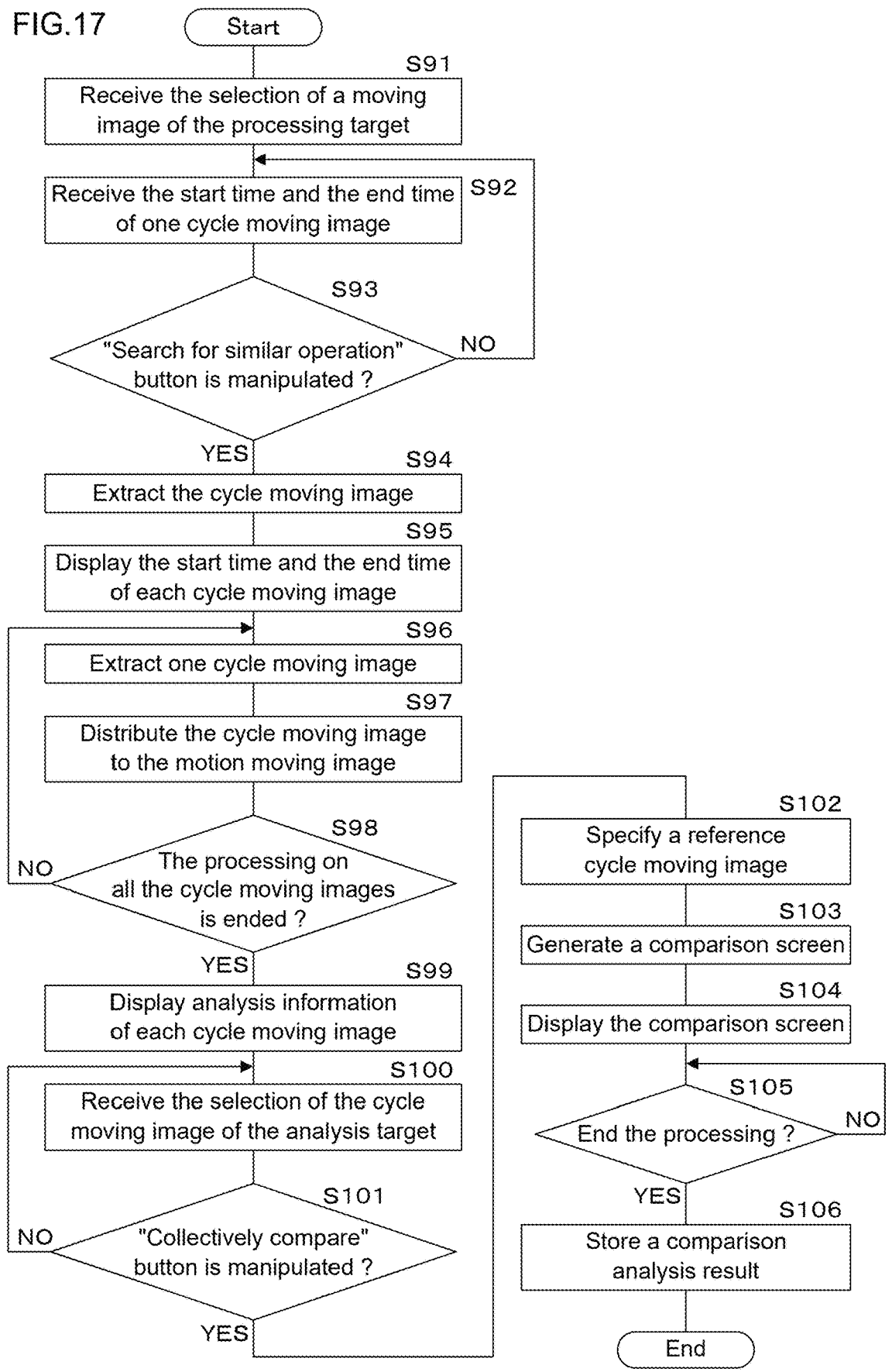
FIG. 17 is a flowchart illustrating an example of a comparison processing procedure of a cycle moving image.

Next, in the information processing apparatus 10 of this embodiment, processing of extracting the cycle moving image obtained by capturing the state in which the operator performs the operation element from the moving image obtained by capturing the operator, and presenting the plurality of extracted cycle moving images in comparison with each other will be described. FIG. 17 is a flowchart illustrating an example of a comparison processing procedure of the cycle moving image, and FIG. 18A to FIG. 21B are explanatory diagrams illustrating a screen example.

In a case where the state of the operation performed by the operator is checked by the cycle moving image, the user selects the moving image of the processing target. The control unit 11 of the information processing apparatus 10, for example, displays a moving image selection screen as illustrated in FIG. 18A on the display unit 15, and receives the selection of a random moving image from the screen, in accordance with the manipulation via the input unit 14 (S91). Here, one moving image may be selected, or a plurality of moving images may be selected. In the example of FIG. 18A, two moving images of a moving image 1 and a moving image 2 are selected. In the moving image of the processing target, a time when the operator (a target) performs a series of operation elements is set as one cycle moving image, and a plurality of cycle moving images are included. Note that the screen in FIG. 18A is configured such that a camera is selected, and the thumbnail of a moving image captured by the selected camera is displayed.

Next, the user designates the start time and the end time of one cycle moving image with respect to the moving image selected as the processing target. The control unit 11, for example, displays the screen as illustrated in FIG. 18B, and receives the designation of the start time and the end time of one cycle moving image from the screen (S92). The screen in FIG. 18B includes a display section of the selected moving image, and an input section R1 for inputting the start time and the end time of one cycle moving image in the displayed moving image. In the input section R1, an indicator indicating a reproduction time of the moving image that is being displayed is displayed, and the user designates the start time and the end time of one cycle moving image by moving a start mark C1 and an end mark C2 provided in the input section R1 to a desired reproduction time. In this case, the user is capable of enlarging or reducing the interval of the reproduction time indicated by the indicator, using a scaling button C3.

In the input section R1, a "search for similar operation" button for instructing the extraction of the cycle moving image similar to the cycle moving image from the moving image of the processing target, on the basis of one cycle moving image of which the start time and the end time are designated, is provided. The control unit 11 determines whether the "search for similar operation" button is manipulated (S93), and in a case where it is determined that the button is not manipulated (S93: NO), returns to step S92, and continuously receives the input of the start time and the end time of one cycle moving image. In a case where it is determined that the "search for similar operation" button is manipulated (S93: YES), the control unit 11 extracts the cycle moving image similar to the cycle moving image designated in step S92 from the moving image selected in step S91 (S94). Here, the control unit 11 inputs the selected moving image (moving image file 12a), and the designated start time and end time of one cycle moving image to the cycle moving image extraction model M6, and acquires the start time and the end time of each cycle moving image extracted from the moving image of the processing target, as output information from the cycle moving image extraction model M6.

The control unit 11 displays information indicating the start time and the end time of each cycle moving image extracted from the moving image (S95). For example, the control unit 11, as illustrated in FIG. 18C, displays the reproduction time of the moving image indicated by the indicator in the input section R1 as a rectangle C4 indicating the start time and the end time of each cycle moving image, and displays the start time and the end time of each cycle moving image in a moving image information section R2. In this embodiment, the control unit 11 gives a name of a video 1, a video 2, . . . to each cycle moving image extracted from the moving image, and the video 1, the video 2, . . . displayed in the moving image information section R2 of FIG. 18C indicate each cycle moving image.

The control unit 11 extracts one cycle moving image from a plurality of cycle moving images extracted from the moving image (S96), and distributes the extracted cycle moving image to the motion moving image by using the cut prediction model M3 (S97). The processing of step S97 is the same as that of step S35 in FIG. 7, and the control unit 11 sequentially inputs each frame included in the cycle moving image to the cut prediction model M3 according to the breed that is being operated by the operator in the moving image, and specifies (predicts) the start time and the end time of each motion moving image included in the cycle moving image, on the basis of the output information from the cut prediction model M3. After the processing of step S97, the control unit 11 may perform the editing processing (refer to FIG. 6A to FIG. 6C) for performing the change processing (the deletion, the new addition, and the like) on the cut (the distribution position) of each motion moving image. Note that in this embodiment, when the cycle moving image is distributed to the motion moving image by using the cut prediction model M3, the cycle moving image is set to be distributed to a predetermined number of (for example, 10) motion moving images. The number of distributions of the motion moving image may be determined in advance and set in the cut prediction model M3, or may be arbitrarily set by the user, and in this case, the set number of distributions may be input as input data of the cut prediction model M3.

Figure 18D:
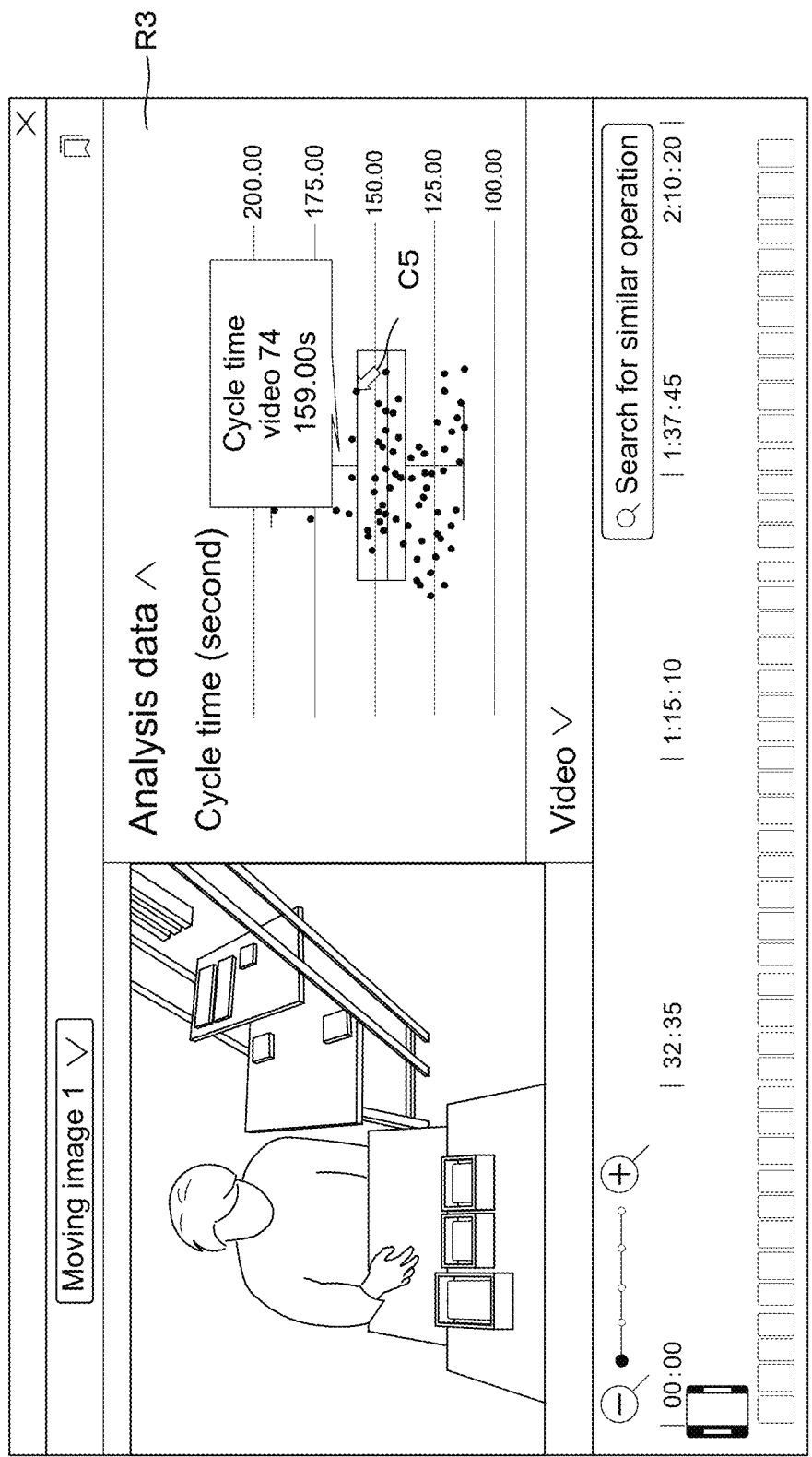
FIG. 18D is an explanatory diagram illustrating a screen example.

The control unit 11 determines whether the processing of steps S96 to S97 on all the cycle moving images extracted from the moving image in step S94 is ended (S98), and in a case where it is determined that the processing is not ended (S98: NO), returns to step S96, and repeats the processing of steps S96 to S97 on the unprocessed cycle moving image. Accordingly, all the cycle moving images are distributed to a plurality of motions moving images. In a case where it is determined that the processing on all the cycle moving images is ended (S98: YES), the control unit 11 displays analysis information of each cycle moving image (S99). For example, the control unit 11 counts the required time of each cycle moving image (the cycle time from the start time to the end time), generates a scatter plot (chart) in which the cycle time of each cycle moving image is plotted, and a box-and-whisker plot indicating the minimum value, the first quartile, the median value, the third quartile, and the maximum value of the cycle time, and displays the plots in an analysis information section R3 as illustrated in FIG. 18D. In the scatter plot of FIG. 18D, a vertical axis (a vertical direction) indicates the cycle time. Each point (marker) plotted in the scatter plot is configured such that in a case where a predetermined manipulation (for example, selection using the cursor) is performed, the cycle time of the cycle moving image corresponding to the manipulated marker is displayed, and is configured such that in a case where a predetermined manipulation (for example, left-clicking the mouse) is performed, the reproduction of the corresponding cycle moving image is started. In the example of FIG. 18D, the control unit 11 displays the cycle time of the cycle moving image corresponding to the marker selected by the cursor indicated by an arrow C5.

Figure 19A:
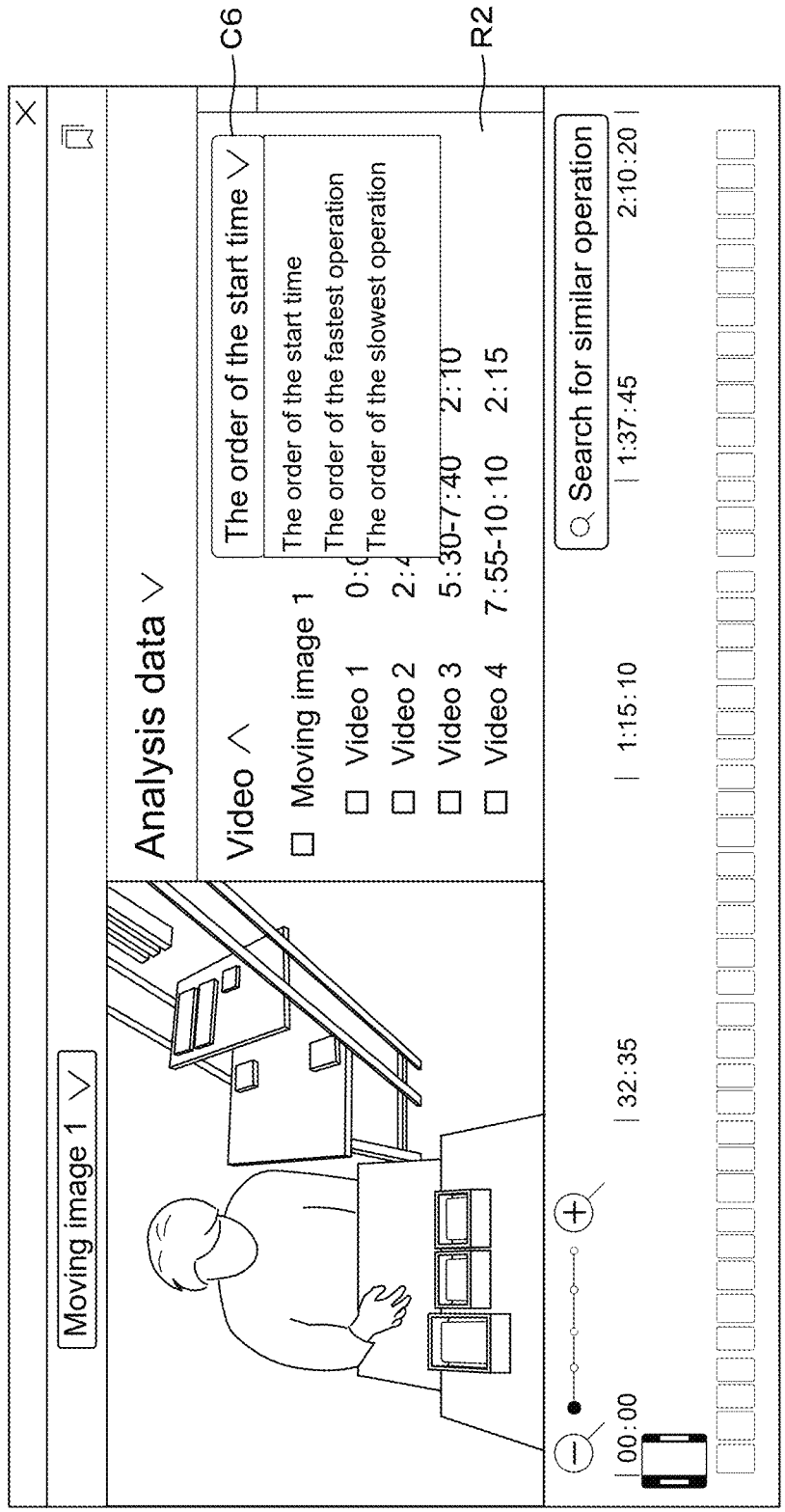
FIG. 19A is an explanatory diagram illustrating a screen example.

The moving image information section R2 in the screen of FIG. 18C is configured such that a display order of the cycle moving image extracted from the moving image of the processing target can be rearranged, and a rearrange button C6 for instructing the execution of rearrangement is provided. In the rearrange button C6, as illustrated in FIG. 19A, a pulldown menu that makes it possible to select any of the order of the start time, the order of the fastest operation, and the order of the slowest operation is provided as a rearrangement rule. In the example of FIG. 19B, the rearrangement rule in order of the slowest operation is selected, and the name, the start time and the end time, and the cycle time of each cycle moving image are displayed in order of the longest cycle time.

In the moving image information section R2 of the screen in FIG. 19A and FIG. 19B, a checkbox for selecting each cycle moving image is provided, and it is configured such that in a case where two or more cycle moving images are selected, as illustrated in FIG. 19B, a "collectively compare" button is displayed. The user selects cycle moving images that the user desires to compare by checking the checkbox, and then, manipulates the "collectively compare" button. By checking the checkbox in the moving image information section R2, the control unit 11 receives the selection of the cycle moving image of the analysis target (S100), and in a case where two or more cycle moving images are selected, determines whether the "collectively compare" button is manipulated (S101). In a case where it is determined that the "collectively compare" button is not manipulated (S101: NO), the control unit 11 returns to step S100, and continuously receives the selection of the cycle moving image.

In a case where it is determined that the "collectively compare" button is manipulated (S101: YES), the control unit 11 specifies a reference cycle moving image (a reference moving image) to be an example from the cycle moving images selected in step S100 (S102). For example, the control unit 11 specifies a cycle moving image of which the cycle time is the median value as the reference cycle moving image. Note that the control unit 11 may specify a cycle moving image of which the cycle time is the closest to the average value of the cycle times of each cycle moving image, as the reference cycle moving image, or may specify a cycle moving image with the shortest cycle time, as the reference cycle moving image. In addition, the control unit 11 may specify the cycle moving image selected by the user via the input unit 14, as the reference cycle moving image. In addition, the control unit 11 may calculate the degree of similarity between each of the selected cycle moving images and the other cycle moving image, and for example, may specify the cycle moving image with the highest total degree of similarity with the other cycle moving image, as the reference cycle moving image. As the degree of similarity, for example, a correlation coefficient, and the degree of cosine similarity can be used. In addition, the control unit 11 may be configured to estimate the degree of similarity between two cycle moving images by using a learning model constructed by machine learning. For example, a learning model that is composed of CNN, and is learned to output, in a case where two cycle moving images are input, the degree of similarity between two cycle moving images may be used. In this case, the control unit 11 inputs two cycle moving images to the learned learning model, and is capable of estimating the degree of similarity between two cycle moving images, on the basis of the output information from the learning model. Further, the control unit 11 is not limited to a configuration of specifying the reference cycle moving image from the selected cycle moving images, and may specify the reference cycle moving image from the cycle moving images extracted in step S94. In this case, the control unit 11 may specify a cycle moving image of which the cycle time is the median value, the average value, or the shortest from the cycle moving images extracted in step S94, as the reference cycle moving image, or may specify a cycle moving image with the maximum total degree of similarity with the other cycle moving image, as the reference cycle moving image.

Figure 19C:
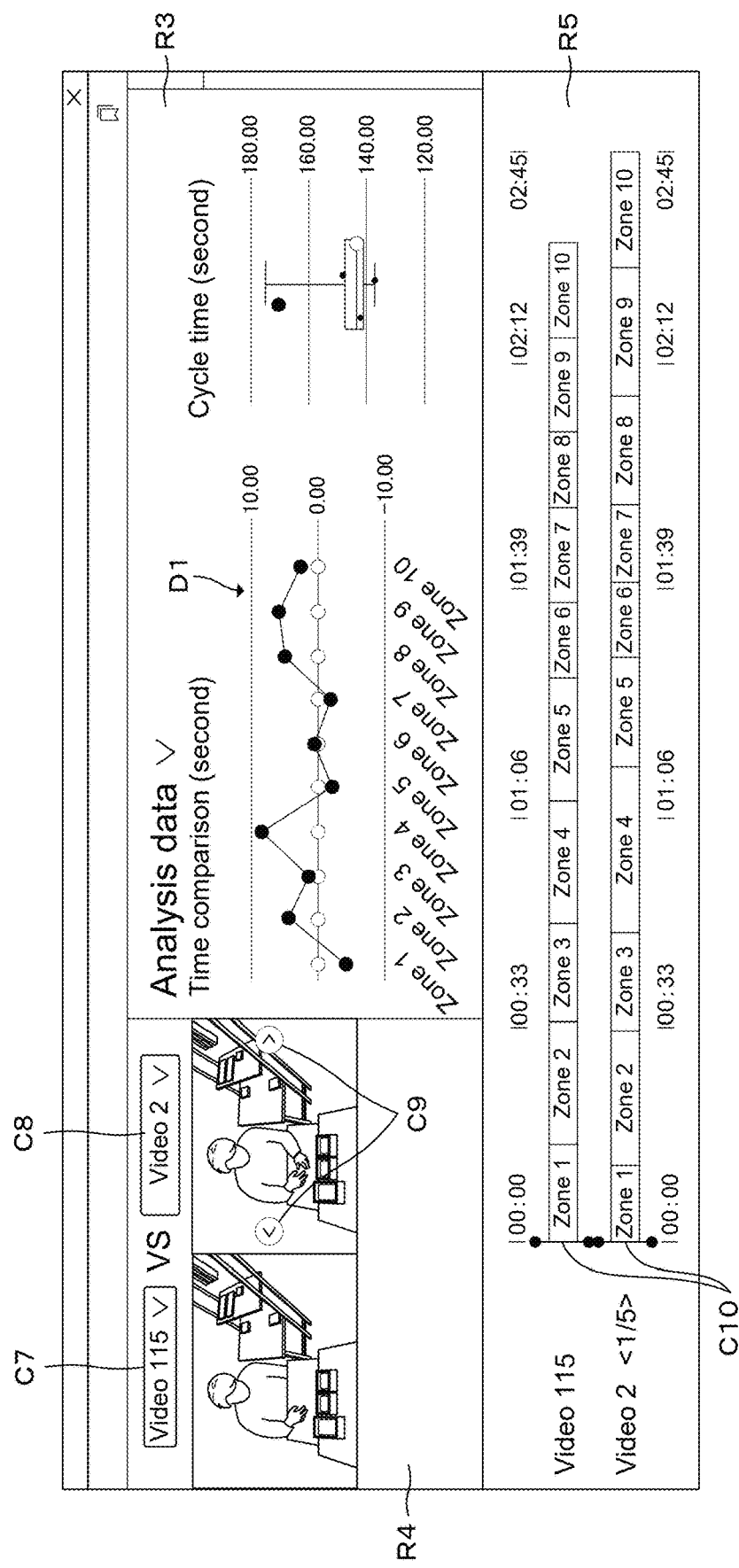
FIG. 19C is an explanatory diagram illustrating a screen example.

The control unit 11 generates a comparison screen for comparing the reference cycle moving image with the cycle moving image of the analysis target (S103). For example, the control unit 11 generates the comparison screen as illustrated in FIG. 19C, and displays the generated comparison screen on the display unit 15 (S104). In the screen illustrated in FIG. 19C, a cycle moving image of a video 115 is displayed as the reference cycle moving image (an example moving image), and a cycle moving image of a video 2 is displayed as the analysis target. Specifically, the reference cycle moving image (the video 115) is displayed on the left side of a moving image display section R4, and the cycle moving image of the analysis target (the video 2) is displayed on the right side. Note that it is configured such that the reference cycle moving image and the cycle moving image of the analysis target, which are being displayed, can be changed to a random cycle moving image from the cycle moving images selected in step S100, in accordance with the manipulation via the input unit 14. Specifically, in the moving image display section R4, a switch button C7 of the reference cycle moving image and a switch button C8 of the analysis target are provided, and in the switch buttons C7 and C8, a pulldown menu for selecting any of the cycle moving images that can be selected is provided. In addition, a switch button C9 that is capable of switching the cycle moving image of the analysis target, for example, in an order displayed in the moving image information section R2 of FIG. 19B is provided.

The analysis information section R3 in the screen of FIG. 19C displays a graph D1 indicating a comparison result of the required time of each distributed motion moving image (in FIG. 19C, represented as a zone 1, a zone 2, . . . ), for the reference cycle moving image and the cycle moving image of the analysis target displayed in the moving image display section R4. In the graph D1, each position on a horizontal axis is associated with each motion (each zone), and a vertical axis indicates a difference between the required time of each motion moving image (the zone 1, the zone 2, . . . ) of the reference cycle moving image and the required time of each motion moving image of the cycle moving image of the analysis target. In the graph D1, the required time of each motion moving image of the reference cycle moving image is plotted with a white circle, and the required time of each motion moving image of the cycle moving image of the analysis target is plotted with a black circle. According to the graph D1, it is possible to compare the reference cycle moving image with the cycle moving image of the analysis target in a motion moving image unit (a zone unit), and easily grasp whether the required time of the cycle moving image of the analysis target is long or short (that is, whether each motion is slow or fast), on the basis of the reference cycle moving image. In addition, the analysis information section R3 displays a scatter plot in which the cycle time of each cycle moving image selected in step S100 is plotted, and a box-and-whisker plot indicating the minimum value, the first quartile, the median value, the third quartile, and the maximum value of the cycle time. In the scatter plot in FIG. 19C, the cycle time of the reference cycle moving image is plotted with a white circle, the cycle time of the cycle moving image of the analysis target is plotted with a large black circle, and the cycle time of the other cycle moving image is plotted with a small black circle.

Figure 20A:
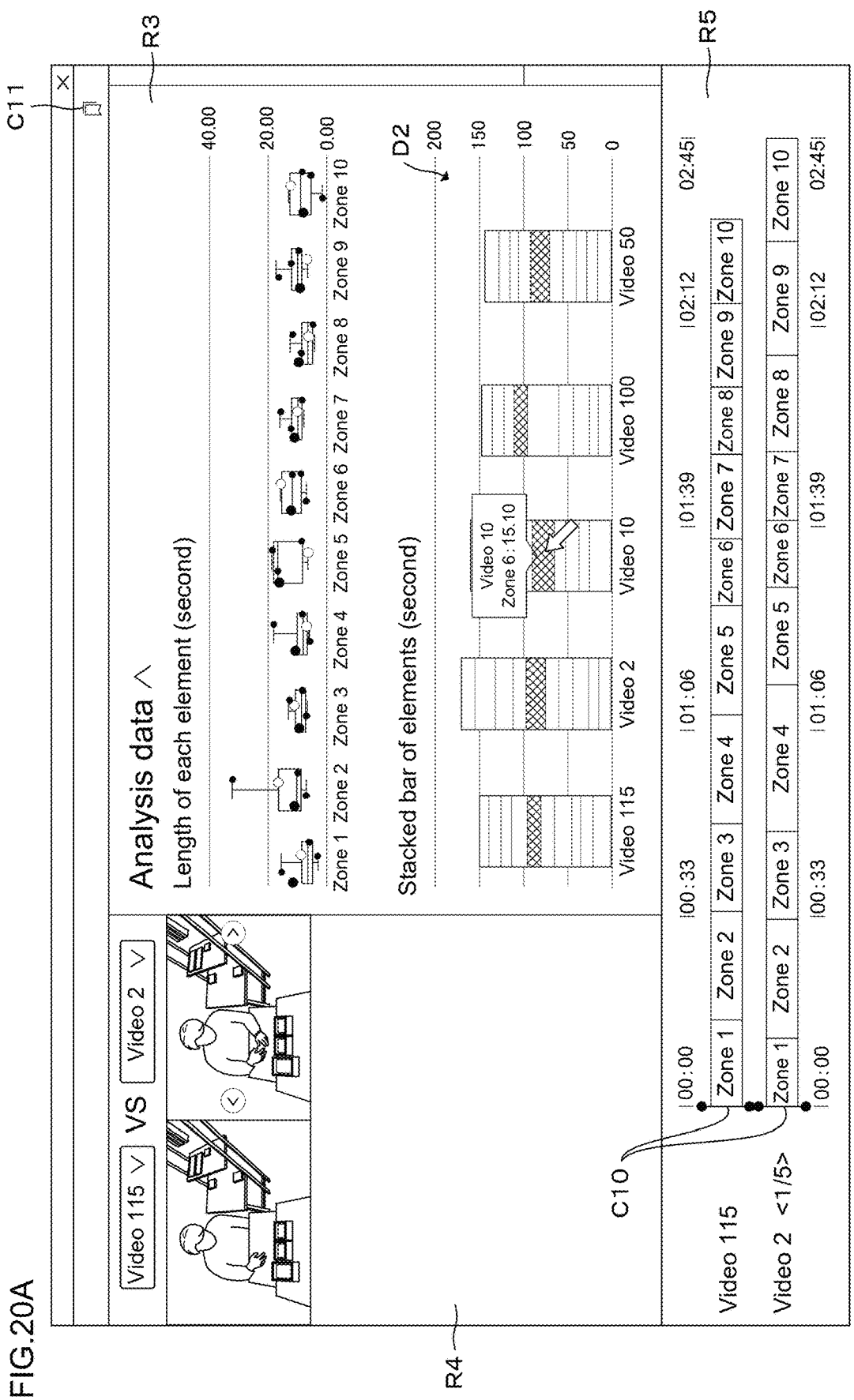
FIG. 20A is an explanatory diagram illustrating a screen example.
Figure 20B:
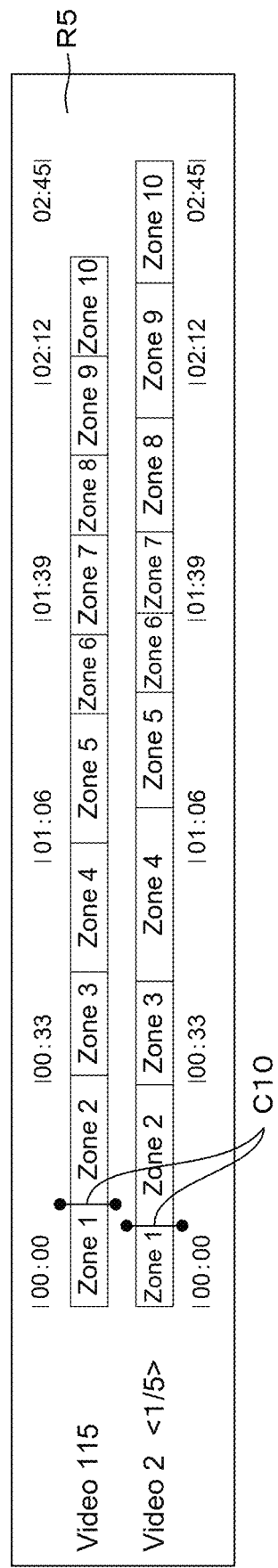
FIG. 20B is an explanatory diagram illustrating a screen example.

In addition, the analysis information section R3, as illustrated in FIG. 20A, displays a scatter plot and a box-and-whisker plot of the required time of each motion moving image (each zone) in the cycle moving image selected in step S100, on the lower side of the graph D1 and the scatter plot of the cycle time. Here, in the scatter plot, a horizontal axis indicates each zone, a vertical axis indicates the required time of each zone, the required time of the reference cycle moving image is plotted with a white circle, the required time of the cycle moving image of the analysis target is plotted with a large black circle, and the required time of the other cycle moving image is plotted with a small black circle. Accordingly, for the selected cycle moving image including the reference cycle moving image, it is possible to present a variation in the required time for each zone. Further, the analysis information section R3 displays a stacked bar graph D2 in which the required time of each motion moving image (each zone) is displayed by being stacked for each cycle moving image selected in step S100. The stacked bar graph D2 indicates a bar graph in which the required time of each motion moving image (the zone 1, the zone 2, . . . ) is added up in order from the bottom for each cycle moving image. Note that in the stacked bar graph D2, a bar graph of the reference cycle moving image, a bar graph of the cycle moving image of the analysis target, and a bar graph of the other cycle moving image are displayed in the order from the left side. In the example of FIG. 20A, only the required time of a zone 6 is hatched, and the required time of each zone is displayed with the same color (display mode). Accordingly, for each cycle moving image, it is possible to easily grasp the length of the required time of each motion moving image. It is configured such that in a case where a predetermined manipulation (for example, selection using the cursor) is performed, each zone in the stacked bar graph D2 displays the required time of the zone of the corresponding cycle moving image, and it is configured such that in a case where a predetermined manipulation (for example, left-clicking the mouse) is performed, the reproduction of the zone (the motion moving image) of the corresponding cycle moving image is started. In the example of FIG. 20A, a zone 6 of a video 10 is selected, and the required time of the selected zone 6 is displayed.

As illustrated in FIG. 19C and FIG. 20A, the comparison screen further includes a zone comparison section R5, and in the zone comparison section R5, the reproduction time of the cycle moving image is indicated on a horizontal axis, and the start time and the end time of each motion moving image (each zone) in the reference cycle moving image and the cycle moving image of the analysis target are indicated. In the example of FIG. 19C and FIG. 20A, the start time and the end time of each motion moving image are indicated by matching up the start time of the reference cycle moving image and the cycle moving image of the analysis target, and marks C10 indicating reproduction positions of two cycle moving images in the moving image display section R4 are added. It is configured such that the comparison screen of this embodiment displays (reproduces) the reference cycle moving image and the cycle moving image of the analysis target in synchronization (conjunction) with each motion moving image (each zone) distributed to each cycle moving image. For example, in the example of FIG. 19C and FIG. 20A, since the required time of a zone 1 of the video 115 is longer than the required time of a zone 1 of the video 2, in a case where two cycle moving images are reproduced, after the reproduction of the zone 1 of the video 2 is ended, the video 2 waits until the reproduction of the zone 1 of the video 115 is ended, and in a case where the reproduction of the zone 1 of the video 115 is ended, the reproduction of the zone 2 of two cycle moving images is started. The zone comparison section R5 in FIG. 20B indicates a state at a time point when the reproduction of the zone 1 of two cycle moving images is ended, the mark C10 indicates an end time point of the zone 1 of each cycle moving image, and then, the reproduction of the zone 2 of each cycle moving image is started.

In addition, it is configured such that in a case where a predetermined manipulation (for example, left-clicking the mouse) is performed, each zone displayed in the zone comparison section R5 indicates the start time and the end time of each motion moving image by matching up the start time of the manipulated (selected) motion moving image (zone). In the example of FIG. 20C, a zone 4 is selected, and the start time and the end time of each zone of two cycle moving images are indicated by matching up the start time of the zone 4. Accordingly, it is possible to easily grasp the length of the required time of the selected zone. In this case, in the moving image display section R4, the motion moving image of the selected motion (zone) in two cycle moving images may be loop-reproduced (repeatedly reproduced). In addition, in a case where any zone is selected via the zone comparison section R5, the motion moving image in two cycle moving images is displayed in the moving image display section R4 in synchronization with the selected zone. Accordingly, for each zone, it is possible to compare the motions of the operators in two cycle moving images. In addition, it is configured such that in a case where a switch instruction of the analysis target is performed by the switch buttons C8 and C9 while two cycle moving images are displayed in the moving image display section R4, the comparison screen starts the reproduction of the reference cycle moving image and the cycle moving image of the analysis target subjected to the switch instruction from the same zone as the zone (the motion) that is being displayed at this time point. Even in a case where the switch instruction of the reference cycle moving image is performed by the switch button C7, the reproduction of the reference cycle moving image subjected to the change instruction and the cycle moving image of the analysis target that is being displayed is started from the same zone as the zone that is being displayed at this time point.

In addition, it is configured such that in a case where a predetermined manipulation (for example, double-clicking the mouse) is performed, each zone in the zone comparison section R5 performs processing of distributing the motion moving image of the manipulated (selected) zone to the more detailed motion moving image. Note that a motion moving image obtained by performing distribution processing once on the cycle moving image of the processing target is set as a motion moving image for each large-classified motion, a motion moving image obtained by performing distribution processing once on the motion moving image of the large-classified motion is set as a motion moving image for each middle-classified motion, and a motion moving image obtained by performing distribution processing once on the motion moving image of the middle-classified motion is set as a motion moving image for each small-classified motion. In the example of FIG. 20C, the zone 4 is selected, and in this case, the control unit 11 may set a motion moving image (a large-classified motion moving image) of the selected zone 4 as the processing target, perform the same processing as that of step S97, and distribute the motion moving image of the zone 4 to the motion moving image (a zone 4-1, a zone 4-2, . . . ) of the middle-classified motion by using the cut prediction model M3. Here, the control unit 11 sequentially inputs each frame included in the motion moving image of the zone 4 to the cut prediction model M3, and specifies (predicts) the start time and the end time of the motion moving image of each middle-classified motion included in the motion moving image of the zone 4, on the basis of the output information from the cut prediction model M3. Here, the control unit 11 may set or input the number of distributions (for example, 5) for distributing the motion moving image of the large-classified motion to the motion moving image of the middle-classified motion to the cut prediction model M3, or may perform editing processing on the cut of the motion moving image of each middle-classified motion after distribution. The zone comparison section R5 in FIG. 20D indicates a display state of the motion moving image (the zone 4-1, the zone 4-2, . . . ) of the middle-classified motion after distribution. Note that similarly, in a case where any (for example, the zone 4-1) of the zones in the zone comparison section R5 of FIG. 20D is selected, the control unit 11 performs the same processing as that of step S97 on a motion moving image (a middle-classified motion moving image) of the selected zone 4-1, as the processing target, and distributes the motion moving image of the zone 4-1 to the motion moving image (not illustrated) of the small-classified motion by using the cut prediction model M3. By performing such processing a plurality of times, the user is capable of dividing the cycle moving image into the motion moving images in a stepwise manner, and thus, the analysis processing of the motion moving image at desired detailedness is available. In addition, since it is possible to divide only the zone that the user desires to check into more detailed motion moving images, it is possible to suppress unnecessary division processing.

In a case where the comparison result illustrated in FIG. 19C and FIG. 20A is displayed, and then, for example, the switch of the reference cycle moving image is instructed by the switch button C7, the control unit 11 changes the reference cycle moving image to the selected other cycle moving image, and updates the contents of the comparison screen. In addition, in a case where the switch of the cycle moving image of the analysis target is instructed by the switch buttons C8 and C9, the control unit 11 changes the analysis target to the selected other cycle moving image, and updates the contents of the comparison screen. In addition, in a case where the selection of each marker plotted in the graph D1, the scatter plot of the cycle time of each cycle moving image, or the scatter plot of the required time of each motion moving image (each zone), which is displayed in the analysis information section R3, is received, the control unit 11 displays the required time or the cycle time corresponding to the selected marker. Further, the control unit 11, in a case where the selection of each zone indicated in the stacked bar graph D2 displayed in the analysis information section R3 is received, displays the required time of the selected zone, and in a case where the reproduction of the zone is instructed, displays the motion moving image of the zone in the moving image display section R4.

The control unit 11 determines whether to end the processing described above (S105). For example, in a case where an end instruction of the processing described above is received from the user via the input unit 14, the control unit 11 determines to end the processing. In a case where it is determined not to end the processing described above (S105: NO), the control unit 11 waits while performing the processing corresponding to the received manipulation each time when a manipulation with respect to the comparison screen is received. In a case where it is determined to end the processing described above (S105: YES), the control unit 11 stores a comparison analysis result displayed on the comparison screen in the storage unit 12 (S106), and ends a series of processing. For example, the control unit 11 stores the moving image selected in step S91, the start time and end time of the cycle moving image extracted from each moving image in step S94, the start time and the end time of the motion moving image to which each cycle moving image is distributed in step S97, and the like in one folder provided in the storage unit 12. By reading out the folder in which a series of comparison analysis results are stored as described above, it is possible to check the comparison analysis result at any time, and by further manipulating the displayed comparison screen, it is possible to further perform the comparison analysis processing. Note that in each folder, not only the series of comparison analysis results but also each cycle moving image extracted from the moving image of the processing target may be stored in each folder.

According to the processing described above, in this embodiment, the plurality of cycle moving images are automatically extracted (divided) from the moving image obtained by capturing the operator, on the basis of the designated cycle moving image, and each of the cycle moving images is automatically distributed for each motion performed by the operator. In addition, in the plurality of cycle moving images selected as the analysis target from the cycle moving images extracted from the moving image, the reference cycle moving image to be an example is specified, and the comparison result between the reference cycle moving image and the other cycle moving image is presented. When displaying the reference cycle moving image and the other cycle moving image, the reference cycle moving image and the other cycle moving image are reproduced in synchronization with each other in the motion moving image unit, and thus, it is easy to perform the comparison in the motion moving image unit.

Figure 21A:
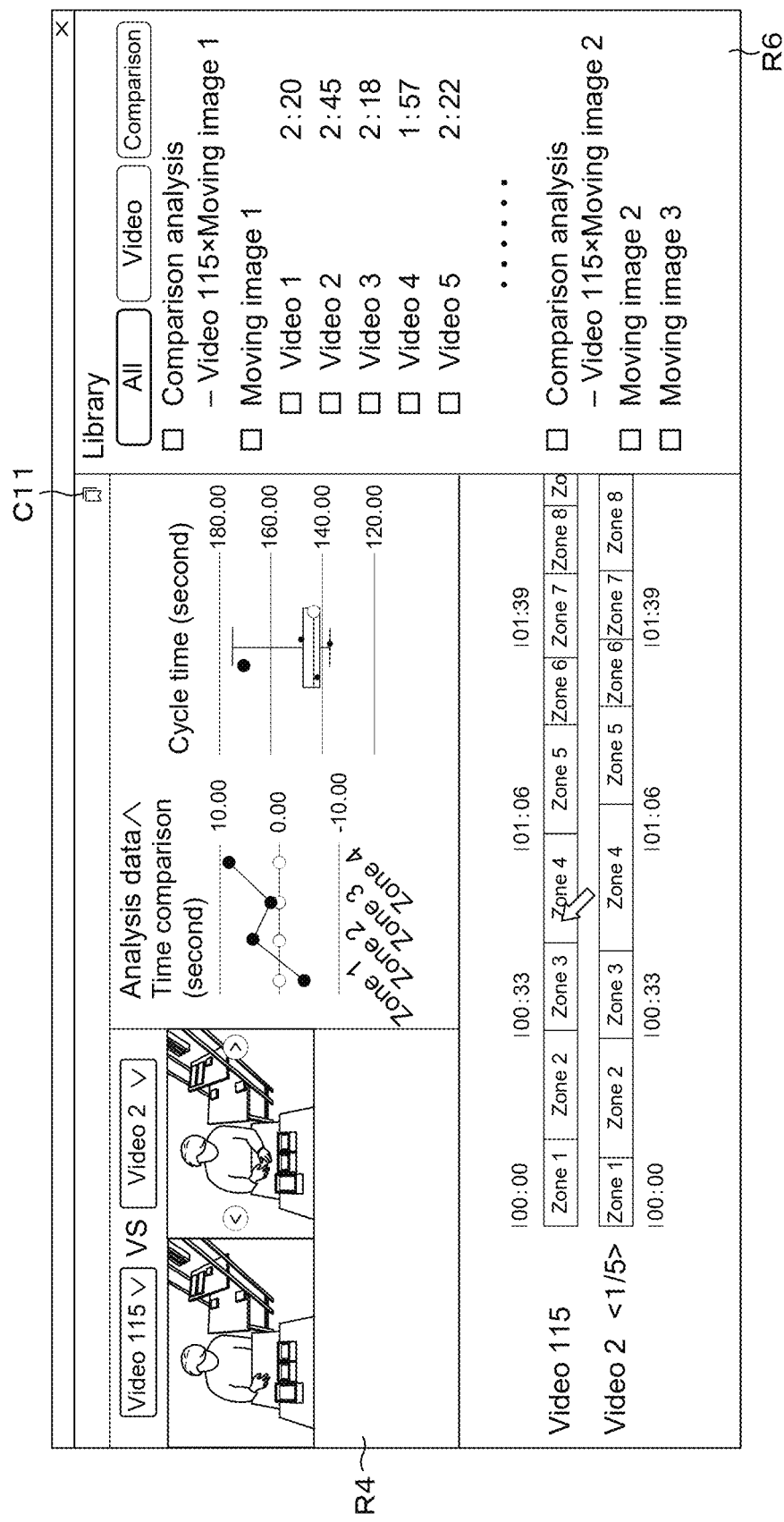
FIG. 21A is an explanatory diagram illustrating a screen example.

As illustrated in FIG. 20A, in the comparison screen, a library button C11 for instructing the display of a library screen on which the comparison analysis result that is generated by the processing described above and stored in the folder of the storage unit 12 can be read out by one click is provided. In a case where the library button C11 is manipulated, the control unit 11 displays a library screen R6 as illustrated in FIG. 21A. In the library screen R6, a comparison tab for displaying a selection screen that receives the selection of the comparison analysis result stored in the storage unit 12, a video tab for displaying a selection screen that receives the selection of the moving image obtained by capturing the operator with a camera, and an all tab for displaying a selection screen that receives the selection of any of the comparison analysis result and the moving image are provided. In the example of FIG. 21A, the all tab is selected, and the selection screen of the comparison analysis result and moving image are displayed. In the library screen of the screen in FIG. 21A, for example, in a case where "Comparison Analysis—Video 115×Moving Image 1" is selected, the control unit 11 reads out the corresponding comparison analysis result from the storage unit 12, and displays the comparison screen illustrated in FIG. 19C and FIG. 20A on the display unit 15. By using the library screen as described above, it is possible to read out and display a desired comparison analysis result or moving image by one click.

Figure 21B:
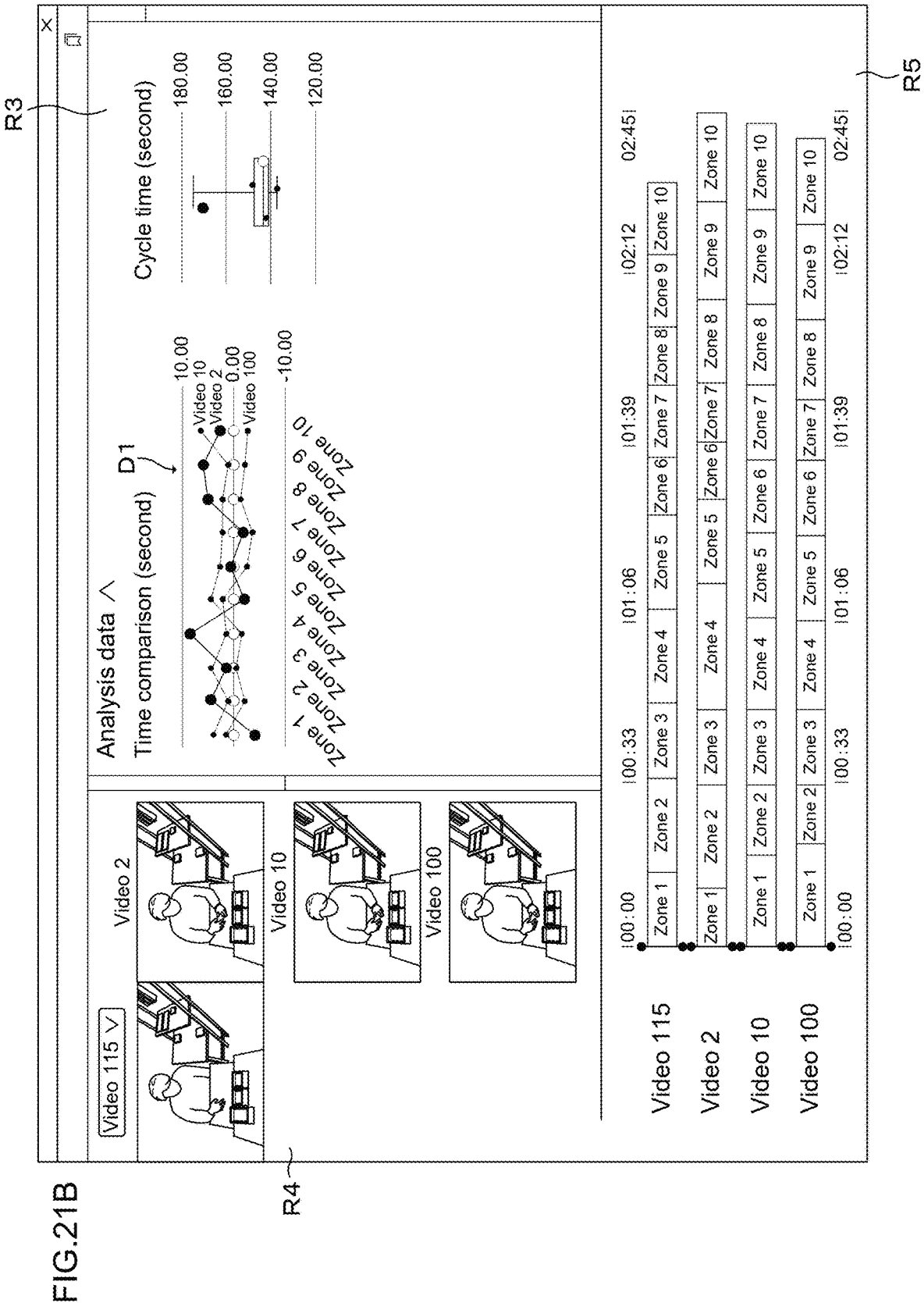
FIG. 21B is an explanatory diagram illustrating a screen example.

In the moving image display section R4 of the screen in FIG. 19C, FIG. 20A, and FIG. 21A, only one cycle moving image of the analysis target is displayed, and can be switched by the switch buttons C8 and C9. In addition, as illustrated in FIG. 21B, the plurality of cycle moving images (moving image groups) to be an analysis target may be displayed in the moving image display section R4. For example, among the cycle moving images selected in step S100 of FIG. 17, the cycle moving image other than the reference cycle moving image may be displayed as the analysis target. In this case, for all the cycle moving images displayed in the moving image display section R4, the graph D1 indicating the comparison result of the required time of each zone may be displayed in the analysis information section R3, or the start time and the end time of each zone of all the cycle moving images may be displayed in the zone comparison section R5.

Embodiment 3

In Embodiment 2, the required times of each motion moving image (each zone) in the cycle moving images (the reference cycle moving image and the cycle moving image of the analysis target) for comparison are presented in comparison with each other. In this embodiment, an information processing apparatus presenting a cycle moving image with a long required time of each zone compared to the reference cycle moving image, and a cycle moving image with a low degree of similarity with the reference cycle moving image in each zone, from the cycle moving images selected as the analysis target, will be described. The information processing apparatus 10 of this embodiment has the same configuration as the configuration of the information processing apparatus 10 of Embodiment 1 illustrated in FIG. 2, and thus, the description for the configuration will be omitted.

Figure 22:
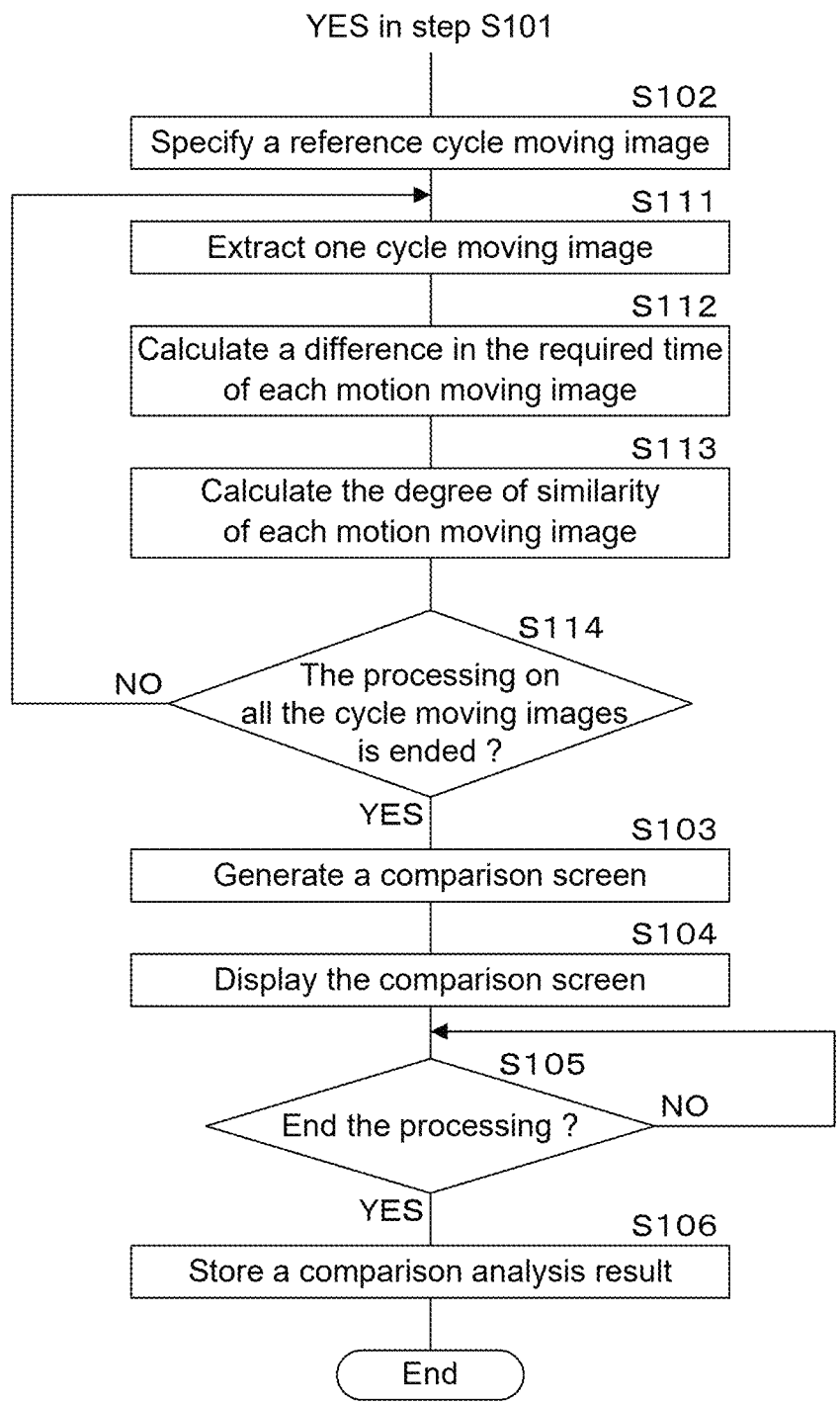
FIG. 22 is a flowchart illustrating an example of a comparison processing procedure of a cycle moving image in Embodiment 3.
Figure 23:
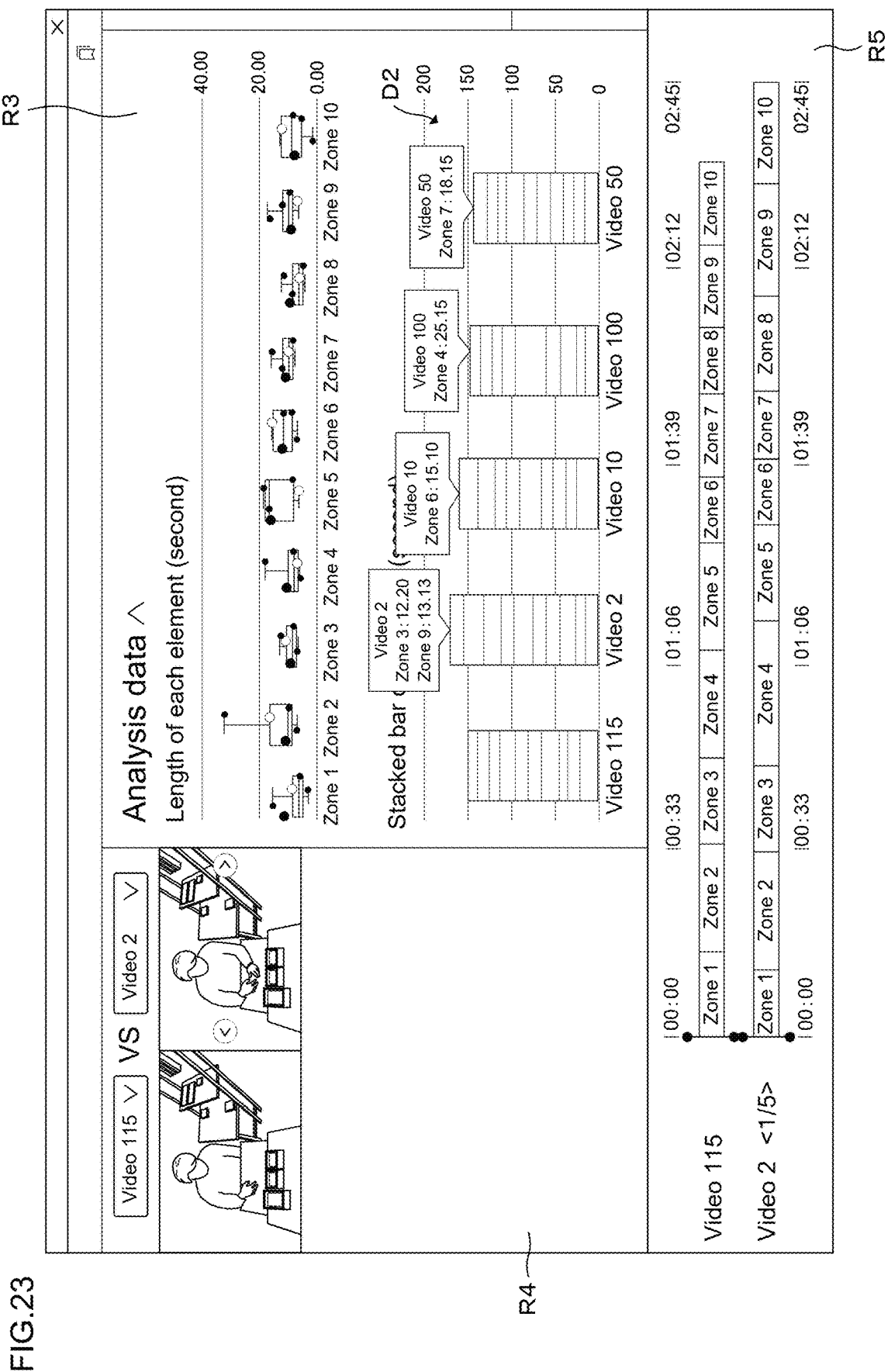
FIG. 23 is an explanatory diagram illustrating a screen example.

FIG. 22 is a flowchart illustrating an example of the comparison processing procedure of the cycle moving image in Embodiment 3, and FIG. 23 is an explanatory diagram illustrating a screen example. In the processing illustrated in FIG. 22, steps S111 to S114 are added between steps S102 and S103 in the processing illustrated in FIG. 17. For the same step as that in FIG. 17, the description will be omitted. In FIG. 22, steps S91 to S101 in FIG. 17 are not illustrated.

In the information processing apparatus 10 of this embodiment, the control unit 11 executes the same processing as that of steps S91 to S102 in FIG. 17. Then, the control unit 11 extracts one from the cycle moving images selected as the analysis target in step S100 (S111), and calculates a difference in the required time (an excess difference based on the reference cycle moving image) of each zone (each motion moving image), in the extracted cycle moving images and the reference cycle moving image (S112). In addition, the control unit 11 calculates the degree of similarity of each zone (each motion moving image), in the extracted cycle moving images and the reference cycle moving image (S113). Here, as the degree of similarity, a correlation coefficient, the degree of cosine similarity, and the like can be used, and a learning model estimating the degree of similarity between two motion moving images may be used. The control unit 11 determines whether the processing of steps S112 to S113 on all the cycle moving images selected as the analysis target is ended (S114), in a case where it is determined that the processing is not ended (S114: NO), returns to step S111, and in a case where it is determined that the processing is ended (S114: YES), proceeds to step S103. Here, in step S103, the control unit 11 generates a comparison screen as illustrated in FIG. 23. The screen in FIG. 23 has the same configuration as that of the screen in FIG. 20A, and in the stacked bar graph D2, a message indicating the maximum required time of each zone is displayed for a cycle moving image with the maximum difference in the required time of each zone calculated in step S112 (the maximum difference from the reference cycle moving image). In the example of FIG. 23, the longest required time of zones 3 and 9 in the cycle moving image of the video 2 is displayed. Note that the message added to the stacked bar graph D2 is not limited to the configuration displayed when the difference from the reference cycle moving image is maximized, and may be a configuration displayed when the difference from the reference cycle moving image is maximized and is a predetermined value or more. In addition, in this embodiment, instead of the comparison screen in FIG. 23, in the stacked bar graph D2, a message indicating the minimum degree of similarity of each zone may be added to a cycle moving image with the minimum degree of similarity of each zone (the minimum degree of similarity with the reference cycle moving image) calculated in step S113. In this case, it is possible to present a cycle moving image in which the motion of the operator in the motion moving image is not similar to (deviates from) the reference cycle moving image. A cycle moving image including a zone with a long required time, and a cycle moving image including a zone with a low degree of similarity with the reference cycle moving image may cause any problem in the operation of the operator, and by presenting such cycle moving image and zone to the user, it is possible for the user to verify the suitability of the operation contents of the operator.

Note that the control unit 11 may calculate a score according to a difference in the required time of each zone (for example, a score that increases as the difference decreases), and evaluate the cycle moving image by using the total score of each zone as the score of the cycle moving image. In addition, the control unit 11, in the cycle moving image of the analysis target and the reference cycle moving image, may calculate a score according to the degree of similarity of each zone (each motion moving image) (for example, a score that increases as the degree of similarity increases), and evaluate the cycle moving image by using the total score of each zone as the score of the cycle moving image.

Embodiment 4

In Embodiments 2 and 3, the reference cycle moving image is determined from the cycle moving images selected as the analysis target. In this embodiment, an information processing apparatus generating the reference cycle moving image from the cycle moving image extracted from the moving image of the processing target will be described. The information processing apparatus 10 of this embodiment has the same configuration as the configuration of the information processing apparatus 10 of Embodiment 1 illustrated in FIG. 2, and thus, the description for the configuration will be omitted.

Figure 24:
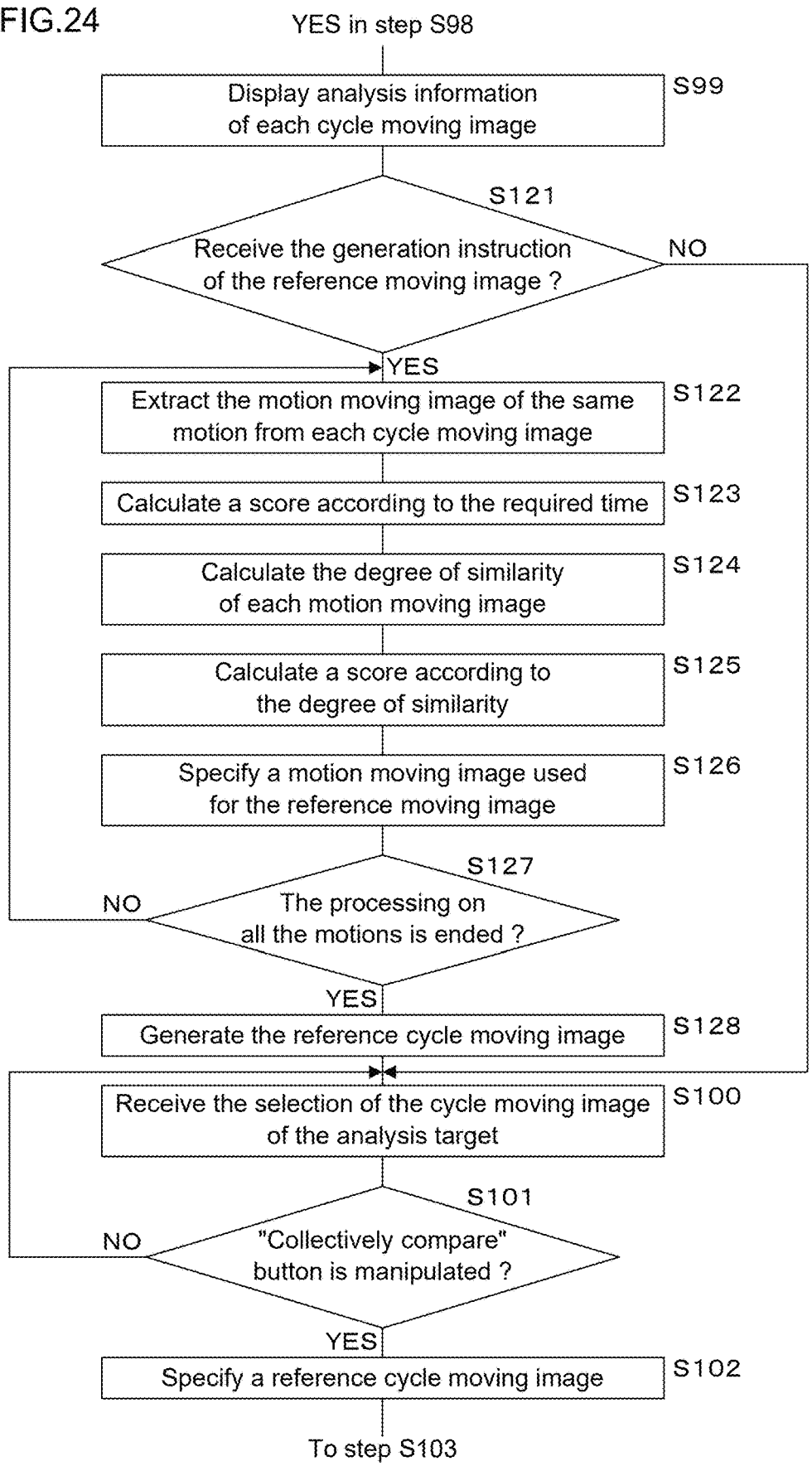
FIG. 24 is a flowchart illustrating an example of a comparison processing procedure of a cycle moving image in Embodiment 4.
Figure 25:
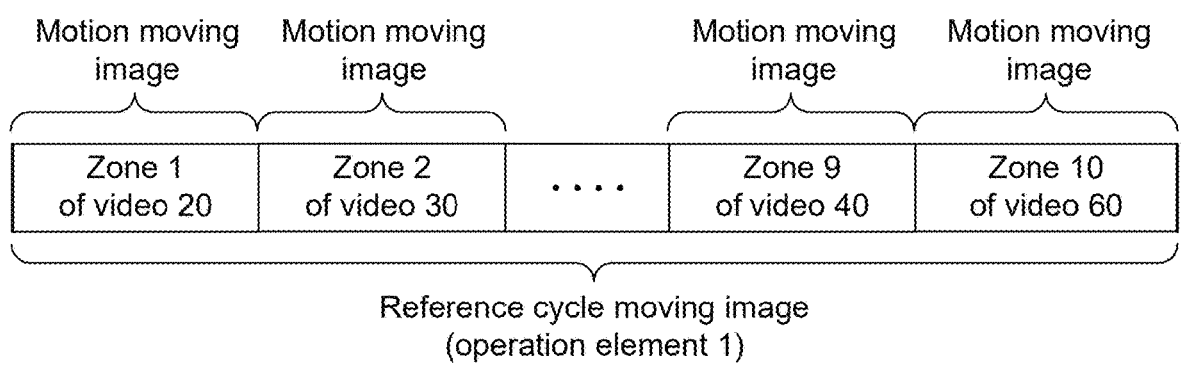
FIG. 25 is an explanatory diagram illustrating an example of a reference cycle moving image.

FIG. 24 is a flowchart illustrating an example of the comparison processing procedure of the cycle moving image in Embodiment 4, and FIG. 25 is an explanatory diagram illustrating an example of the reference cycle moving image. In the processing illustrated in FIG. 24, steps S121 to S128 are added between steps S99 and S100 in the processing illustrated in FIG. 17. For the same step as that in FIG. 17, the description will be omitted. In FIG. 24, steps S91 to S98 and S103 to S106 in FIG. 17 are not illustrated.

In the information processing apparatus 10 of this embodiment, the control unit 11 executes the same processing as that of steps S91 to S99 in FIG. 17. Accordingly, the control unit 11 displays the screen as illustrated in FIG. 18C or FIG. 18D. Here, in the displayed screen, a button (not illustrated) for receiving an instruction of generating the reference cycle moving image on the basis of the cycle moving image extracted from the moving image of the processing target is provided, and by manipulating such a button, a generation instruction of the reference cycle moving image is received. The control unit 11 determines whether the generation instruction of the reference cycle moving image is received (S121), and in a case where it is determined that the generation instruction is not received (S121: NO), proceeds to step S100. In this case, the control unit 11 executes the same processing as that of Embodiment 2 in FIG. 17.

In a case where it is determined that the generation instruction of the reference cycle moving image is received (S121: YES), the control unit 11 extracts the motion moving image of the same motion from each cycle moving image distributed to the motion moving image in step S97 (S122). The control unit 11 calculates a score according to the required time with respect to the motion moving image extracted from each cycle moving image (S123). For example, the control unit 11 allocates a score that increases as the required time decreases to each motion moving image. Then, the control unit 11, in the motion moving image extracted from each cycle moving image, calculates the degree of similarity in all combinations (S124), and calculates a score according to the calculated degree of similarity (S125). For example, the control unit 11 sequentially calculates the degree of similarity between one motion moving image and the other motion moving image, allocates a score that increases as the degree of similarity increases, and sets the total score according to each degree of similarity as the score of the motion moving image. The control unit 11 performs the same processing on all the motion moving images to calculate a score according to the degree of similarity with the other motion moving image.

The control unit 11, for each motion (each zone), specifies a motion moving image used for the reference cycle moving image, on the basis of the score calculated in step S123 and the score calculated in step S125 (S126). For example, the control unit 11 specifies a motion moving image with the highest total score of the score calculated in step S123 and the score calculated in step S125, as the motion moving image used for the reference cycle moving image. The control unit 11 determines whether the processing of steps S123 to S126 on the motion moving images of all the motions is ended (S127), and in a case where it is determined that the processing is not ended (S127: NO), returns to step S122, and repeats the processing of steps S122 to S126 on the unprocessed motion. Note that the motion moving image used for the reference cycle moving image may be a motion image extracted from the moving image of the processing target, or may be a motion moving image of different operator.

In a case where it is determined that the processing on the motion moving images of all the motions is ended (S127: YES), the control unit 11 generates the reference cycle moving image by connecting the motion moving images specified for each motion in step S126 (S128). Accordingly, the reference cycle moving image as illustrated in FIG. 25 is generated. In the examples of FIG. 25, a reference cycle moving image by a zone 1 of a cycle moving image of a video 20, a zone 2 of a cycle moving image of a video 30, . . . , a zone 9 of a video 40, a zone 10 of a video 60 is generated. After that, the control unit 11 proceeds to step S100. Note that in step S102 of this case, the control unit 11 specifies the reference cycle moving image generated in step S128 as the reference cycle moving image to be an example. According to the processing described above, it is possible to generate the reference cycle moving image by a motion moving image having a short required time in any motion (zone) and a high degree of similarity with the motion moving image in the other cycle moving image. It is considered that as the degree of similarity between the motion moving image of the operator and the other motion moving image increases, a standard motion is performed. Accordingly, it is possible to generate an optimal reference cycle moving image by the motion moving image in which the required time is short and the standard motion is performed. Note that in the processing described above, the motion moving image used for the reference cycle moving image is not limited to being specified from the total score of the score according to the required time and the score according to the degree of similarity with the motion moving image in the other cycle moving image. For example, a motion moving image with the shortest required time, a motion moving image with the maximum degree of similarity with the other motion moving image, and the like may be specified as the motion moving image used for the reference cycle moving image. In addition, for the motion moving image extracted from each cycle moving image, for example, the determination processing of whether it is the standard motion may be performed by the factor classification model M5 used in Embodiment 1, and for the motion moving image determined that it is the standard motion, the processing of steps S123 to S126 may be performed. In this case, it is possible to generate a more optimal reference cycle moving image by a motion moving image obtained by capturing a more standard motion.

Embodiment 5

In Embodiments 2 to 4, the moving image obtained by capturing one operator is set as the processing target. In this embodiment, an information processing apparatus setting a moving image obtained by capturing a plurality of operators as the processing target will be described. The information processing apparatus 10 of this embodiment has the same configuration as the configuration of the information processing apparatus 10 of Embodiment 1 illustrated in FIG. 2, and thus, the description for the configuration will be omitted.

Figure 26:
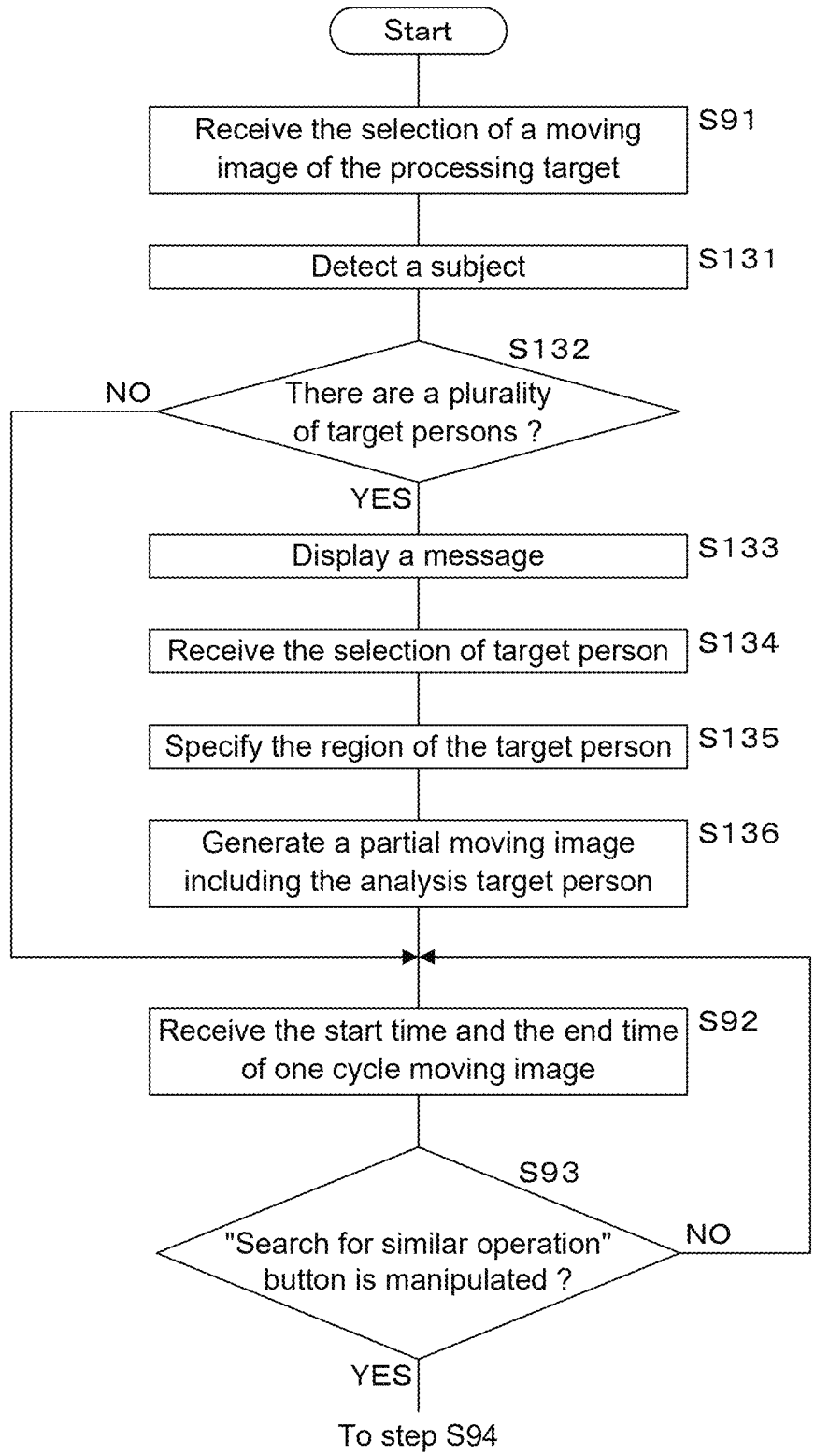
FIG. 26 is a flowchart illustrating an example of a comparison processing procedure of a cycle moving image in Embodiment 5.
Figure 27A:
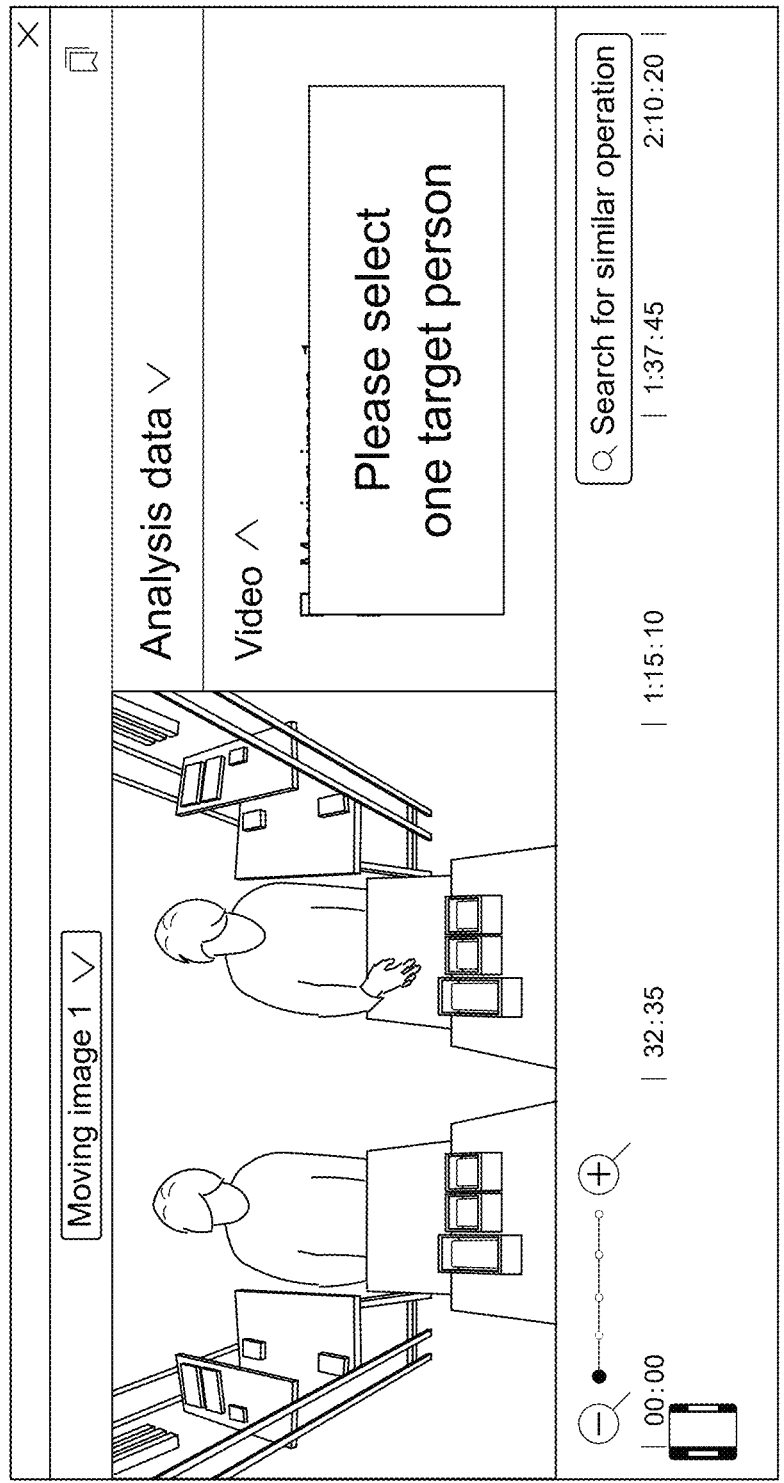
FIG. 27A is an explanatory diagram illustrating a screen example.

FIG. 26 is a flowchart illustrating an example of the comparison processing procedure of the cycle moving image in Embodiment 5, and FIG. 27A and FIG. 27B are explanatory diagrams illustrating a screen example. In the processing illustrated in FIG. 26, steps S131 to S136 are added between steps S91 and S92 in the processing illustrated in FIG. 17. For the same step as that in FIG. 17, the description will be omitted. In FIG. 26, steps S94 to S106 in FIG. 17 are not illustrated.

In the information processing apparatus 10 of this embodiment, the control unit 11 receives the selection of a random moving image from the moving image selection screen as illustrated in FIG. 18A (S91). The control unit 11 performs object detection processing on the selected moving image, and detects a subject (a target person) in the moving image (S131). The object detection processing may be executed by a learning model composed of an object detection algorithm such as CNN, a single shot multibox detector (SSD), and you only look once (YOLO), or an algorithm for attaining semantic segmentation, such as SegNet, a fully convolutional network (FCN), and U-Net. The control unit 11 determines whether there are a plurality of detected target persons (S132), in a case where there are not the plurality of detected target persons (S132: NO), that is, in a case where there is one detected target person, proceeds to step S92. In this case, the control unit 11 executes the same processing as that of Embodiment 2 illustrated in FIG. 17.

In a case where it is determined that there are the plurality of detected target persons (S132: YES), the control unit 11, as illustrated in FIG. 27A, displays a message for urging the selection of one analysis target person from the target persons in the moving image (S133). The moving image that is being displayed on the screen of FIG. 27A is configured such that the one target person can be selected by a predetermined manipulation (for example, left-clicking the mouse), and the control unit 11 receives the selection of one target person by the predetermined manipulation with respect to the moving image (S134). Note that for the moving image that is being displayed, the control unit 11 may explicitly indicate the detected target person with a bounding box or the like, and receive the selection of any of the bounding boxes to receive the selection of any target person. The control unit 11, in the moving image, specifies the region of the selected target person (S135). Here, the control unit 11 may specify a region with a predetermined size based on a point where the predetermined manipulation is performed as the region of the analysis target person, or may specify a region including the point where the predetermined manipulation is performed among the regions of each target person detected in step S131 as the region of the analysis target person. In the example of FIG. 27B, a pulldown menu is displayed by performing a predetermined manipulation on the target person on the right side of the moving image, and in a case where "select as target person" in the pulldown menu is selected, the control unit 11 specifies the target person as the analysis target.

In a case where the moving image includes the plurality of target persons, each target person is captured in the same region in the moving image. In the example of FIG. 27A, a target person captured on the left side of the moving image is consistently captured on the left side, and a target person captured on the right side is consistently captured on the right side. Accordingly, in this embodiment, the control unit 11 extracts a region including the analysis target person from each frame of the moving image selected in step S91 to generate a partial moving image including only the analysis target person (S136). After that, the control unit 11 sets a partial moving image including one analysis target person as the processing target, and executes the processing subsequent to step S92. Accordingly, according to the same processing as that of the information processing apparatus 10 in Embodiments 2 to 4, it is possible to present the comparison result of the cycle moving image extracted from the partial moving image. Note that in this embodiment, the processing subsequent to step S92 may be executed, on the basis of the region of the analysis target person in the moving image of the processing target, without generating the partial moving image including the analysis target person from the moving image of the processing target.

In the processing described above, even in a case where the moving image includes the plurality of operators, one operator who is arbitrarily selected can be set as the analysis target person, and according to the same processing as that of Embodiments 2 to 4 described above, the comparison of the cycle moving image extracted from the moving image obtained by capturing the operator selected as the analysis target person can be performed. Even in Embodiments 2 to 5 described above, the moving image of the processing target is not limited to the moving image obtained by capturing the operator performing the operation, and may be a moving image obtained by capturing a robot configured to perform a predetermined operation.

The respects described in the above embodiments can be combined with each other. In addition, the independent and dependent claims set forth in the claims can be combined with each other in any and all combinations, regardless of the format of reference. Further, the claims are in a format in which a claim refers to two or more other claims (the format of a multiple dependent claim), but are not limited thereto. The claims may be in a format in which a multiple dependent claim refers to at least one of multiple dependent claims (a multiple-multiple dependent claim).

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

It is noted that, as used herein and in the appended claims, the singular forms "a", "an", and "the" include plural referents unless the context clearly dictates otherwise.

The invention claimed is:

1. A non-transitory computer readable medium having recorded thereon a program for causing a computer to execute processing of:
   distributing a moving image obtained by capturing a target performing an operation for each motion included in the operation;
   determining whether each motion is a standard motion, on the basis of each distributed moving image; and
   analyzing whether the operation is a standard operation, on the basis of a determination result with respect to each motion,
   wherein the processing comprises processing of:
   distributing the moving image for each operation element including a plurality of motions; and
   distributing each distributed operation element moving image for each of the motions, and
   the program causes the computer to further execute processing of:
   inputting each of a plurality of the operation element moving images to a learning model learned to output information relevant to a factor that the operation element performed by the target in the operation element moving image is not assumed as a standard operation when inputting the operation element moving image, and outputting the information relevant to the factor; and
   grouping the plurality of operation element moving images for each of the factors, on the basis of the output information relevant to the factor.

2. A non-transitory computer readable medium having recorded thereon a program for causing a computer to execute processing of:
   distributing a moving image obtained by capturing a target performing an operation for each motion included in the operation;
   determining whether each motion is a standard motion, on the basis of each distributed moving image;
   analyzing whether the operation is a standard operation, on the basis of a determination result with respect to each motion;

measuring a motion time of each motion in each moving image, on the basis of each distributed moving image to which each of a plurality of moving images is distributed for each of the motions; and
generating a chart indicating a variation in the measured motion time of each motion in each moving image,
wherein the chart is a chart in which the motion time of each motion in each moving image is plotted in association with each motion, and
the program causes the computer to further execute processing of
outputting, when receiving selection of a point plotted in the chart, a distributed moving image of a corresponding motion in a moving image corresponding to the selected point.

3. The program according to claim 1 for causing the computer to further execute processing of:
inputting the moving image to a learning model learned to output information relevant to the motion performed by the target when inputting the moving image obtained by capturing the target, and outputting the information relevant to the motion performed by the target in the distributed moving image included in the moving image; and
determining whether the motion in the distributed moving image is a standard motion, on the basis of the output information relevant to the motion.

4. The program according to claim 1 for causing the computer to further execute processing of
determining whether each motion is a standard motion, in accordance with whether a motion time of each motion in each distributed moving image is a standard motion time.

5. The program according to claim 3 for causing the computer to further execute processing of:
determining a breed of operation target of the operation performed by the target in the moving image, on the basis of the moving image;
selecting the learning model according to the determined breed; and
inputting the moving image to the selected learning model, and outputting the information relevant to the motion performed by the target in the distributed moving image included in the moving image.

6. The program according to claim 1 for causing the computer to further execute processing of:
inputting the moving image to a learning model learned to output information relevant to the motion included in the operation when inputting the moving image obtained by capturing the target performing the operation, and outputting the information relevant to the motion performed by the target in the moving image; and
distributing the moving image for each of the motions, on the basis of the output information relevant to the motion.

7. The program according to claim 1 for causing the computer to further execute processing of:
outputting a distribution position at which the moving image is distributed for each of the motions; and
receiving a change with respect to each distribution position.

8. The program according to claim 1 for causing the computer to further execute processing of
receiving setting of a distribution position distributed for each of the motions with respect to any reproduction position of the moving image.

9. The program according to claim 1 for causing the computer to further execute processing of
outputting a moving image including the operation element moving image for each of the factors.

10. The program according to claim 1 for causing the computer to further execute processing of
outputting distributed moving images of each motion in a plurality of moving images in synchronization, on the basis of the distributed moving image to which each of a plurality of moving images is distributed for each of the motions.

11. The program according to claim 1 for causing the computer to further execute processing of
generating a chart indicating an operation start timing and an operation end timing for each of the operation elements, on the basis of the operation element moving image to which the moving image is distributed.

12. A non-transitory computer readable medium having recorded thereon a program for causing a computer to execute processing of:
distributing a moving image obtained by capturing a target performing an operation for each motion included in the operation;
determining whether each motion is a standard motion, on the basis of each distributed moving image;
analyzing whether the operation is a standard operation, on the basis of a determination result with respect to each motion;
distributing a plurality of the moving images for each motion included in the operation; and
outputting a distributed moving image of each motion in the plurality of moving images in synchronization, on the basis of each distributed moving image,
wherein the processing comprises processing of:
selecting a reference moving image for a comparison with other moving images, from the plurality of moving images; and
outputting a distributed moving image of each motion in the selected reference moving image and the moving images other than the reference moving image in synchronization, and
the program causes the computer to further execute processing of
outputting, when receiving a change instruction of the other moving image while outputting a distributed moving image of any motion in the reference moving image and the other moving image, the reference moving image and the other moving image instructed to be changed in synchronization, from the distributed moving image of the motion being output.

13. A non-transitory computer readable medium having recorded thereon a program for causing a computer to execute processing of:
distributing a moving image obtained by capturing a target performing an operation for each motion included in the operation;
determining whether each motion is a standard motion, on the basis of each distributed moving image;
analyzing whether the operation is a standard operation, on the basis of a determination result with respect to each motion;
distributing a plurality of the moving images for each motion included in the operation; and
outputting a distributed moving image of each motion in the plurality of moving images in synchronization, on the basis of each distributed moving image, wherein the processing comprises processing of:
selecting a reference moving image for a comparison with other moving images, from the plurality of moving images; and
outputting a distributed moving image of each motion in the selected reference moving image and the moving images other than the reference moving image in synchronization, and
the program causes the computer to further execute processing of
extracting a distributed moving image with a low degree of similarity between each distributed moving image of the reference moving image and each distributed moving image of the other moving image, from each distributed moving image of a plurality of the other moving images.

14. A non-transitory computer readable medium having recorded thereon a program for causing a computer to execute processing of:
distributing a moving image obtained by capturing a target performing an operation for each motion included in the operation;
determining whether each motion is a standard motion, on the basis of each distributed moving image;
analyzing whether the operation is a standard operation, on the basis of a determination result with respect to each motion;
distributing a plurality of the moving images for each motion included in the operation; and
outputting a distributed moving image of each motion in the plurality of moving images in synchronization, on the basis of each distributed moving image,
wherein the processing comprises processing of:
selecting a reference moving image for a comparison with other moving images, from the plurality of moving images; and
outputting a distributed moving image of each motion in the selected reference moving image and the moving images other than the reference moving image in synchronization, and
the program causes the computer to further execute processing of
extracting a distributed moving image with a long required time of a motion according to the distributed moving image, from each distributed moving image of a plurality of the other moving images.

15. A non-transitory computer readable medium having recorded thereon a program for causing a computer to execute processing of:
distributing a moving image obtained by capturing a target performing an operation for each motion included in the operation;
determining whether each motion is a standard motion, on the basis of each distributed moving image;
analyzing whether the operation is a standard operation, on the basis of a determination result with respect to each motion;
distributing a plurality of the moving images for each motion included in the operation;
outputting a distributed moving image of each motion in the plurality of moving images in synchronization, on the basis of each distributed moving image;
selecting a reference moving image for a comparison with other moving images, from the plurality of moving images; and
outputting a distributed moving image of each motion in the selected reference moving image and the moving images other than the reference moving image in synchronization,
wherein the program causes the computer to further execute processing of:
extracting a distributed moving image to be included in the reference moving image for each motion, from each distributed moving image in the plurality of moving images; and
connecting the distributed moving image extracted for each motion to generate the reference moving image.

16. The program according to claim 1,
wherein the moving image includes a plurality of cycle moving images by setting a time when the target performs a series of the operations as one cycle moving image, and
the program causes the computer to further execute processing of:
receiving designation of one cycle moving image in the moving image;
extracting a cycle moving image similar to a designated cycle moving image, from the moving image; and
distributing each extracted cycle moving image for each of the motions.

17. The program according to claim 16,
wherein a plurality of the moving images obtained by capturing one or a plurality of the targets are stored in a storage unit, and
the program causes the computer to further execute processing of:
extracting the cycle moving image similar to the designated cycle moving image, from the plurality of moving images stored in the storage unit; and
distributing each extracted cycle moving image for each of the motions.

18. The program according to claim 1 for causing the computer to further execute processing of:
receiving selection with respect to any target when a plurality of targets are included in the moving image; and
distributing the moving image for each motion performed by the selected target.

19. An information processing method in which a computer executes processing of:
distributing a moving image obtained by capturing a target performing an operation for each motion included in the operation;
determining whether each motion is a standard motion, on the basis of each distributed moving image; and
analyzing whether the operation is a standard operation, on the basis of a determination result with respect to each motion,
wherein the processing comprises processing of:
distributing the moving image for each operation element including a plurality of motions; and
distributing each distributed operation element moving image for each of the motions, and
the computer further executes processing of:
inputting each of a plurality of the operation element moving images to a learning model learned to output information relevant to a factor that the operation element performed by the target in the operation element moving image is not assumed as a standard operation when inputting the operation element moving image, and outputting the information relevant to the factor; and grouping the plurality of operation element moving images for each of the factors, on the basis of the output information relevant to the factor.

20. An information processing apparatus comprising a control unit, wherein the control unit is configured to:
   distributing a moving image obtained by capturing a target performing an operation for each motion included in the operation;
   determining whether each motion is a standard motion, on the basis of each distributed moving image;
   analyzing whether the operation is a standard operation, on the basis of a determination result with respect to each motion;
   distributing the moving image for each operation element including a plurality of motions;
   distributing each distributed operation element moving image for each of the motions;
   inputting each of a plurality of the operation element moving images to a learning model learned to output information relevant to a factor that the operation element performed by the target in the operation element moving image is not assumed as a standard operation when inputting the operation element moving image, and outputting the information relevant to the factor; and
   grouping the plurality of operation element moving images for each of the factors, on the basis of the output information relevant to the factor.

21. An information processing method in which a computer executes processing of:
   distributing a moving image obtained by capturing a target performing an operation for each motion included in the operation;
   determining whether each motion is a standard motion, on the basis of each distributed moving image;
   analyzing whether the operation is a standard operation, on the basis of a determination result with respect to each motion;
   distributing a plurality of the moving images for each motion included in the operation; and
   outputting a distributed moving image of each motion in the plurality of moving images in synchronization, on the basis of each distributed moving image,
   wherein the processing comprises processing of:
   selecting a reference moving image for a comparison with other moving images, from the plurality of moving images; and
   outputting a distributed moving image of each motion in the selected reference moving image and the moving images other than the reference moving image in synchronization, and
   the computer further executes processing of
   outputting, when receiving a change instruction of the other moving image while outputting a distributed moving image of any motion in the reference moving image and the other moving image, the reference moving image and the other moving image instructed to be changed in synchronization, from the distributed moving image of the motion being output.

22. An information processing apparatus comprising a control unit, wherein the control unit is configured to:
   distributing a moving image obtained by capturing a target performing an operation for each motion included in the operation;
   determining whether each motion is a standard motion, on the basis of each distributed moving image;
   analyzing whether the operation is a standard operation, on the basis of a determination result with respect to each motion;
   distributing a plurality of the moving images for each motion included in the operation;
   outputting a distributed moving image of each motion in the plurality of moving images in synchronization, on the basis of each distributed moving image;
   selecting a reference moving image for a comparison with other moving images, from the plurality of moving images;
   outputting a distributed moving image of each motion in the selected reference moving image and the moving images other than the reference moving image in synchronization; and
   outputting, when receiving a change instruction of the other moving image while outputting a distributed moving image of any motion in the reference moving image and the other moving image, the reference moving image and the other moving image instructed to be changed in synchronization, from the distributed moving image of the motion being output.

* * * * *